(12) United States Patent
Zhang et al.

(10) Patent No.: US 11,775,135 B2
(45) Date of Patent: Oct. 3, 2023

(54) APPLICATION ICON DISPLAYING METHOD AND TERMINAL

(71) Applicant: Huawei Technologies Co., Ltd., Shenzhen (CN)

(72) Inventors: Qing Zhang, Xi'an (CN); Guoqi Yan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/265,140

(22) PCT Filed: Jul. 31, 2018

(86) PCT No.: PCT/CN2018/097794
§ 371 (c)(1),
(2) Date: Feb. 1, 2021

(87) PCT Pub. No.: WO2020/024108
PCT Pub. Date: Feb. 6, 2020

(65) Prior Publication Data
US 2021/0311610 A1 Oct. 7, 2021

(51) Int. Cl.
*G06F 3/048* (2013.01)
*G06F 3/04817* (2022.01)
*G06F 3/0488* (2022.01)

(52) U.S. Cl.
CPC ........ *G06F 3/04817* (2013.01); *G06F 3/0488* (2013.01)

(58) Field of Classification Search
CPC .......................... G06F 3/04817; G06F 3/0488
See application file for complete search history.

(56) References Cited

U.S. PATENT DOCUMENTS

| | | | | |
|---|---|---|---|---|
| 5,835,094 A | * | 11/1998 | Ermel | G06T 17/00 715/848 |
| 6,054,989 A | * | 4/2000 | Robertson | G06F 3/04815 715/848 |
| 9,483,490 B1 | * | 11/2016 | Iyengar | G06F 16/178 |
| 2005/0210416 A1 | * | 9/2005 | MacLaurin | G06F 3/0483 715/833 |
| 2005/0278338 A1 | * | 12/2005 | Todorova | G06F 8/63 |

(Continued)

FOREIGN PATENT DOCUMENTS

| | | |
|---|---|---|
| CN | 105224322 A | 1/2016 |
| CN | 106055211 A | 10/2016 |

(Continued)

*Primary Examiner* — Linh K Pham
(74) *Attorney, Agent, or Firm* — Leydig, Voit & Mayer, Ltd.

(57) ABSTRACT

A method is provided for displaying an application icon. A terminal displays a first screen, where the first screen includes an icon of a first application, and an icon of the cloned application of the first application is hidden. The terminal receives a first operation performed by a user on the icon of the first application, and displays the hidden icon of the cloned application of the first application in response to the first operation, where the icon of the cloned application of the first application and the icon of the first application are simultaneously displayed on the first screen, and the first screen is included on a home screen of the terminal.

11 Claims, 43 Drawing Sheets

(56) References Cited

U.S. PATENT DOCUMENTS

| | | | | |
|---|---|---|---|---|
| 2008/0307334 A1* | 12/2008 | Chaudhri | ................ | G06F 3/048 |
| | | | | 715/764 |
| 2009/0265657 A1* | 10/2009 | Bamford | ............ | G06F 3/04817 |
| | | | | 715/786 |
| 2010/0077162 A1* | 3/2010 | Kaneko | ................ | G06F 3/0653 |
| | | | | 711/E12.001 |
| 2011/0246942 A1* | 10/2011 | Misawa | ................ | G06F 3/0485 |
| | | | | 715/830 |
| 2012/0084690 A1* | 4/2012 | Sirpal | ................ | G06F 3/04886 |
| | | | | 715/835 |
| 2012/0242692 A1* | 9/2012 | Laubach | ............ | G06F 3/04883 |
| | | | | 345/629 |
| 2013/0009990 A1* | 1/2013 | Hsu | ..................... | G06F 3/04817 |
| | | | | 345/173 |
| 2014/0047413 A1* | 2/2014 | Sheive | .................. | H04L 65/403 |
| | | | | 717/110 |
| 2014/0075389 A1* | 3/2014 | Kim | ..................... | G06F 3/0482 |
| | | | | 715/838 |
| 2014/0157128 A1 | 6/2014 | Hussain | | |
| 2014/0164991 A1* | 6/2014 | Kim | ..................... | G06F 3/0488 |
| | | | | 715/788 |
| 2014/0282208 A1* | 9/2014 | Chaudhri | ............ | G06F 3/04817 |
| | | | | 715/779 |
| 2015/0026487 A1* | 1/2015 | Choi | ..................... | G06F 9/4893 |
| | | | | 713/300 |
| 2015/0177974 A1* | 6/2015 | Lu | ........................ | G06F 3/04847 |
| | | | | 715/752 |
| 2015/0347010 A1* | 12/2015 | Yang | ..................... | G06F 3/1423 |
| | | | | 715/765 |
| 2016/0202852 A1* | 7/2016 | Park | ..................... | G06F 3/04845 |
| | | | | 715/781 |
| 2016/0327911 A1* | 11/2016 | Eim | ..................... | G04B 37/1486 |
| 2016/0334970 A1* | 11/2016 | Mysore Veera | ........ | G06F 9/453 |
| 2017/0344329 A1* | 11/2017 | Oh | ........................ | G06F 3/0486 |
| 2017/0357789 A1* | 12/2017 | Wang | ..................... | G06F 21/629 |
| 2018/0024824 A1* | 1/2018 | Dabbiere | ............. | H04L 63/105 |
| | | | | 717/121 |
| 2018/0284892 A1* | 10/2018 | Kwon | ................... | G06F 3/0416 |
| 2018/0295208 A1* | 10/2018 | Li | ........................ | H04L 67/306 |
| 2018/0335928 A1* | 11/2018 | Van Os | ................ | G06F 3/04817 |
| 2019/0042066 A1* | 2/2019 | Kim | ..................... | H04M 1/725 |
| 2019/0354661 A1* | 11/2019 | Lu | ........................ | H04L 67/535 |
| 2020/0233568 A1* | 7/2020 | Wang | ..................... | G06F 3/0486 |

FOREIGN PATENT DOCUMENTS

| | | |
|---|---|---|
| CN | 106155694 A | 11/2016 |
| CN | 106201620 A | 12/2016 |
| CN | 106293478 A | 1/2017 |
| CN | 106330678 A | 1/2017 |
| CN | 106383741 A | 2/2017 |
| CN | 106445292 A | 2/2017 |
| CN | 106445295 A | 2/2017 |
| CN | 106484262 A | 3/2017 |
| CN | 107026933 A | 8/2017 |
| CN | 108089806 A | 5/2018 |
| WO | 2018058776 A1 | 4/2018 |

* cited by examiner

APPLICATION ICON DISPLAYING METHOD AND TERMINAL

CROSS-REFERENCE TO RELATED APPLICATIONS

This application is a National Stage of International Application No. PCT/CN2018/097794, filed on Jul. 31, 2018, which is hereby incorporated by reference in its entirety.

TECHNICAL FIELD

Embodiments of this application relate to the terminal field, and in particular, to an application icon displaying method and a terminal.

BACKGROUND

Nowadays, terminals such as mobile phones have become indispensable communications tools in people's daily life and work. In addition, with development of terminal technologies, an application cloning function becomes increasingly popular. For an application, a plurality of same applications can all be installed on a terminal having an application cloning function. By using the plurality of same applications, simultaneous login and use of a plurality of accounts can be implemented, thereby implementing application cloning of the application. For example, two WeChat applications may be installed. The two WeChat applications may be used to implement simultaneous login and use of two accounts, for example, an account for work and an account for life, to implement separation between a user's life and work, thereby bringing convenience to the user.

Currently, when the terminal includes an application and a cloned application of the application, the terminal usually displays both an icon of the application and an icon of the cloned application of the application simultaneously. In this case, when the terminal includes a plurality of cloned applications of an application, application icons on a home screen of the terminal sharply increase, and consequently space of the home screen is occupied and a case in which the applications have cloned applications is also exposed.

SUMMARY

Embodiments of this application provide an application icon displaying method and a terminal, to resolve a problem that when a terminal includes a plurality of cloned applications of an application, application icons on a home screen of the terminal sharply increase, and consequently space of the home screen is occupied and a case in which the applications have cloned applications is also exposed.

To achieve the foregoing objective, the embodiments of this application provide the following technical solutions.

According to a first aspect of the embodiments of this application, an application icon displaying method is provided. The method may be applied to a terminal including at least two applications, and the at least two applications may include a first application and a cloned application of the first application. The method may include: displaying, by the terminal, a first screen including an icon of the first application, where an icon of the cloned application of the first application is hidden; when a user wants to view the cloned application, performing, by the user, a first operation on the icon of the first application included in the first screen; receiving, by the terminal, the first operation; and displaying, by the terminal, the hidden icon of the cloned application of the first application in response to the first operation, where the icon of the cloned application of the first application and the icon of the first application are simultaneously displayed on the first screen, and the first screen may be included on a home screen of the terminal.

According to the application icon displaying method provided in this embodiment of this application, when the terminal includes the first application and the cloned application of the first application, the home screen of the terminal is provided with the icon of the application, but is not provided with the icon of the cloned application of the application; the icon of the application is displayed on a subscreen of the home screen of the terminal, while the icon of the cloned application of the application is hidden; and the icon of the cloned application of the application is not displayed on another subscreen of the home screen either. In this way, when the terminal includes a plurality of cloned applications of an application, a problem that application icons on the home screen of the terminal sharply increase and consequently space of the home screen is occupied can be avoided. In addition, user privacy can further be protected, that is, a case in which the applications have cloned applications is not exposed. In addition, when detecting the first operation performed by the user, the terminal may display the hidden icon of the cloned application of the first application, so that the icon of the cloned application of the first application and the icon of the first application are simultaneously displayed on the subscreen of the home screen of the terminal. This is convenient for the user to use.

With reference to the first aspect, in a possible implementation, the displaying, by the terminal, the hidden icon of the cloned application of the first application in response to the first operation may specifically include: displaying, by the terminal in response to the first operation, a first menu bar corresponding to the first application, where the hidden icon of the cloned application of the first application is included in the first menu bar. In this way, when the first operation performed by the user is detected, the first menu bar corresponding to the first application is displayed, so that the hidden icon of the cloned application of the first application is displayed.

With reference to the first aspect or the foregoing possible implementation, in another possible implementation, the first menu bar is adjacent to the icon of the first application. In this way, it can be convenient for the user to learn that the icon of the cloned application included in the first menu bar an icon of the cloned application of the first application, thereby improving user experience.

With reference to the first aspect or the foregoing possible implementations, in another possible implementation, the first operation is a sliding operation, a start point of the sliding operation may be the icon of the first application, and a sliding direction may be any one of an upward direction, a downward direction, a leftward direction, and a rightward direction; and a direction of the first menu bar relative to the icon of the first application may be the same as the sliding direction. In this way, the first menu bar corresponding to the first application is displayed in a same direction as the sliding direction of the sliding operation. This can be convenient for the user to memorize an operation of viewing the hidden icon.

With reference to the first aspect or the foregoing possible implementation, in another possible implementation, if the terminal includes a plurality of cloned applications of the first application, icons of different cloned applications may be included in a same first menu bar, or icons of different cloned applications may be included in different first menu bars. If icons of different cloned applications are included in different first menu bars, the displaying, by the terminal in response to the first operation, a first menu bar corresponding to the first application may specifically include: displaying, by the terminal in response to the first operation, different first menu bars based on different sliding directions of the first operation.

With reference to the first aspect or the foregoing possible implementations, in another possible implementation, the application icon displaying method may further include: receiving, by the terminal, a second operation performed by the user on the icon of the first application; displaying, by the terminal in response to the second operation, a second menu bar corresponding to the first application, where the second menu bar may include an add button, and the add button may be used to create the cloned application of the first application; receiving, by the terminal, a third operation performed by the user on the add button; and in response to the third operation, creating, by the terminal, the cloned application of the first application, and generating the icon of the cloned application of the first application. In this way, after the user performs the second operation on the icon, displayed on the subscreen of the home screen of the terminal, of the first application, the terminal displays the add button used to create the cloned application of the first application, so that a process of creating the cloned application is simplified, and user experience is improved. The second menu bar and the first menu bar may be a same menu bar or different menu bars.

With reference to the first aspect or the foregoing possible implementations, in another possible implementation, the application icon displaying method may further include: receiving, by the terminal, a new message; displaying, by the terminal, a new-message prompt identifier on the icon of the first application; receiving, by the terminal, the first operation; and if the new message is a message received by the first application, displaying, by the terminal, the first menu bar in response to the first operation; or if the new message is a message received by the cloned application of the first application, in response to the first operation, displaying, by the terminal, the first menu bar, displaying the new-message prompt identifier on the icon of the cloned application of the first application, and skipping displaying the new-message prompt identifier on the icon of the first application. In this way, it can be convenient for the user to learn a specific application that receives the new message, thereby improving user experience.

According to a second aspect of the embodiments of this application, an application icon displaying method is provided, where the method may be applied to a terminal including a first application. The method may include: displaying, by the terminal, a first screen including an icon of the first application; receiving, by the terminal, a first operation performed by a user on the icon of the first application; and displaying, by the terminal in response to the received first operation, an add button if the terminal does not include a cloned application of the first application, where the add button may be used to create the cloned application of the first application; or displaying, by the terminal in response to the first operation, an icon of a cloned application of the first application if the terminal includes the cloned application of the first application, where before the first operation is received, the icon of the cloned application of the first application is hidden; after the first operation is received, the icon of the cloned application of the first application and the icon of the first application are simultaneously displayed on the first screen; and the first screen is included on a home screen of the terminal.

According to the application icon displaying method provided in this embodiment of this application, when the terminal includes the first application and the cloned application of the first application, the icon of the application is displayed on a subscreen of the home screen of the terminal, while the icon of the cloned application of the application is hidden. In this way, when the terminal includes a plurality of cloned applications of an application, a problem that application icons on the home screen of the terminal sharply increase and consequently space of the home screen is occupied can be avoided. In addition, user privacy can further be protected, that is, a case in which the applications have cloned applications is not exposed. In addition, when detecting the first operation performed by the user, the terminal may display the hidden icon of the cloned application of the first application when the terminal includes the cloned application of the first application, so that the icon of the cloned application of the first application and the icon of the first application are simultaneously displayed on the subscreen of the home screen of the terminal. This is convenient for the user to use. When the terminal does not include the cloned application of the first application, the terminal displays the add button used to create the cloned application of the first application, so that a process of creating the cloned application is simplified, and user experience is improved.

With reference to the second aspect, in a possible implementation, the displaying, by the terminal, an add button in response to the first operation if the terminal does not include a cloned application of the first application may specifically include: if the terminal does not include the cloned application of the first application, displaying, by the terminal in response to the first operation, a menu bar corresponding to the first application, where the menu bar includes the add button; and the displaying, by the terminal in response to the first operation, an icon of a cloned application of the first application if the terminal includes the cloned application of the first application may specifically include: if the terminal includes the cloned application of the first application, displaying, by the terminal in response to the first operation, a menu bar corresponding to the first application, where the menu bar includes the icon of the cloned application of the first application.

With reference to the second aspect or the foregoing possible implementation, in another possible implementation, the displaying, by the terminal, an add button in response to the first operation if the terminal does not include a cloned application of the first application may specifically include: if the terminal does not include the cloned application of the first application, displaying, by the terminal in response to the first operation, a first menu bar corresponding to the first application, where the first menu bar includes the add button; and the displaying, by the terminal in response to the first operation, an icon of a cloned application of the first application if the terminal includes the cloned application of the first application may specifically include: if the terminal includes the cloned application of the first application, displaying, by the terminal in response to the first operation, a second menu bar corresponding to the first application, where the second menu bar includes the icon of the cloned application of the first application.

According to a third aspect of the embodiments of this application, an application icon displaying method is provided, where the method is applied to a terminal including a first application. The method may include: displaying, by the terminal, a first screen including an icon of the first application; receiving, by the terminal, a bifurcated sliding operation performed by a user on the icon of the first application; creating, by the terminal, a cloned application of the first application in response to the sliding operation; and displaying, by the terminal, an icon of the cloned application of the first application on the first screen, where the first screen is included on a home screen of the terminal.

According to the application icon displaying method provided in this embodiment of this application, when receiving the bifurcated sliding operation performed by the user on the icon of the first application, the terminal creates the cloned application of the first application, and displays the icon of the cloned application of the first application, so that a process of creating the cloned application is simplified, and user experience is improved.

With reference to the third aspect, in a possible implementation, after the terminal displays the icon of the cloned application of the first application on the first screen, the icon of the cloned application of the first application is hidden; and the application icon displaying method may further include: receiving, by the terminal, a first operation performed by the user on the icon of the first application; and displaying, by the terminal in response to the first operation, a menu bar corresponding to the first application, where the menu bar includes the hidden icon of the cloned application of the first application. When the terminal includes the first application and the cloned application of the first application, the icon of the application is displayed on a subscreen of the home screen of the terminal, while the icon of the cloned application of the application is hidden. In this way, when the terminal includes a plurality of cloned applications of an application, a problem that application icons on the home screen of the terminal sharply increase and consequently space of the home screen is occupied can be avoided. In addition, user privacy can further be protected, that is, a case in which the applications have cloned applications is not exposed.

According to a fourth aspect of the embodiments of this application, an application icon displaying method is provided. The method may be applied to a terminal including at least two applications, and the at least two applications may include a first application and a cloned application of the first application. The method may include: displaying, by the terminal, a first screen including an icon of the first application, where an icon of the cloned application of the first application is hidden, and the first screen is included on a home screen of the terminal; receiving, by the terminal, a new message; displaying, by the terminal, a new-message prompt identifier on the icon of the first application; receiving, by the terminal, a first operation performed by a user on the icon of the first application; and if the new message is a message received by the first application, displaying, by the terminal, the hidden icon of the cloned application of the first application in response to the first operation, where the icon of the cloned application of the first application and the icon of the first application are simultaneously displayed on the first screen, and the new-message prompt identifier is displayed on the icon of the first application; or if the new message is a message received by the cloned application of the first application, in response to the first operation, displaying, by the terminal, the hidden icon of the cloned application of the first application, displaying the new-message prompt identifier on the icon of the cloned application of the first application, and skipping displaying the new-message prompt identifier on the icon of the first application, where the icon of the cloned application of the first application and the icon of the first application are simultaneously displayed on the first screen.

According to the application icon displaying method provided in this embodiment of this application, when the terminal includes the first application and the cloned application of the first application, the icon of the application is displayed on a subscreen included on the home screen of the terminal, and the icon of the cloned application of the application is hidden. In this way, when the terminal includes a plurality of cloned applications of an application, a problem that application icons on the home screen of the terminal sharply increase and consequently space of the home screen is occupied can be avoided. In addition, user privacy can further be protected, that is, a case in which the applications have cloned applications is not exposed. In addition, when receiving the new message, if the terminal detects the first operation performed by the user, the terminal may display the hidden icon of the cloned application of the first application and the new-message prompt identifier based on whether the new message is received by the first application or the cloned application of the first application. This is convenient for the user to use, and further makes the user learn a specific application that receives the new message, thereby improving user experience.

According to a fifth aspect of the embodiments of this application, an application icon displaying method is provided. The method may be applied to a terminal including at least two applications, and the at least two applications include a first application and a cloned application of the first application. The method may include: displaying, by the terminal, a first screen, where the first screen includes an entry icon of the first application; and the entry icon is an icon of the first application, and an icon of the cloned application of the first application is hidden; or the entry icon is an icon of the cloned application of the first application, and an icon of the first application is hidden; or the entry icon is a first icon, the first icon is different from an icon of the first application and an icon of the cloned application of the first application, and both the icon of the first application and the icon of the cloned application of the first application are hidden; receiving, by the terminal, a first operation performed by a user on the entry icon; and displaying, by the terminal, the hidden icon in response to the first operation.

According to the application icon displaying method provided in this embodiment of this application, when the terminal includes the first application and the cloned application of the first application, the entry icon of the application is displayed on a subscreen included on a home screen of the terminal, while the icon of the cloned application of the application and/or the icon of the application are/is hidden. In this way, when the terminal includes a plurality of cloned applications of an application, a problem that application icons on the home screen of the terminal sharply increase and consequently space of the home screen is occupied can be avoided. In addition, user privacy can further be protected, that is, a case in which the applications have cloned applications is not exposed. In addition, when detecting the first operation performed by the user, the terminal may display the hidden icon. This is convenient for the user to use.

According to a sixth aspect of the embodiments of this application, an application icon displaying apparatus is provided. The application icon displaying apparatus is included in a terminal, and the apparatus has a function of implementing behavior of the terminal in the method according to any one of the first aspect and the possible implementations of the first aspect, the method according to any one of the second aspect and the possible implementations of the second aspect, the method according to any one of the third aspect and the possible implementations of the third aspect, the fourth aspect, or the fifth aspect. The function may be implemented by hardware, or may be implemented by hardware executing corresponding software. The hardware or software includes one or more modules or units corresponding to the foregoing function, for example, an input module or unit, a display module or unit, or a processing module or unit.

According to a seventh aspect of the embodiments of this application, a terminal is provided. The terminal may include one or more processors, a memory, and a display; the one or more processors, the memory, and the display are coupled to each other; the memory is configured to store computer program code, and the computer program code includes a computer instruction; and when the one or more processors execute the computer instruction, the terminal is enabled to perform the application icon displaying method according to any one of the first aspect and the possible implementations of the first aspect, the second aspect and the possible implementations of the second aspect, the third aspect and the possible implementations of the third aspect, the fourth aspect, and the fifth aspect.

According to an eighth aspect of the embodiments of this application, a computer storage medium is provided. The computer storage medium may include a computer instruction; and when the computer instruction is run on a terminal, the terminal is enabled to perform the application icon displaying method according to any one of the first aspect and the possible implementations of the first aspect, the second aspect and the possible implementations of the second aspect, the third aspect and the possible implementations of the third aspect, the fourth aspect, and the fifth aspect.

According to a ninth aspect of the embodiments of this application, a computer program product is provided. When the computer program product is run on a computer, the computer is enabled to perform the application icon displaying method according to any one of the first aspect and the possible implementations of the first aspect, the second aspect and the possible implementations of the second aspect, the third aspect and the possible implementations of the third aspect, the fourth aspect, and the fifth aspect.

It can be understood that the application icon displaying apparatus according to the sixth aspect, the terminal according to the seventh aspect, the computer storage medium according to the eighth aspect, and the computer program product according to the ninth aspect that are provided above are all configured to perform the application icon displaying method provided in any one of the first aspect to the fifth aspect. Therefore, for beneficial effects that can be achieved by the application icon displaying apparatus, the terminal, the computer storage medium, and the computer program product, refer to the beneficial effects in the application icon displaying method provided in any one of the first aspect to the fifth aspect. Details are not described herein again.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "a plurality of" means two or more than two.

The embodiments of this application provide an application icon displaying method, where the method may be applied to a terminal. According to the method provided in the embodiments of this application, when the terminal includes a cloned application of an application, an entry icon of the application may be displayed on a subscreen included on a home screen of the terminal. In this way, the following problem is avoided: when the terminal includes a plurality of cloned applications of an application, a problem that application icons on the screen of the terminal sharply increase and consequently space of the screen is occupied and a case in which the applications have cloned applications is also exposed.

It should be noted that the terminal in the embodiments of this application may be a device such as a mobile phone, a tablet computer, a desktop computer, a laptop computer, a handheld computer, a notebook computer, an ultra-mobile personal computer (UMPC), a netbook, a cellular phone, a personal digital assistant (PDA), or a wearable device. A specific form of the device is not particularly limited in the embodiments of this application.

Figure 1:
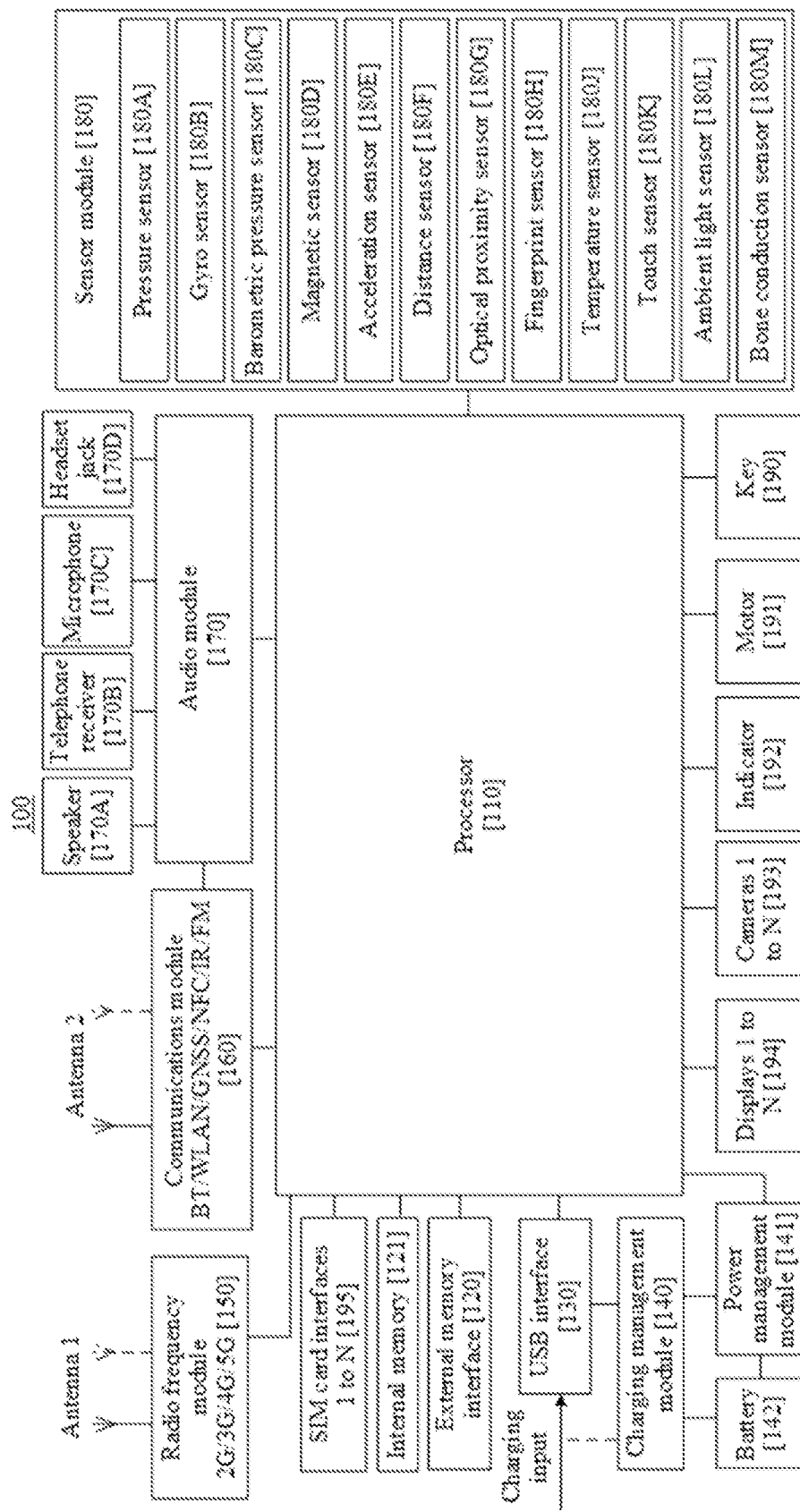
FIG. 1 is a schematic structural diagram of a mobile phone 100 according to an embodiment of this application.

Referring to FIG. 1, in an embodiment of this application, an example in which a terminal is a mobile phone 100 is used to describe the terminal provided in the embodiments of this application.

As shown in FIG. 1, the mobile phone 100 may include a processor 110, an external memory interface 120, an internal memory 121, a universal serial bus (USB) interface 130, a charging management module 140, a power management module 141, a battery 142, an antenna 1, an antenna 2, a radio frequency module 150, a communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

A person skilled in the art can understand that the schematic structure in this embodiment of this application does not constitute any limitation on the mobile phone 100. The mobile phone 100 may include more or fewer components than those shown in the figure, or some components may be combined, a combination of some components, splitting of some components, or a different arrangement of the components. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, an interface, a digital signal processor (DSP), a baseband processor, and/or a neural-network processing unit (NPU). Different processing units may be independent components, or may be integrated into one or more processors.

The controller may be a decision maker that instructs the components of the mobile phone 100 to work cooperatively according to an instruction. The controller is a nerve center and a command center of the mobile phone 100. The controller generates an operation control signal based on instruction operation code and a time sequence signal, to complete control of instruction fetching and instruction execution.

A memory may further be disposed in the processor 110, and is configured to store an instruction and data. In some embodiments, the memory in the processor 110 is a cache memory, and may store an instruction or data that has been recently used or cyclically used by the processor 110. If the processor 110 needs to use the instruction or the data again, the processor 110 may directly invoke the instruction or the data from the memory, to avoid repeated access and reduces a waiting time of the processor 110, thereby improving system efficiency.

In some embodiments, the processor 110 may include an interface. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general purpose input/output (GPIO) interface, the SIM card interface 195, the USB interface 130, and/or the like.

The I2C interface is a two-way synchronization serial bus, and includes a serial data line (SDA) and a serial clock line (SCL). In some embodiments, the processor 110 may include a plurality of groups of I2C interfaces. The processor 110 may be separately coupled to the touch sensor 180K, a charger, a flash, the camera 193, and the like through different I2C interfaces. For example, the processor 110 may be coupled to the touch sensor 180K through the I2C interface, so that the processor 110 communicates with the touch sensor 180K through the I2C interface, to implement a touch function of the mobile phone 100.

The I2S interface may be configured to perform audio communication. In some embodiments, the processor 110 may include a plurality of groups of I2S interfaces. The processor 110 may be coupled to the audio module 170 through the I2S interface, to implement communication between the processor 110 and the audio module 170. In some embodiments, the audio module 170 may transmit an audio signal to the communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the communications module 160 through the PCM bus interface. In some embodiments, the audio module 170 may alternatively transmit an audio signal to the communications module 160 through the PCM interface, to implement a function of answering a call by using a Bluetooth headset. Both the I2S interface and the PCM interface may be configured to perform audio communication, and sampling rates of the two interfaces are different.

The UART interface is a universal serial data bus, and is configured to perform asynchronous communication. The bus is a two-way communications bus, and converts to-be-transmitted data between serial communication and parallel communication. In some embodiments, the UART interface is usually configured to connect the processor 110 to the communications module 160. For example, the processor 110 communicates with a Bluetooth module through the UART interface, to implement a Bluetooth function. In some embodiments, the audio module 170 may transmit an audio signal to the communications module 160 through the UART interface, to implement a function of playing music by using a Bluetooth headset.

The MIPI may be configured to connect the processor 110 to a peripheral component such as the display 194 and the camera 193. The MIPI includes a camera serial interface (CSI), a display serial interface (DSI), and the like. In some embodiments, the processor 110 communicates with the camera 193 through the CSI, to implement a photographing function of the mobile phone 100. The processor 110 communicates with the display 194 through the DSI, to implement a display function of the mobile phone 100.

The GPIO interface may be configured by using software. The GPIO interface may be configured as a control signal or a data signal. In some embodiments, the GPIO interface may be configured to connect the processor 110 to the camera 193, the display 194, the communications module 160, the audio module 170, a sensor, and the like. The GPIO interface may also be configured as an I2C interface, an I2S interface, a UART interface, an MIPI, or the like.

The USB interface 130 may be a mini USB interface, a micro USB interface, a USB type C interface, or the like. The USB interface 130 may be configured to connect to the charger to charge the mobile phone 100, may be configured to transmit data between the mobile phone 100 and a peripheral device, or may be configured to connect to a headset to play audio by using the headset. The USB interface 130 may further be configured to connect to another terminal, for example, an AR device.

An interface connection relationship between the modules that is shown in this embodiment of this application is merely an example for description, and does not constitute any limitation on the structure of the mobile phone 100. The mobile phone 100 may use an interface connection manner different from that used in this embodiment of this application or a combination of a plurality of interface connection manners.

The charging management module 140 is configured to receive a charging input from the charger. The charger may be a wireless charger, or may be a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the mobile phone 100. While charging the battery 142, the charging management module 140 may further supply power to the mobile phone 100 by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the communications module 160, and the like. The power management module 141 may further be configured to monitor parameters such as a battery capacity, a battery cycle count, and a battery health status (electric leakage or impedance). In some embodiments, the power management module 141 may alternatively be disposed in the processor 110. In some embodiments, the power management module 141 and the charging management module 140 may alternatively be disposed in a same component.

A wireless communication function of the mobile phone 100 may be implemented by using the antenna 1, the antenna 2, the radio frequency module 150, the communications module 160, a modem, the baseband processor, and the like.

The antenna 1 and the antenna 2 are configured to transmit and receive electromagnetic wave signals. Each antenna in the mobile phone 100 may be configured to cover one or more communication frequency bands. Different antennas may further be multiplexed to improve antenna utilization. For example, a cellular network antenna may be multiplexed as a diversity antenna of a wireless local area network. In some embodiments, the antenna may be used in combination with a tuning switch.

The radio frequency module 150 may be a communications processing module that provides a solution, applied to the mobile phone 100, to wireless communication including 2G, 3G, 4G, 5G, or the like. The radio frequency module 150 may include at least one filter, a switch, a power amplifier, a low noise amplifier (LNA), and the like. The radio frequency module 150 may receive an electromagnetic wave by using the antenna 1, perform processing such as filtering or amplification on the received electromagnetic wave, and transmit a processed electromagnetic wave to the modem for demodulation. The radio frequency module 150 may further amplify a signal obtained through modulation by the modem, convert the amplified signal into an electromagnetic wave by using the antenna 1, and radiate the electromagnetic wave through the antenna 1. In some embodiments, at least some functional modules in the radio frequency module 150 may be disposed in the processor 110. In some embodiments, at least some functional modules in the radio frequency module 150 may be disposed in a same component as at least some modules in the processor 110.

The modem may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. After the low-frequency baseband signal is processed by the baseband processor, a processed low-frequency baseband signal is transmitted to the application processor. The application processor outputs a sound signal by using an audio device (which is not limited to the speaker and the telephone receiver), or displays an image or a video by using the display 194. In some embodiments, the modem may be an independent device. In some embodiments, the modem may be independent of the processor 110, and disposed in a same component as the radio frequency module 150 or another functional module.

The communications module 160 may be a communications processing module that provides a solution, applied to the mobile phone 100, to wireless communication including a wireless local area network (WLAN), Bluetooth (BT), a global navigation satellite system (GNSS), frequency modulation (FM), near field communication (NFC), an infrared (IR) technology, or the like. The communications module 160 may be one or more components integrating at least one communications processing module. The communications module 160 receives an electromagnetic wave by using the antenna 2, performs frequency modulation and filtering processing on the electromagnetic wave signal, and sends a processed signal to the processor 110. The communications module 160 may further receive a to-be-sent signal from the processor 110, perform frequency modulation and amplification on the signal, convert a processed signal into an electromagnetic wave by using the antenna 2, and radiate the electromagnetic wave through the antenna 2.

In some embodiments, the antenna 1 and the radio frequency module 150 of the mobile phone 100 are coupled, and the antenna 2 and the communications module 160 of the mobile phone 100 are coupled, so that the mobile phone 100 can communicate with a network and another device by using a wireless communications technology. The wireless communications technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 100 implements a display function by using the GPU, the display 194, the application processor, and the like. The GPU is a microprocessor for image processing, and is connected to the display 194 and the application processor. The GPU is configured to perform mathematical and geometric calculation and perform graphics rendering. The processor 110 may include one or more GPUs, and execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, during photographing, after a shutter is opened, a ray of light is transmitted to a photosensitive element of the camera through a lens, and an optical signal is converted into an electrical signal. The photosensitive element of the camera transmits the electrical signal to the ISP for processing, and the ISP converts the electrical signal into a visible image. The ISP may further perform algorithm-based optimization on noise, luminance, and a skin color of the image. The ISP may further optimize parameters such as exposure and a color temperature of a photographing scenario. In some embodiments, the ISP may be disposed in the camera 193.

The camera 193 is configured to capture a static image or a video. An object is projected to the photosensitive element through the lens to generate an optical image. The photosensitive element may be a charge coupled device (CCD) or a complementary metal-oxide-semiconductor (CMOS) phototransistor. The photosensitive element converts an optical signal into an electrical signal, and then transmits the electrical signal to the ISP. The ISP converts the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras 193, where N is a positive integer greater than 1.

The digital signal processor is configured to process a digital signal. In addition to a digital image signal, the digital signal processor may further process another digital signal. For example, when the mobile phone 100 selects a frequency, the digital signal processor is configured to perform Fourier transform on frequency energy and the like.

The video codec is configured to compress or decompress a digital video. The mobile phone 100 can support one or more types of video codecs. In this case, the mobile phone 100 can play or record videos in a plurality of encoding formats, for example, MPEG-1, MPEG-2, MPEG-3, and MPEG-4.

The NPU is a neural-network (NN) computing processor. By referring to a biological neural network structure, for example, by referring to a mode of transmission between human brain neurons, the NPU can rapidly process input information, and can further continuously perform self-learning. Applications such as intelligent cognition of the mobile phone 100, for example, image recognition, facial recognition, speech recognition, and text understanding, can be implemented by using the NPU.

The external memory interface 120 may be configured to connect to an external memory card, for example, a micro SD card, to extend a storage capability of the mobile phone 100. The external memory card communicates with the processor 110 through the external memory interface 120, to implement a data storage function, for example, storing a music file, a video file, or the like in the external memory card.

The internal memory 121 may be configured to store computer executable program code, where the executable program code includes an instruction. The processor 110 runs the instruction stored in the internal memory 121, to perform various function applications of the mobile phone 100 and data processing. The internal memory 121 may include a program storage area and a data storage area. The program storage area may store an operating system, an application required by at least one function (for example, an audio playback function or an image playback function), and the like. The data storage area may store data (for example, audio data and a phone book) created during use of the mobile phone 100, and the like.

The mobile phone 100 can implement an audio function, for example, music playback or sound recording, by using the audio module 170, the speaker 170A, the telephone receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may further be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile phone 100 may be used for listening to music or answering a hands-free call by using the speaker 170A.

The telephone receiver 170B, also referred to as an "earpiece", is configured to convert an audio electrical signal into a sound signal. When a call is answered or voice information is received by the mobile phone 100, the telephone receiver 170B may be put close to a human ear to listen to a voice.

The microphone 170C, also referred to as a "mic", is configured to convert a sound signal into an electrical signal. When making a call or sending voice information, a user may make a sound near the microphone 170C with the user's mouth to input a sound signal to the microphone 170C. At least one microphone 170C may be disposed in the mobile phone 100. In some embodiments, two microphones 170C may be disposed in the mobile phone 100, to collect a sound signal and implement a noise reduction function. In other embodiments, three, four, or more microphones 170 C may alternatively be disposed in the mobile phone 100, to collect a sound signal, implement noise reduction, and identify a sound source, so as to implement a directional sound recording function and the like.

The headset jack 170D is configured to connect to a wired headset. The headset jack 170D may be a USB interface, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates including a conducting material. When force is applied to the pressure sensor 180A, capacitance between electrodes changes. The mobile phone 100 determines pressure intensity based on the change in the capacitance. When a touch operation is performed on the display 194, the mobile phone 100 detects a strength of the touch operation by using the pressure sensor 180A. The mobile phone 100 may also obtain a touch position through calculation based on a signal detected by the pressure sensor 180A. In some embodiments, touch operations that are performed in a same touch position but have different touch operation strengths may be corresponding to different operation instructions. For example, when a touch operation whose touch operation strength less than a first pressure threshold is performed on an SMS message application icon, an instruction for viewing an SMS message is executed. When a touch operation whose touch operation strength greater than or equal to the first pressure threshold is performed on the SMS message application icon, an instruction for creating a new SMS message is executed.

The gyro sensor 180B may be configured to determine a moving posture of the mobile phone 100. In some embodiments, angular velocities of the mobile phone 100 relative to three axes (that is, x, y, and z axes) may be determined by using the gyro sensor 180B. The gyro sensor 180B may be configured to implement image stabilization during photographing. For example, when a shutter is pressed, the gyro sensor 180B detects an angle at which the mobile phone 100 jitters; and calculates, based on the angle, a distance for which a lens module needs to compensate, to allow the lens to counteract the jitter of the mobile phone 100 through reverse motion, thereby implementing image stabilization. The gyro sensor 180B may also be used in a navigation scenario and a somatic game scenario.

The barometric pressure sensor 180C is configured to measure barometric pressure. In some embodiments, the mobile phone 100 calculates an altitude by using the atmospheric pressure measured by the barometric pressure sensor 180C, to assist in positioning and navigation.

The magnetic sensor 180D includes a Hall effect sensor. The mobile phone 100 may detect opening/closing of a flip leather case by using the magnetic sensor 180D. In some embodiments, when the mobile phone 100 is a clamshell phone, the mobile phone 100 may detect opening/closing of a flip cover by using the magnetic sensor 180D. Further, a feature such as automatic unlocking implemented when the clamshell phone is flipped open is set based on a detected open/closed state of a leather case or a detected open/closed state of the flip cover.

The acceleration sensor 180E may detect magnitude of accelerations of the mobile phone 100 in various directions (usually on three axes), and may detect magnitude and a direction of gravity when the mobile phone 100 is still. The acceleration sensor 180E may further be configured to identify a posture of the mobile phone 100, and is applied to an application such as screen switching between a landscape mode and a portrait mode and a pedometer.

The distance sensor 180F is configured to measure a distance. The mobile phone 100 may measure a distance in an infrared or a laser manner. In some embodiments, in a photographing scenario, the mobile phone 100 may measure a distance by using the distance sensor 180F, to implement rapid focusing.

The optical proximity sensor 180G may include, for example, a light emitting diode (LED) and an optical detector, for example, a photodiode. The light emitting diode may be an infrared light emitting diode. Infrared light is emitted by using the light emitting diode. Infrared reflected light from a nearby object is detected by using a photodiode. When sufficient reflected light is detected, it can be determined that there is an object near the mobile phone 100. When insufficient reflected light is detected, it can be determined that there is no object near the mobile phone 100. By using the optical proximity sensor 180G, the mobile phone 100 may detect that a user holds the mobile phone 100 close to an ear during a call, to automatically turn off a screen for power saving. The optical proximity sensor 180G may also be used for automatic screen unlocking or locking in a leather case mode or a pocket mode.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the mobile phone 100 is in a pocket, to prevent touch by mistake.

The fingerprint sensor 180H is configured to collect a fingerprint. By using a feature of the collected fingerprint, the mobile phone 100 can implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor 110 nearby the temperature sensor 180J, to reduce power consumption for thermal protection.

The touch sensor 180K is also referred to as a "touch panel". The touch sensor 180K may be disposed on the display 194, and is configured to detect a touch operation performed on or near the touch sensor 180K. The touch sensor 180K may transmit the detected touch operation to the application processor to determine a type of a touch event. A visual output related to the touch operation may be provided by using the display 194.

The bone conduction sensor 180M may obtain a vibration signal. In some embodiments, the bone conduction sensor 108M may obtain a vibration signal of a vibrating bone block of a vocal-cord part of a human body. The bone conduction sensor 108M may also be in contact with pulses of a human body to receive blood pressure fluctuating signals. In some embodiments, the bone conduction sensor 108M may alternatively be disposed in a headset. The audio module 170 may obtain a voice signal by parsing the vibration signal of the vibrating bone block of the vocal-cord part obtained by the bone conduction sensor 108M, to implement a voice function. The application processor may obtain heart rate information by parsing the blood pressure fluctuating signals obtained by the bone conduction sensor 108M, to implement a heart rate detection function.

The key 190 includes an on/off key, a volume key, and the like. The key 190 may be a mechanical key, or may be a touch key. The mobile phone 100 may receive a key input, and generate a key signal input related to a user setting and function control of the mobile phone 100.

The motor 191 may generate a vibration prompt. The motor 191 may be configured to provide an incoming call vibration prompt and a touch vibration feedback. For example, touch operations performed on different applications (for example, photographing and audio playback) may be corresponding to different vibration feedback effects. Touch operations performed in different areas of the display 194 may also be corresponding to different vibration feedback effects. Different application scenarios (for example, time reminder, information receiving, an alarm clock application, and a game application) may also be corresponding to different vibration feedback effects. A touch vibration feedback effect may further be customized.

The indicator 192 may be an indicator light, and may be configured to indicate a charging status and a battery level change, or may be configured to indicate a message, a missed call, a notification, or the like.

The SIM card interface 195 is configured to connect to a SIM card. The SIM card may be inserted into the SIM card interface 195 or removed from the SIM card interface 195, to be in contact with or be separated from the mobile phone 100. The mobile phone 100 can support one or N SIM card interfaces 195, where N is a positive integer greater than 1. The SIM card interface 195 can support a nano SIM card, a micro SIM card, a SIM card, and the like. A plurality of cards may be inserted into a same SIM card interface 195. The plurality of cards may be of a same type or different types. The SIM card interface 195 may also be compatible with different types of SIM cards. The SIM card interface 195 may also be compatible with an external memory card. The mobile phone 100 interacts with a network by using a SIM card, to implement a call function, a data communication function, and the like. In some embodiments, the mobile phone 100 uses an eSIM, that is, an embedded SIM card. The eSIM card may be embedded in the mobile phone 100 and cannot be separated from the mobile phone 100.

A software system of the mobile phone 100 may use a layered architecture, an event-driven architecture, a microkernel architecture, a microservice-based architecture, or a cloud architecture. In this embodiment of this application, an Android system of a layered architecture is used as an example to describe a software structure of the mobile phone 100.

Figure 2:
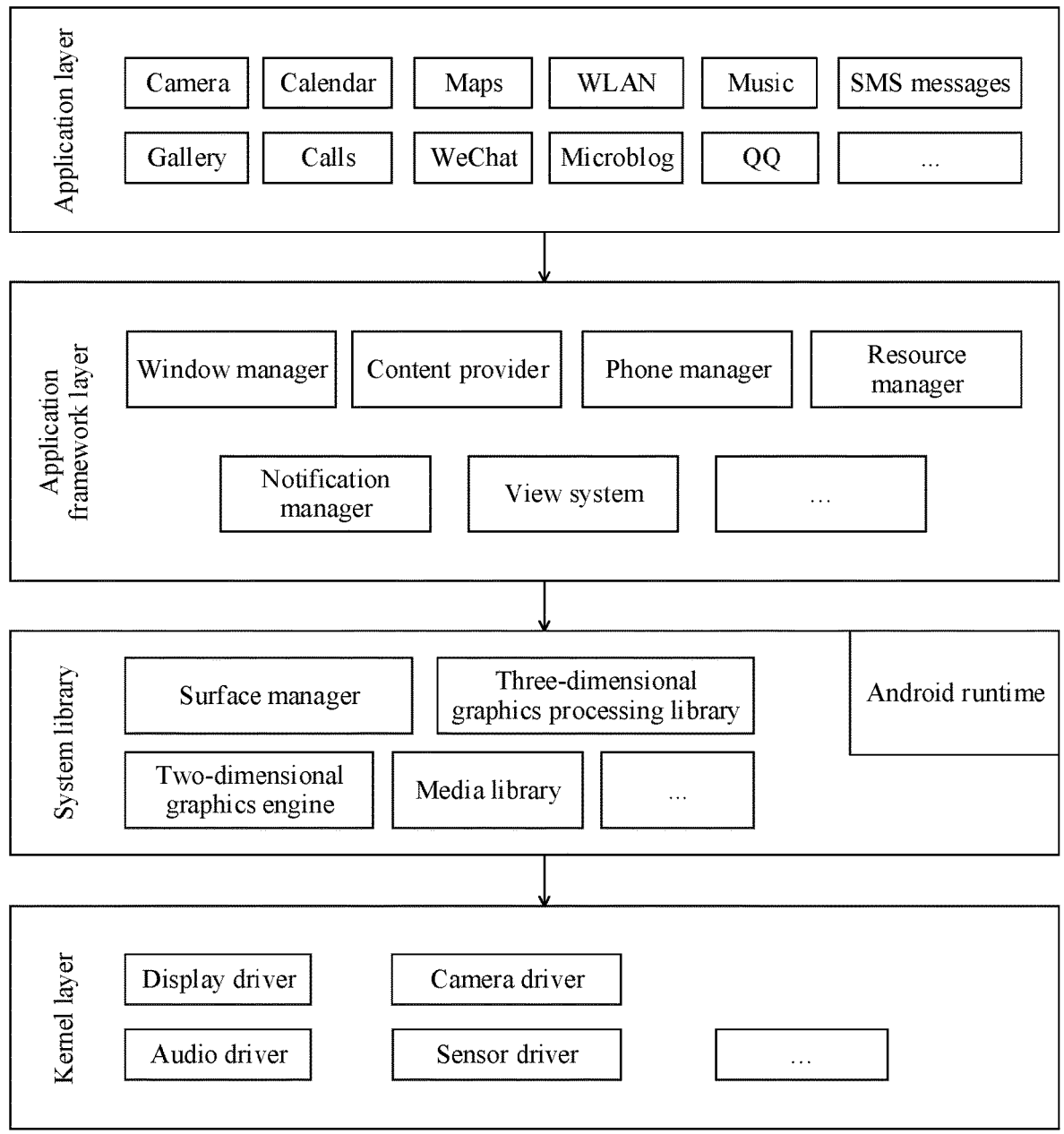
FIG. 2 is a block diagram of a software structure of a mobile phone 100 according to an embodiment of this application.

FIG. 2 is a block diagram of a software structure of a mobile phone 100 according to an embodiment of this application.

In the layered architecture, software is divided into several layers, and each layer has clear roles and tasks. The layers communicate with each other through a software interface. In some embodiments, as shown in FIG. 2, the Android system is divided into four layers from top to bottom: an application layer, an application framework layer, an Android runtime (Android runtime) and system library, and a kernel layer.

The application layer may include a series of application program packages.

As shown in FIG. 2, the application program packages may include application programs (referred to as applications for short below) such as Camera, Gallery, Calendar, Calls, Maps, WeChat, WLAN, Microblog, Music, QQ, or SMS messages. In some embodiments of this application, when the terminal includes both an application and a cloned application of the application, the application layer may call a corresponding API and a programming framework that are provided by the application framework layer, and an entry icon of the application (the entry icon may be an icon of the application, may be an icon of the cloned application of the application, or may be an icon different from an icon of the application and an icon of the cloned application of the application) is displayed on a subscreen included on a home screen of the terminal. In addition, the application layer may further display, based on an operation performed by a user on the entry icon, one or more menu bars on a screen of the terminal by calling a corresponding API and a programming framework that are provided by the application framework layer. The menu bar may include the icon of the application and/or the icon of the cloned application of the application. The menu bar may further include an add button, where the add button may be used to create the cloned application of the application.

The application framework layer provides an application programming interface (API) and a programming framework for an application at the application layer. In some embodiments of this application, the application framework layer may provide, for the application layer, an API and a programming framework that are used to display the foregoing entry icon, and may further provide, for the application layer, an API, a programming framework, and the like that are used to display one or more menu bars.

The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a display size, determine whether there is a status bar, perform screen locking, take a screenshot, and the like.

The content provider is configured to: store and obtain data, and enable the data to be accessible by an application program. The data may include a video, an image, audio, calls that are made and answered, a browsing history and a bookmark, a phone book, and the like.

The view system includes visual controls, for example, a control for text display or a control for image display. The view system may be configured to construct an application program. A display interface may include one or more views. For example, a display interface including an SMS message notification icon may include a text display view and an image display view.

The phone manager is configured to provide a communication function of the mobile phone 100, for example, management of a call status (including connected, hanged up, and the like).

The resource manager provides applications with various resources such as a localized character string, an icon, an image, a layout file, and a video file.

The notification manager enables an application program to display notification information in a status bar, and may be configured to convey a notification type message. The notification manager may automatically disappear after a short pause without requiring a user interaction. For example, the notification manager is configured to notify that download is completed and provide a message alert. The notification manager may further provide a notification that appears in a top status bar of the system in a form of a chart or a scroll bar text, for example, a notification of an application program running in a background, or may be a notification that appears on a screen in a form of a dialog box. For example, text information is displayed in the status bar, a prompt sound is provided, the mobile phone vibrates, or an indicator light blinks.

The Android runtime includes a core library and a virtual machine. The Android runtime is responsible for scheduling and managing the Android system.

The core library includes two parts: one part is a functional function that needs to be invoked in a Java language, and the other part is an Android core library.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library OpenGL ES, and a 2D graphics engine SGL.

The surface manager is configured to manage a display subsystem, and provide fusion of 2D and 3D layers for a plurality of application programs.

The media library supports playback and recording of audio and videos in a plurality of commonly used formats, and supports a static image file and the like. The media library can support a plurality of audio and video encoding formats, such as MPEG-4, H.264, MP3, AAC, AMR, JPG, and PNG.

The OpenGL ES is configured to implement three-dimensional graphics drawing, image rendering, composition, layer processing, and the like.

The SGL is a drawing engine for 2D drawing.

The kernel layer is a layer between hardware and software. The kernel layer includes at least a display driver, a camera driver, an audio driver, and a sensor driver.

All technical solutions in the following embodiments may be implemented in a terminal (for example, the mobile phone 100) having the foregoing hardware architecture and software architecture.

In the embodiments of this application, a user may create a cloned application of an application in the terminal. When the terminal includes both the application and the cloned application of the application, in the terminal, an entry icon of the application may be disposed on a home screen of the terminal, to avoid a problem that application icons on the home screen of the terminal sharply increase and consequently space of the home screen is occupied. The home screen of the terminal includes a plurality of subscreens, and the entry icon is displayed on one of the subscreens. When detecting that the user performs a preset operation on the entry icon, the terminal may display a hidden icon (for example, when the entry icon is an icon of the application, the hidden icon is an icon of the cloned application of the application). In addition, when detecting the preset operation performed by the user, the terminal may further display an add button used to create the cloned application of the application. The add button and the hidden icon may be included in a same menu bar corresponding to the application, or may be included in different menu bars corresponding to the application.

The following describes in detail the application icon displaying method in the embodiments of this application based on different application scenarios.

First application scenario: The add button and the hidden icon are included in different menu bars corresponding to the application. In addition, the user performs different operations to trigger the terminal to display the different menu bars.

Figure 3:
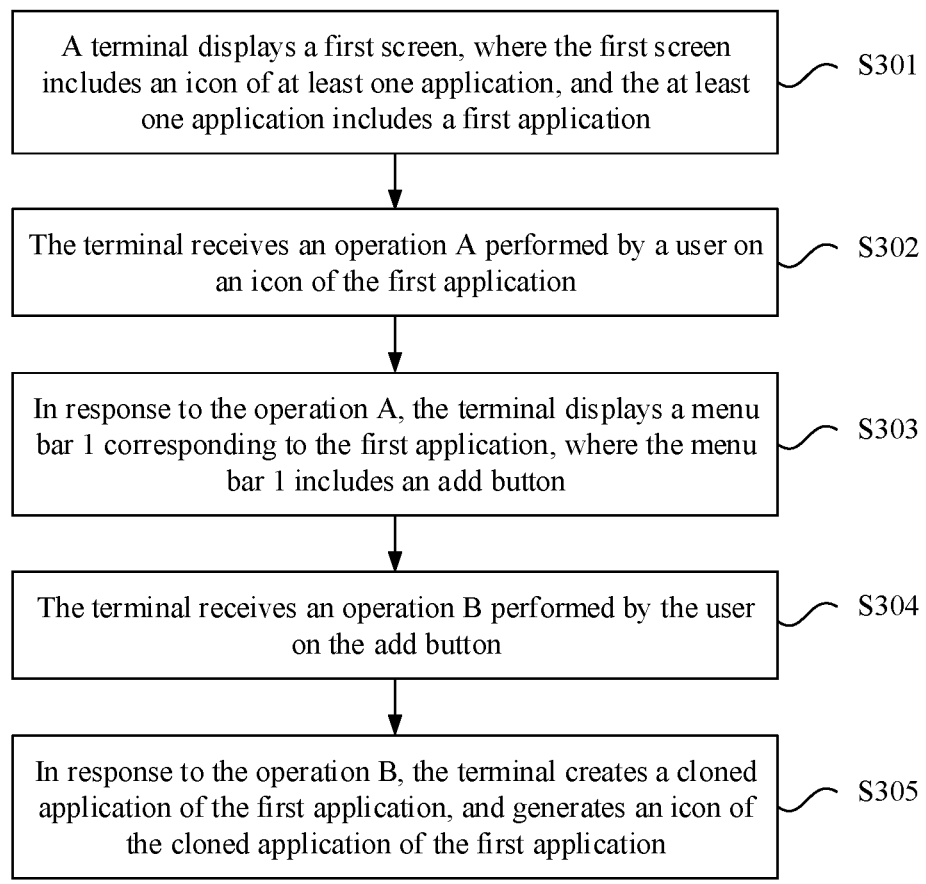
FIG. 3 is a schematic flowchart of an application icon displaying method according to an embodiment of this application.

In the first application scenario, as shown in FIG. 3, an application icon displaying method provided in an embodiment of this application may include S301 to S305.

S301. A terminal displays a first screen, where the first screen includes an icon of at least one application, and the at least one application includes a first application.

For example, the terminal may include one or more applications, and display icons of these applications on the home screen of the terminal. The home screen (home screen) of the terminal may also be referred to as a desktop. The home screen may include one or more subscreens. The user may perform switching between a leftward sliding operation and a rightward sliding operation to display different subscreens. The first application may be any one of the applications included in the terminal. The application may be a system application, or may be a third-party application. The first screen may be any subscreen included on the home screen of the terminal.

Figure 4:
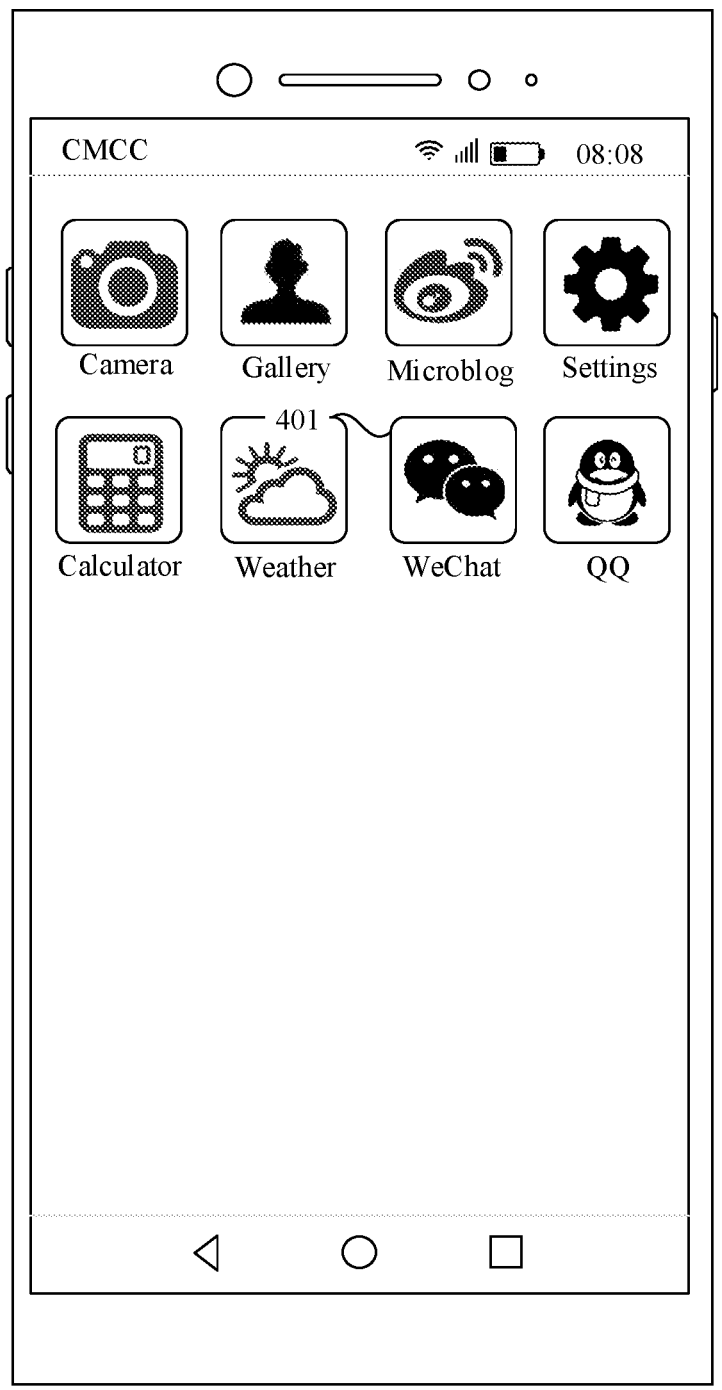
FIG. 4 is a schematic diagram of a display interface of an application icon according to an embodiment of this application.

For example, the applications included in the terminal include Camera, Gallery, Microblog, Settings, Calculator, Weather, WeChat, and QQ. As shown in FIG. 4, a camera icon, a Gallery icon, a microblog icon, a settings icon, a calculator icon, a weather icon, a WeChat icon, and a QQ icon are displayed on a subscreen of the home screen of the terminal. The first application may be any one of Camera, Gallery, Microblog, Settings, Calculator, Weather, WeChat, and QQ. The following uses an example in which the first application is WeChat. As shown in FIG. 4, the WeChat icon 401 is displayed on the subscreen included on the home screen of the terminal.

S302. The terminal receives an operation A performed by the user on an icon of the first application.

The operation A may be used to trigger the terminal to display an add button. The add button is used to create a cloned application of the first application. The operation A may be an operation different from an operation (for example, a tap operation) of enabling the first application (for example, WeChat). For example, the operation A may be any one of a touch and hold operation, a sliding operation, and a double-tap operation. When the operation A is a sliding operation, the sliding operation may be specifically a sliding operation whose start point is the icon of the first application, and a sliding direction of the sliding operation may be any one of a rightward direction, a leftward direction, an upward direction, a downward direction, and the like.

It should be noted that the operation A may be a second operation in this application S303. In response to the operation A, the terminal displays a menu bar 1 corresponding to the first application, where the menu bar 1 includes the add button.

It should be noted that the menu bar 1 may be a second menu bar in this application.

S304. The terminal receives an operation B performed by the user on the add button.

The operation B is used to trigger the terminal to create the cloned application of the first application. The operation B may be a tap operation. It should be noted that the operation B may be a third operation in this application.

S305. In response to the operation B, the terminal creates the cloned application of the first application, and generates an icon of the cloned application of the first application.

For example, when the user wants to create the cloned application of the first application, the user may perform the operation A on the icon, displayed on a subscreen included on the home screen of the terminal, of the first application. In response to the operation A, the terminal may display the menu bar 1 corresponding to the first application, where the menu bar 1 includes the add button. The menu bar 1 may be considered as a POP window of the first application, and may be displayed on an upper side, a lower side, a left side, or a right side of the icon of the first application, or may be overlaid and displayed on the icon of the first application. The user may perform the operation B on the add button, for example, a tap operation. In response to the operation B, the terminal may create the cloned application of the first application, and generate the icon of the cloned application of the first application. It should be noted that the menu bar 1 may be the second menu bar in this application.

In this embodiment of this application, after the user performs an operation different from a tap operation on the icon, displayed on the subscreen included on the home screen of the terminal, of the first application, the terminal displays the add button used to create the cloned application of the first application, so that a process of creating the cloned application is simplified, and user experience is improved.

Figure 5A:
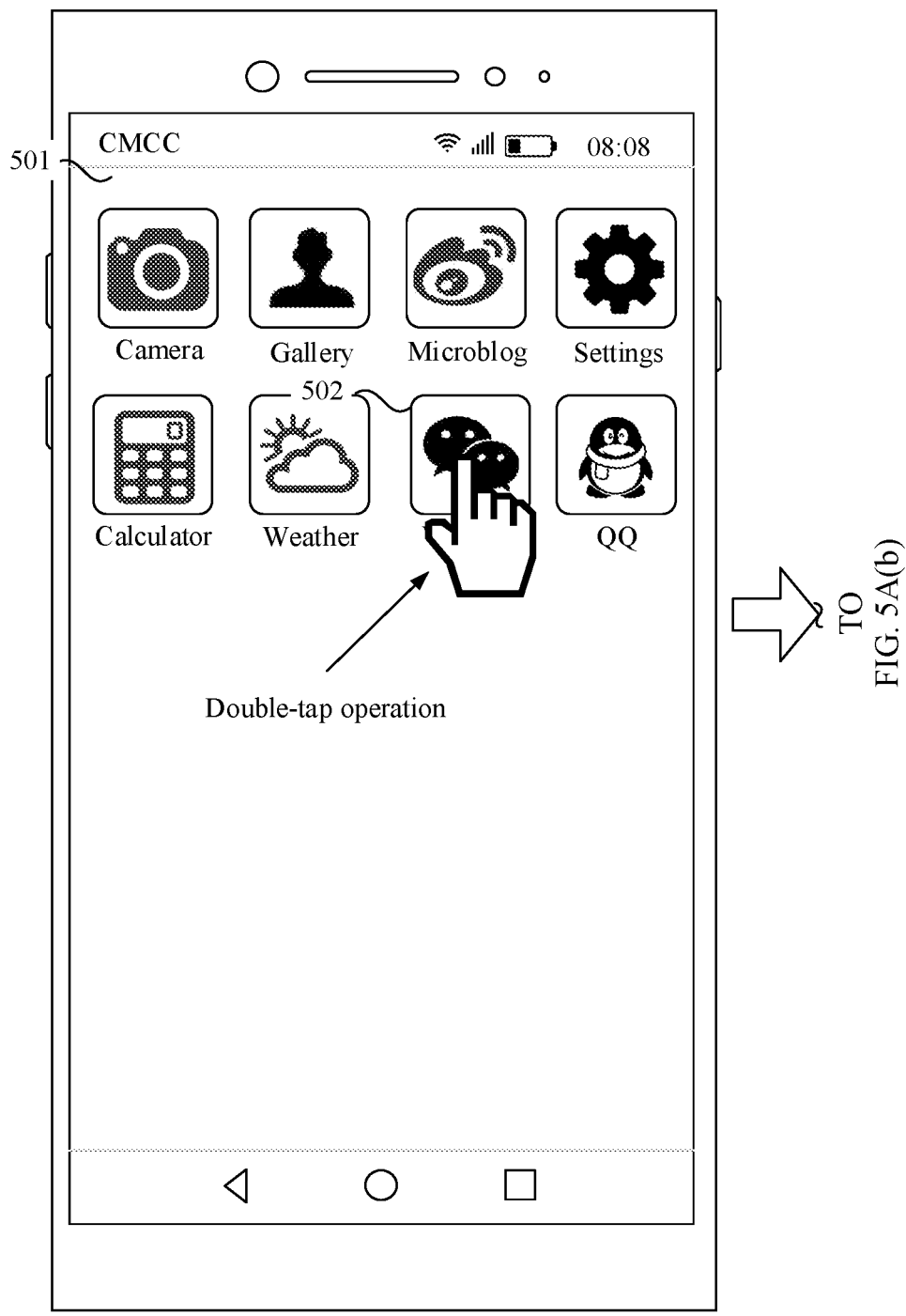
FIG. 5A(a), FIG. 5A(b), FIG. 5A(c), and FIG. 5A(d) are schematic diagrams of display interfaces of another application icon according to an embodiment of this application.
Figure 5A:
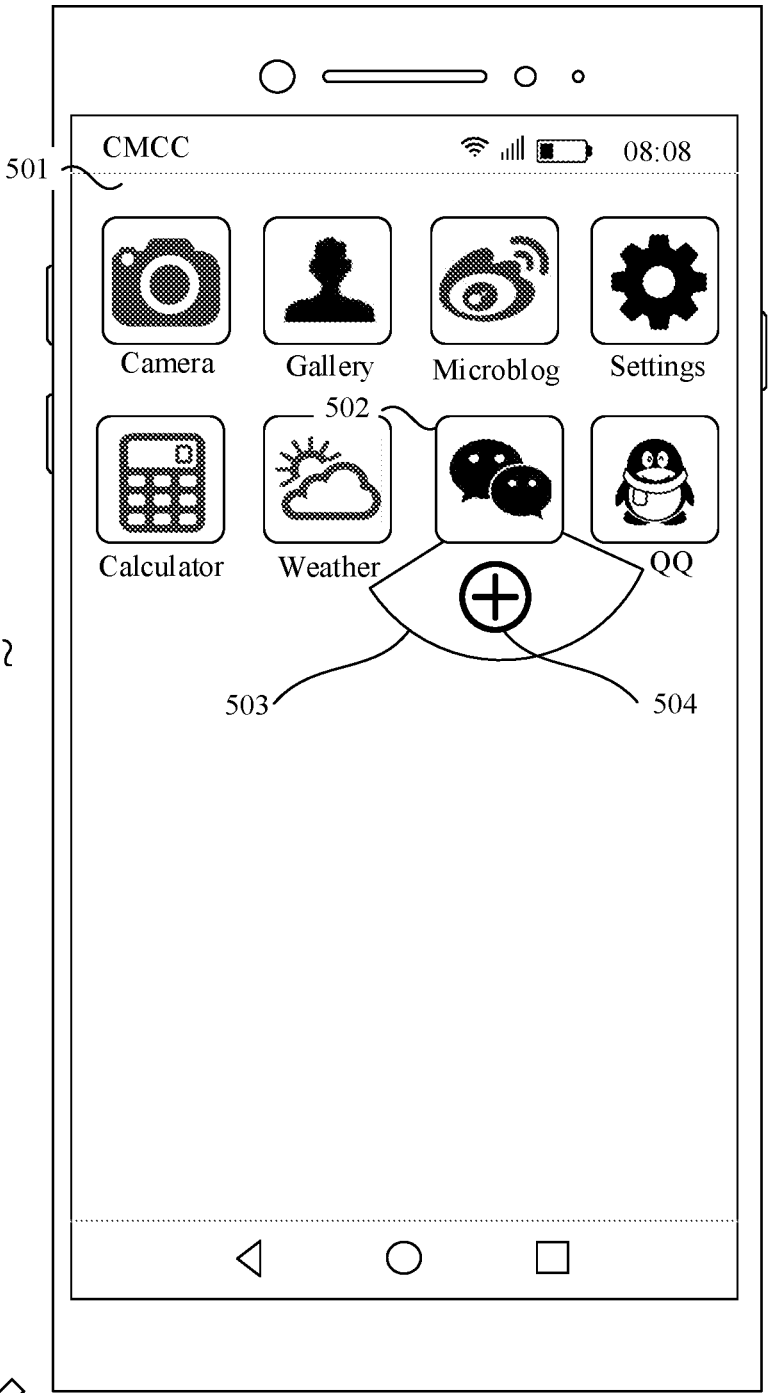
Figure 5A:
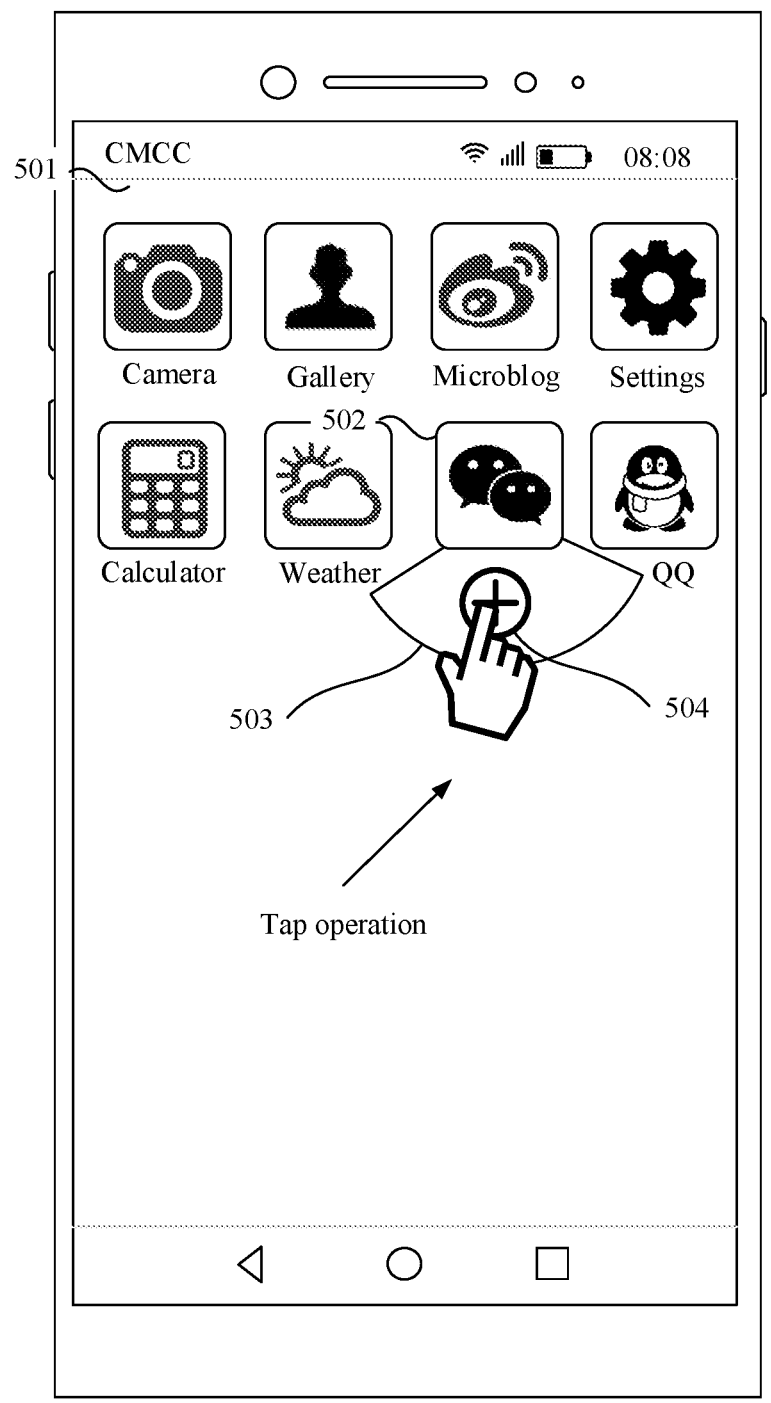
Figure 5A:
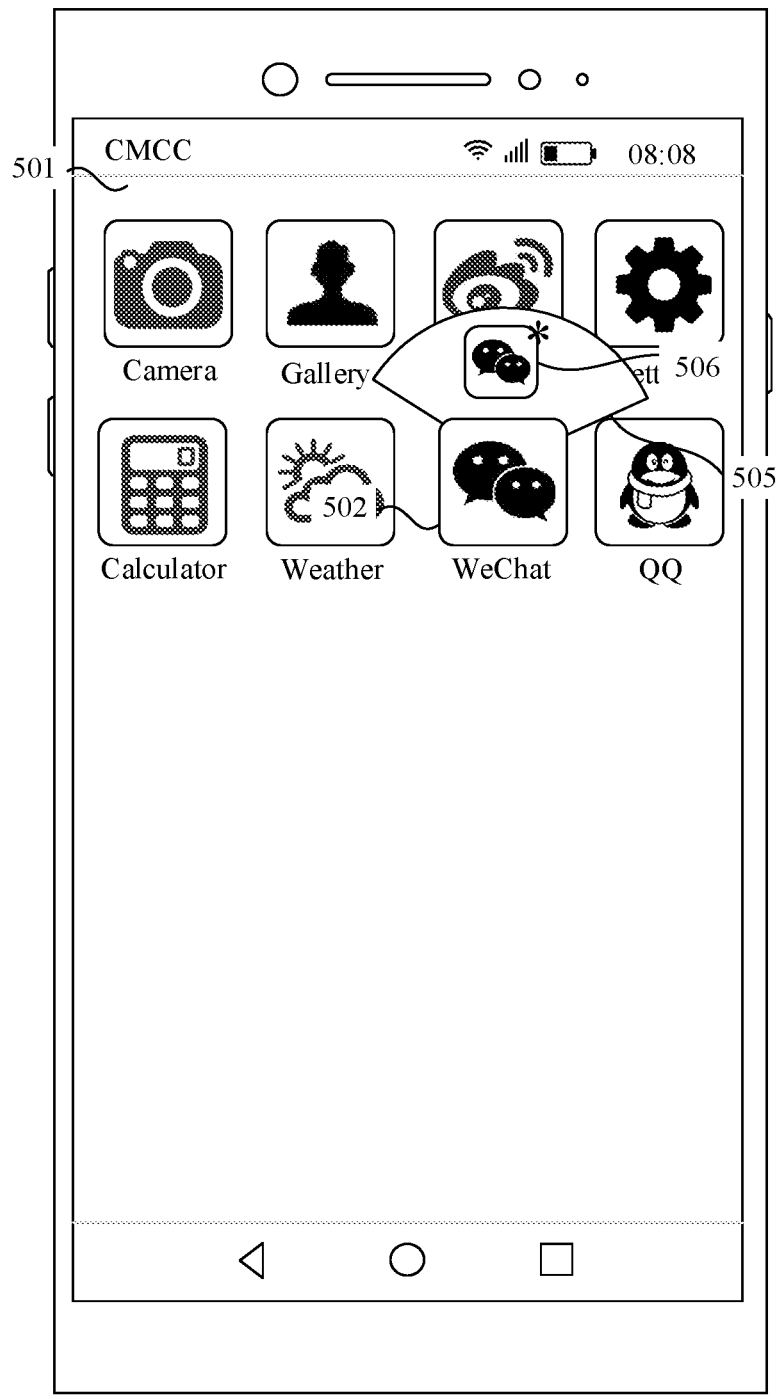

For example, with reference to FIG. 4, as shown in FIG. 5A(a), FIG. 5A(b), FIG. 5A(c), and FIG. 5A(d), an example in which the first application is WeChat, the operation A is a double-tap operation, and the operation B is a tap operation is used for detailed description. As shown in FIG. 5A(a), when the user wants to create a cloned application of WeChat, the user may perform a double-tap operation on a WeChat icon 502 displayed on a subscreen 501 included on the home screen of the terminal. In response to the double-tap operation, as shown in FIG. 5A(b), the terminal displays a menu bar 503 on a lower side of the WeChat icon 502. The menu bar 503 includes an add button 504 used to create the cloned application of WeChat. As shown in FIG. 5A(c), the user may perform a tap operation on the add button 504. In response to the tap operation, the terminal may create the cloned application of WeChat, and generate an icon of the cloned application of WeChat. Optionally, after the user performs the tap operation on the add button 504, the menu bar 503 may automatically disappear.

In this embodiment of this application, a display manner of the icon of the cloned application of the first application may be the same as or different from a display manner of the icon of the first application. For example, the icon of the cloned application of the first application and the icon of the first application are displayed in different colors; or the icon of the cloned application of the first application has one more special mark than the icon of the first application. For example, "*" is added to an upper left corner or an upper right corner of the icon of the cloned application of the first application. For example, an icon 506 shown in FIG. 5A(d) may be included in a menu bar 505. In addition, in some embodiments of this application, a mark "clone 1" (the mark "clone 1" may also be referred to as a name of the cloned application of the first application) may be added to the icon of the cloned application of the first application, to identify the icon of the cloned application of the first application from the icon of the first application. Similarly, if the terminal further includes a second cloned application of the first application, an icon of the second cloned application of the first application may further be marked by "clone 2", to identify the icon of the second cloned application of the first application from the icon of the first application and the icon of the first cloned application of the first application. It should be noted that the foregoing marks such as "clone 1" and "clone 2" may be defined by the user, or may be automatically generated by the terminal.

Figure 5B:
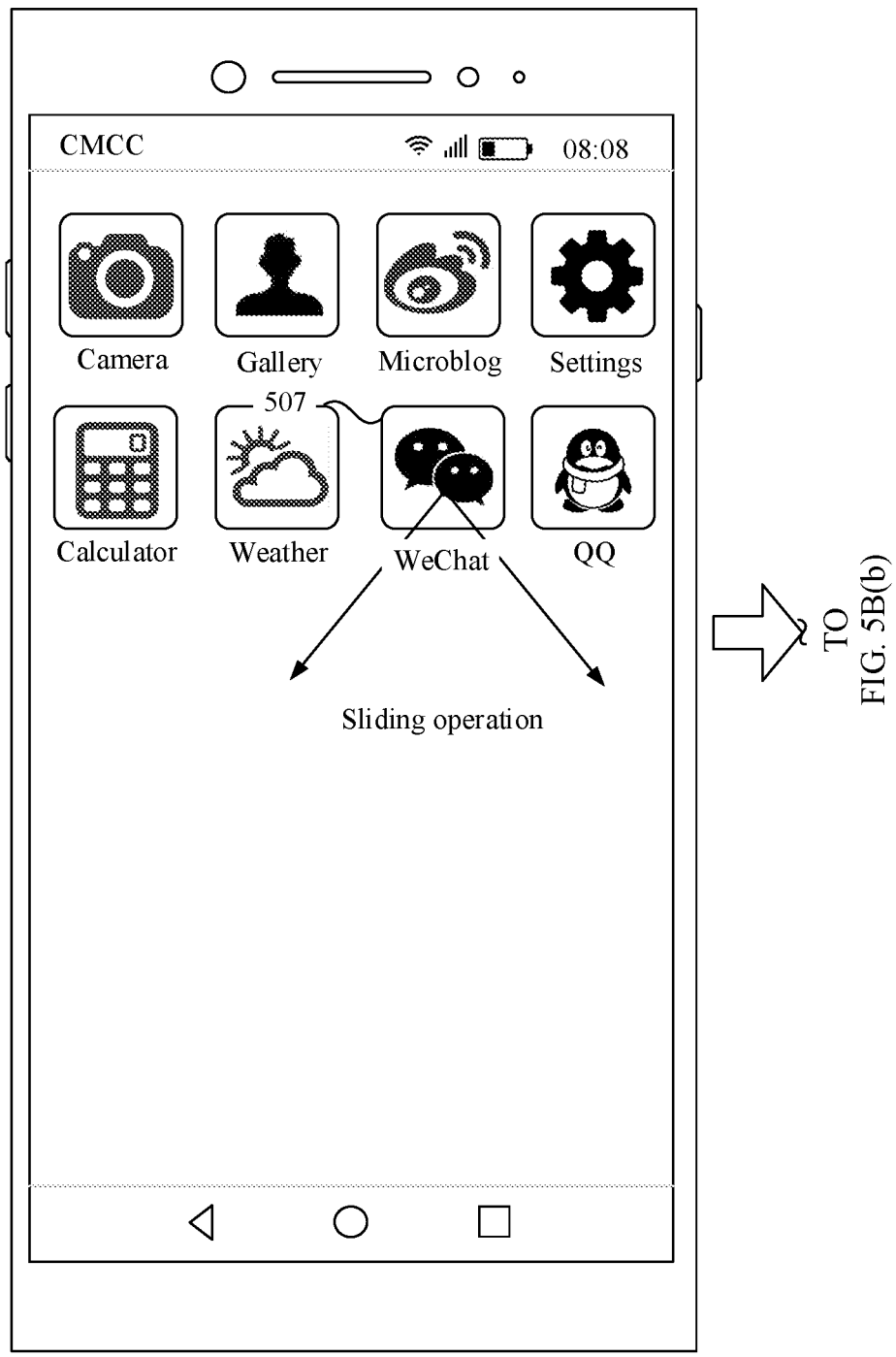
FIG. 5B(a) and FIG. 5B(b) are schematic diagrams of display interfaces of still another application icon according to an embodiment of this application.
Figure 5B:
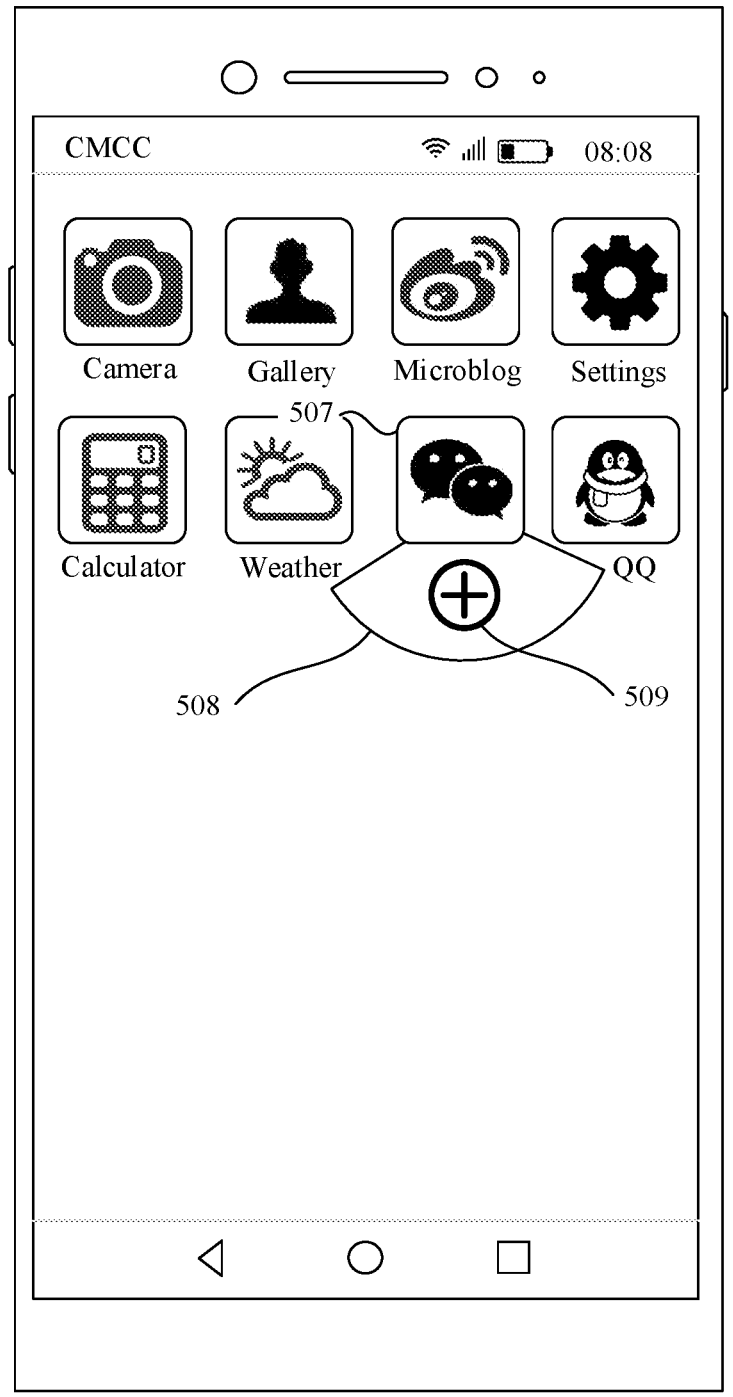
Figure 6:
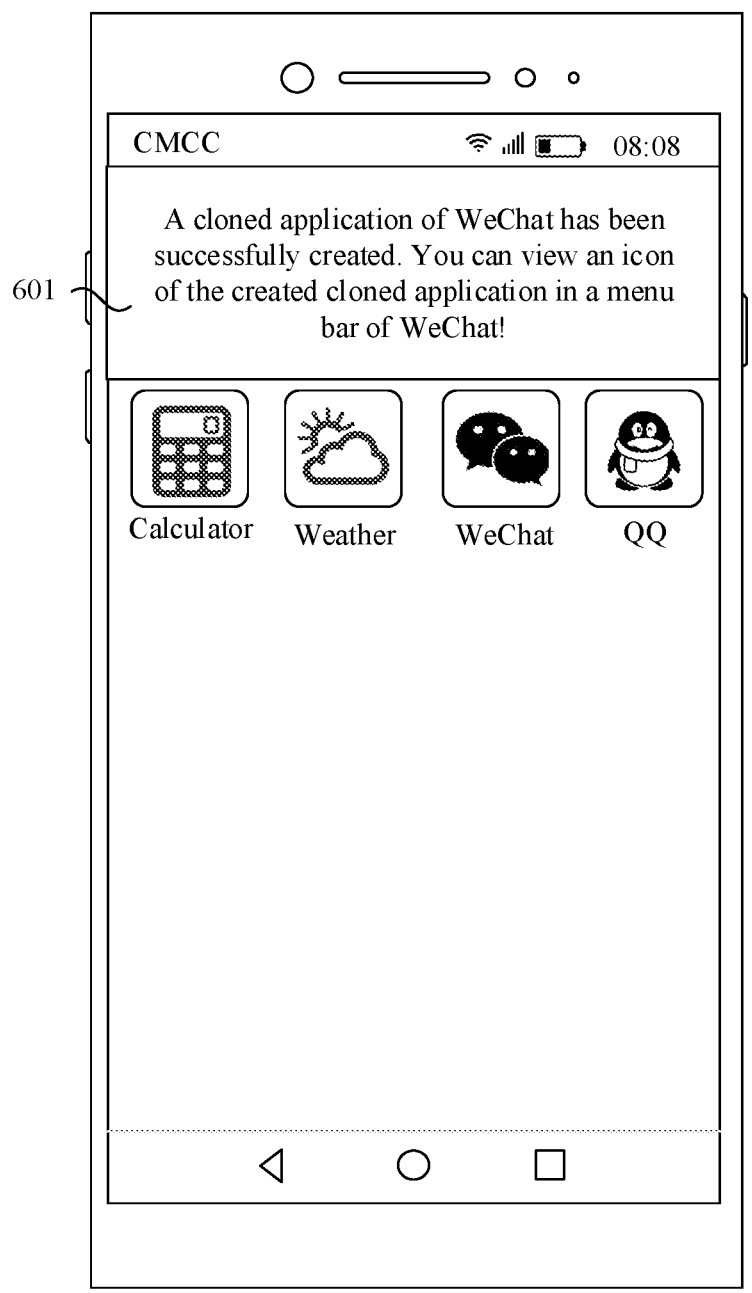
FIG. 6 is a schematic diagram of a display interface of still another application icon according to an embodiment of this application.

For another example, with reference to FIG. 4, as shown in FIG. 5B(a) and FIG. 5B(b), an example in which the first application is WeChat, the operation A is a sliding operation, and the operation B is a tap operation is used for detailed description. The user may use one or more fingers to perform the sliding operation. For example, the user performs the sliding operation by using two fingers. As shown in FIG. 5B(a), when the user wants to create a cloned application of WeChat, the user may use two fingers to perform, in a direction shown in FIG. 5B(a), a sliding operation by using a WeChat icon 507 displayed on a subscreen included on the home screen of the terminal, as a start point. In response to the sliding operation, as shown in FIG. 5B(b), the terminal displays a menu bar 508 on a lower side of the WeChat icon 507. The menu bar 508 includes an add button 509 used to create the cloned application of WeChat. The user may perform a tap operation on the add button 509. In response to the tap operation, the terminal may create the cloned application of WeChat, and generate an icon of the cloned application of WeChat. It can be understood that when the user wants to create the cloned application of WeChat, the user may use two fingers to perform, in the direction shown in FIG. 5B(a), a bifurcated sliding operation by using the WeChat icon 507 displayed on the subscreen included on the home screen of the terminal, as the start point. In response to the sliding operation, the terminal creates the cloned application of WeChat, and generates the icon of the cloned application of WeChat. To be specific, the terminal may directly display the icon 506 in FIG. 5A(d) without displaying an add button, or directly inform that the cloned application is successfully created (as shown in FIG. 6).

For example, a specific process in which the terminal creates the cloned application of the first application may be as follows: After receiving the operation B, for example, a tap operation, performed by the user on the add button corresponding to the first application, the terminal may determine whether there is an available cloned user. The cloned user may refer to data space created for the cloned application, and the data space is used to carry running of a cloning process and storage of data. Cloned applications of different applications can share a same cloned user, and cloned applications of a same application cannot share a same cloned user. If there is an available cloned user, the terminal may install the cloned application of the first application in the cloned user. If there is no available cloned user, the terminal may first create a cloned user, and install the cloned application of the first application in the successfully created cloned user.

In some embodiments of this application, to save space of the home screen of the terminal and protect user privacy, when the cloned application of the first application is successfully created, an entry icon corresponding to the first application may be displayed on a subscreen included on the home screen of the terminal, the icon of the first application and/or the icon of the cloned application of the first application are/is hidden. When detecting a preset operation performed by the user on the entry icon, the terminal may display the hidden icon. The entry icon may be the icon of the first application, and correspondingly the hidden icon is the icon of the cloned application of the first application. Alternatively, the entry icon may be the icon of the cloned application of the first application, and correspondingly the hidden icon is the icon of the first application. Alternatively, the entry icon may be an icon that is different from the icon of the first application and the icon of the cloned application of the first application, and correspondingly the hidden icon is the icon of the first application and the icon of the cloned application of the first application. No limitation is set thereto in this embodiment of this application.

In a possible implementation, it is assumed that the entry icon displayed on the subscreen included on the home screen of the terminal is the icon of the first application. In a process of creating the cloned application of the first application, after the cloned application of the first application is successfully created and the icon of the cloned application of the first application is successfully generated, the icon, displayed on the subscreen included on the home screen of the terminal, of the first application may not change. In this way, a case in which the application has the cloned application is not exposed, and user privacy can be protected. When the user needs to view the cloned application, the user needs to enter a preset operation to view the icon of the cloned application. For example, the first application is WeChat. As shown in FIG. 4, before and after a cloned application of WeChat is successfully created, a WeChat icon is shown by 401, and does not change. It can be understood that, in a process of creating the cloned application of WeChat, if the cloned application is successfully created, the menu bar 505 and the icon 506 in FIG. 5A(d) may alternatively be displayed, so that the user learns that the cloned application of WeChat is successfully created. If the terminal receives, after preset duration expires, no operation performed by the user on the icon 506, the terminal may hide the menu bar 505 and the icon 506, or after the terminal receives a user operation within preset duration and displays another interface in response to the operation, when the terminal displays again the subscreen included on the home screen, the menu bar 505 and the icon 506 are hidden. Alternatively, to make the user learn whether the cloned application of WeChat has been successfully created, as shown in FIG. 6, after the cloned application of WeChat is successfully created, the terminal may display a prompt box 601. The prompt box 601 is used to inform the user that the cloned application of WeChat has been created. When the cloned application of WeChat fails to be created, the terminal may alternatively display a prompt box, to inform the user that the cloned application fails to be created. In addition, in this implementation, the icon of the cloned application of the first application may be viewed in a menu bar 2 corresponding to the first application. Alternatively, the terminal may inform, by using the prompt box 601, the user that the icon of the created cloned application may be viewed in the menu bar corresponding to the first application.

Figure 7:
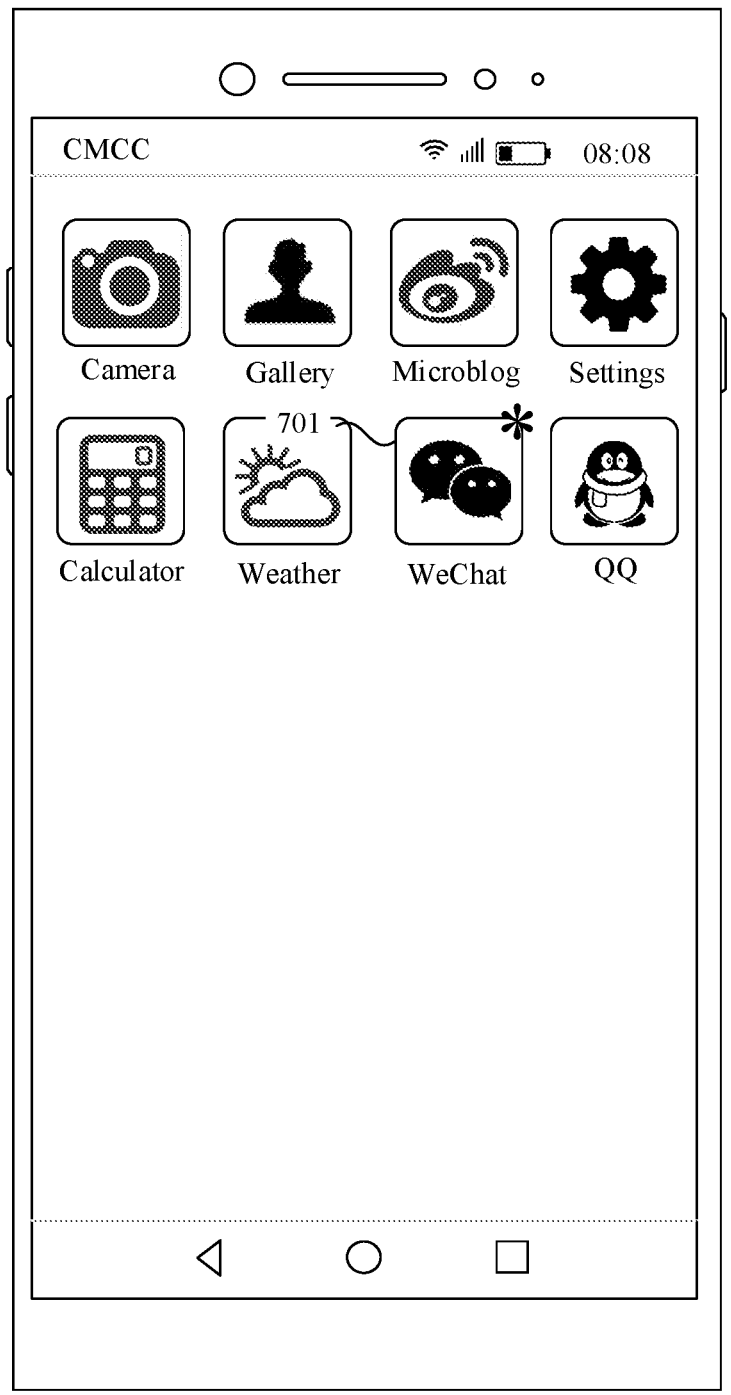
FIG. 7 is a schematic diagram of a display interface of still another application icon according to an embodiment of this application.

In another possible implementation, it is assumed that the entry icon displayed on the subscreen included on the home screen of the terminal is the icon of the cloned application of the first application. In a process of creating the cloned application of the first application, after the cloned application of the first application is successfully created and the icon of the cloned application of the first application is successfully generated, a display process of the entry icon of the first application may specifically be as follows: The terminal may replace the icon, displayed on the subscreen included on the home screen of the terminal, of the first application with the icon of the cloned application of the first application. For example, the first application is WeChat, and a display manner of the icon of the first application is different from that of the icon of the cloned application of the first application. As shown in FIG. 4 and FIG. 7, before a cloned application of WeChat is created, a WeChat icon is displayed on the subscreen included on the home screen and is shown by 401. After the cloned application of WeChat is successfully created, an icon of the cloned application of WeChat is displayed on the subscreen included on the home screen and is shown by 701. In other words, in contrast to the icon 401, "*" is added to an upper right corner of the icon 701. When the user needs to view WeChat, the user needs to enter a preset operation to view the WeChat icon. Optionally, the terminal may display a prompt box after the cloned application of WeChat is successfully created, to inform the user that the cloned application of WeChat has been created. When the cloned application of WeChat fails to be created, the terminal may alternatively display a prompt box, to inform the user that the cloned application fails to be created. In addition, in this possible implementation, the icon of the first application may be viewed in a menu bar 2 corresponding to the first application. Alternatively, the terminal may inform, by using the prompt box, the user that the icon of the first application may be viewed in the menu bar corresponding to the first application.

In still another possible implementation, it is assumed that the entry icon displayed on the subscreen included on the home screen of the terminal is an icon that is different from the icon of the first application and the icon of the cloned application of the first application. In a process of creating the cloned application of the first application, after the cloned application of the first application is successfully created and the icon of the cloned application of the first application is successfully generated, a display process of the entry icon of the first application may be specifically as follows: The terminal may replace the icon, displayed on the subscreen included on the home screen of the terminal, of the first application with the entry icon. When the user needs to view the first application (or the cloned application of the first application), the user needs to enter a preset operation to view the icon of the first application (or the icon of the cloned application of the first application). Optionally, the terminal may display a prompt box after the cloned application of the first application is successfully created, to inform the user that the cloned application of the first application has been created. When the cloned application of the first application fails to be created, the terminal may alternatively display a prompt box, to inform the user that the cloned application fails to be created. In addition, in this possible implementation, the icon of the first application and the icon of the cloned application of the first application may be viewed in a same menu bar 2 or different menu bars 2 corresponding to the first application. Alternatively, the terminal may inform, by using the prompt box, the user that the icon of the first application and the icon of the cloned application of the first application may be viewed in the menu bar corresponding to the first application.

Figure 8:
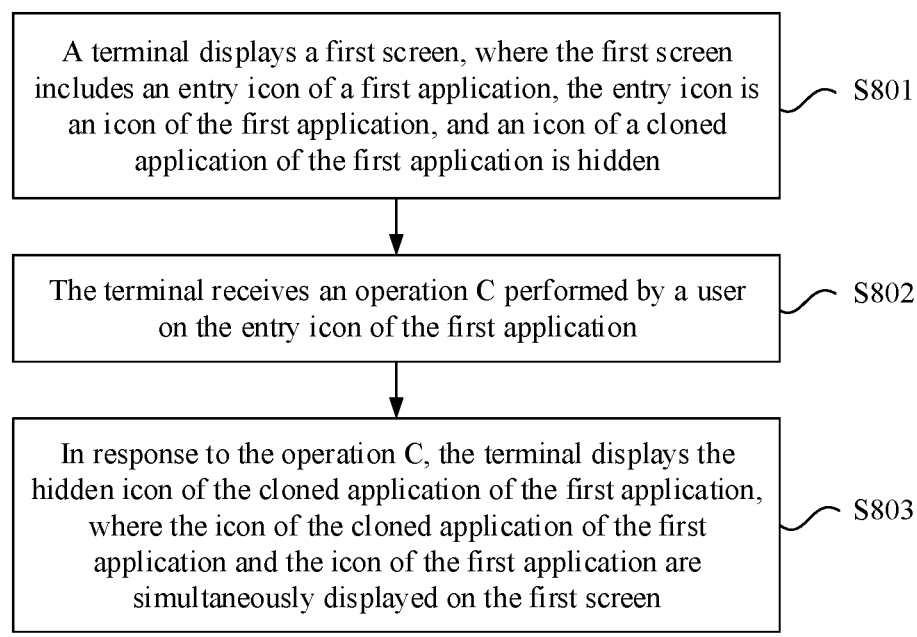
FIG. 8 is a schematic flowchart of another application icon displaying method according to an embodiment of this application.

With reference to FIG. 8, by using an example in which the entry icon displayed on the subscreen included on the home screen of the terminal is the icon of the first application after the cloned application of the first application is created, the following describes in detail how to view a hidden icon (that is, the icon of the cloned application of the first application). It should be noted that, when the entry icon is the icon of the cloned application of the first application or an icon that is different from the icon of the first application and the icon of the cloned application, for an execution process of viewing a hidden icon, reference may be made to the method provided in the embodiment shown in FIG. 8. Details are not described again in this embodiment of this application.

As shown in FIG. 8, an application icon displaying method provided in an embodiment of this application may include S801 to S803.

S801. A terminal displays a first screen, where the first screen includes an entry icon of a first application, the entry icon is an icon of the first application, and an icon of a cloned application of the first application is hidden.

The first screen is a subscreen of a home screen of the terminal. That an icon of a cloned application of the first application is hidden may mean: The icon of the cloned application of the first application is not displayed on the first screen of the terminal, and the icon of the cloned application of the first application is not displayed on another subscreen of the home screen of the terminal either.

S802. The terminal receives an operation C performed by a user on the entry icon of the first application.

The operation C is used to trigger the terminal to display the icon of the cloned application of the first application. The operation C may be an operation different from the operation A and a tap operation. For example, the operation C may be any one of a touch and hold operation, a sliding operation, and a double-tap operation. When the operation C is a sliding operation, the sliding operation may be specifically a sliding operation whose start point is the icon of the first application, and a sliding direction of the sliding operation may be any one of a rightward direction, a leftward direction, an upward direction, a downward direction, and the like. Certainly, both the operation A and the operation C may be sliding operations, but a difference between the two operations lies in that sliding directions of the two operations are different. For example, both the operation A and the operation C are sliding operations, but a sliding direction of the operation A is a downward direction and a sliding direction of the operation C is an upward direction.

It should be noted that the operation C may be a first operation in this application.

S803. In response to the operation C, the terminal displays the hidden icon of the cloned application of the first application, where the icon of the cloned application of the first application and the icon of the first application are simultaneously displayed on the first screen.

Figure 9A:
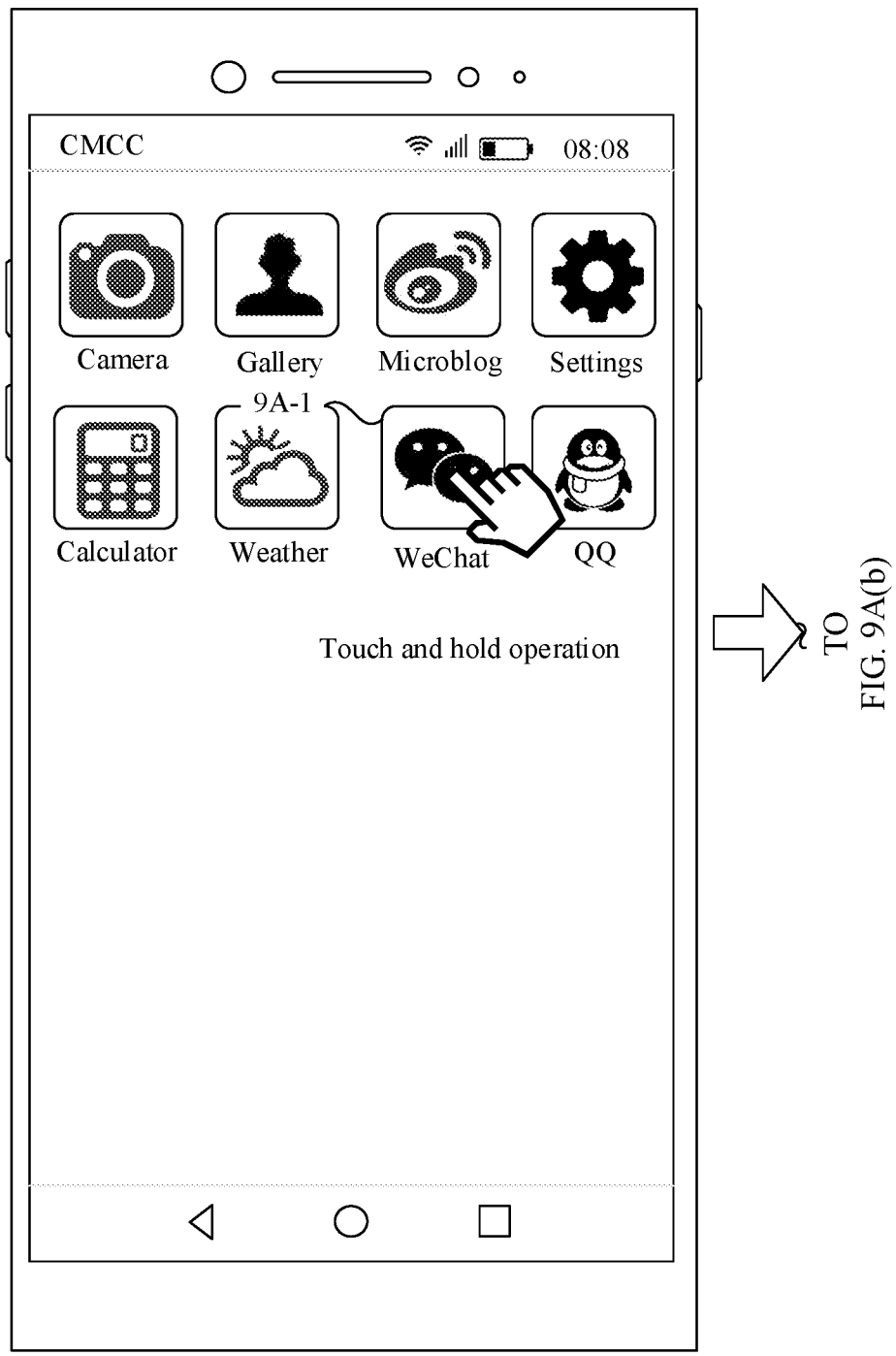
FIG. 9A(a) and FIG. 9A(b) are schematic diagrams of display interfaces of still another application icon according to an embodiment of this application.
Figure 9A:
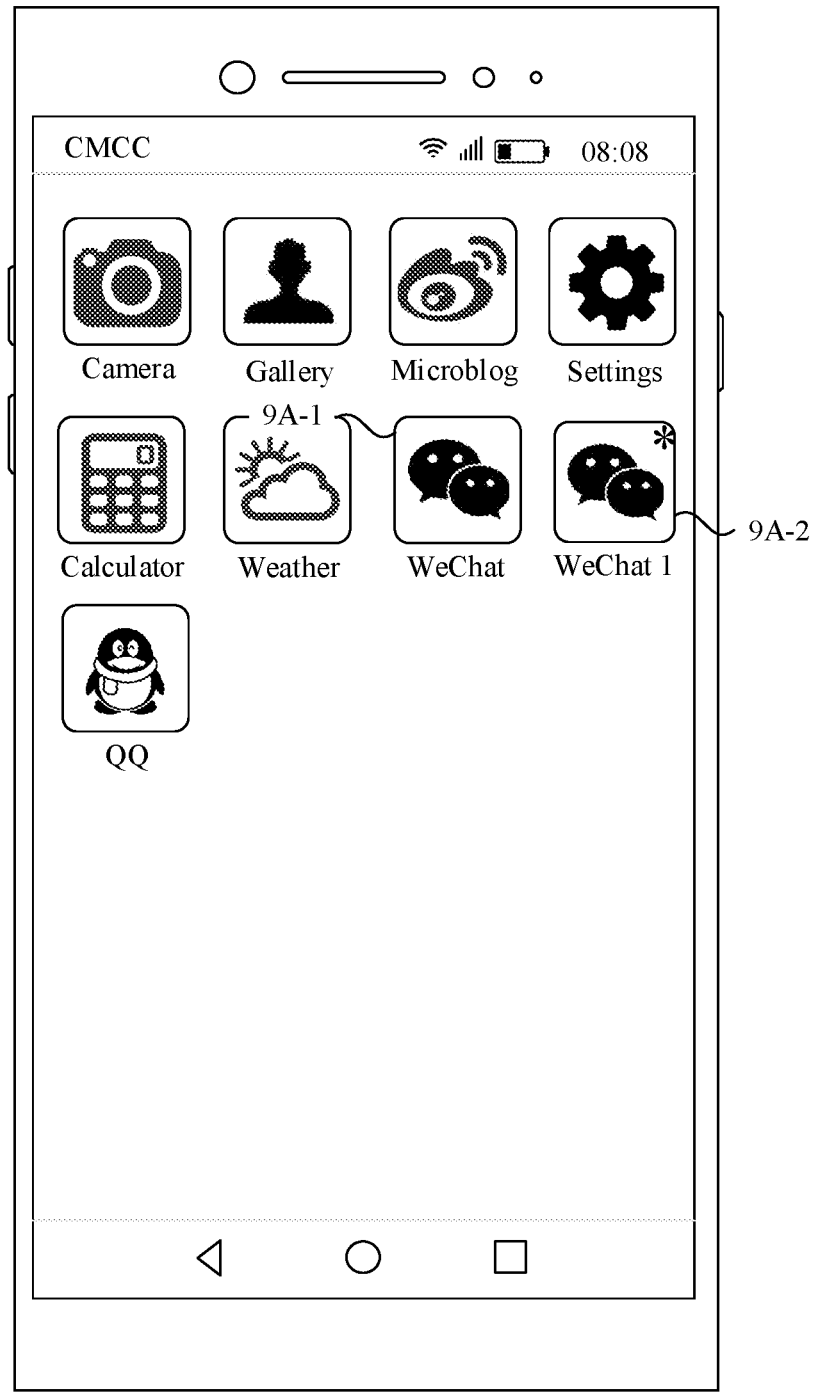

For example, with reference to FIG. 9A(a) and FIG. 9A(b), an example in which the first application is WeChat and the operation C is a touch and hold operation is used for detailed description. As shown in FIG. 9A(a), if the user wants to use a cloned application of WeChat, the user may perform a touch and hold operation on a WeChat icon 9A-1 displayed on a subscreen included on the home screen of the terminal. When the terminal includes the cloned application of WeChat, in response to the touch and hold operation, as shown in FIG. 9A(b), the terminal displays a hidden icon 9A-2 of the cloned application of WeChat. In this case, the WeChat icon 9A-1 and the icon 9A-2 of the cloned application of WeChat are simultaneously displayed on the subscreen of the terminal. The icons may be displayed on the subscreen included on the home screen of the terminal. In an icon display area in which each icon is displayed, 4×5 icons, 5×5 icons, or the like may be displayed on the subscreen according to a preset setting. The icon 9A-2 of the cloned application of WeChat may be displayed in an icon display area of the subscreen like the WeChat icon 9A-1, or may not be displayed in an icon display area of the subscreen.

It can be understood that, in the foregoing process of creating the clone of the first application, the icon, displayed when the user is informed that the clone of the first application is successfully created, of the clone of the first application may be displayed in an icon display area of the subscreen, or may not be displayed in an icon display area of the subscreen.

In some embodiments of this application, the hidden icon of the cloned application of the first application may be included in a menu bar 2.

The menu bar 2 is corresponding to the first application, and may also be considered as a POP window of the first application. The menu bar 2 may be displayed on an upper side, a lower side, a left side, or a right side of the entry icon of the first application, or may be overlaid and displayed on the entry icon of the first application. When the operation C is a sliding operation, a direction of the menu bar 2 relative to the entry icon of the first application may be the same as a sliding direction of the sliding operation. For example, the direction of the sliding operation is an upward direction, and the menu bar 2 is displayed on an upper side of the entry icon of the first application.

It should be noted that the menu bar 2 may be a first menu bar in this application. In addition, in this embodiment of this application, the menu bar 1 and the menu bar 2 may be adjacent to the first application. That the menu bar 1 and the menu bar 2 are adjacent to the first application may be specifically that the menu bar 1 and the menu bar 2 are close to the first application, or the menu bar 1 and the menu bar 2 are adjacent to the first application with a specific distance. No limitation is set thereto in this embodiment of this application.

For example, when the user wants to use the cloned application of the first application, the user may perform the operation C on the entry icon of the first application. In response to the operation C, the terminal may first determine whether the terminal includes the cloned application of the first application. If the terminal includes the cloned application of the first application, the terminal may display the menu bar 2, where the menu bar 2 may include the hidden icon of the cloned application of the first application. The user may perform a tap operation on the icon of the cloned application of the first application, so that the terminal displays a main interface of the cloned application of the first application or an interface displayed when the cloned application of the first application is exited last time. If the terminal does not include the cloned application of the first application, the terminal may display prompt information, to inform the user that the first application has no cloned application.

Figure 9B:
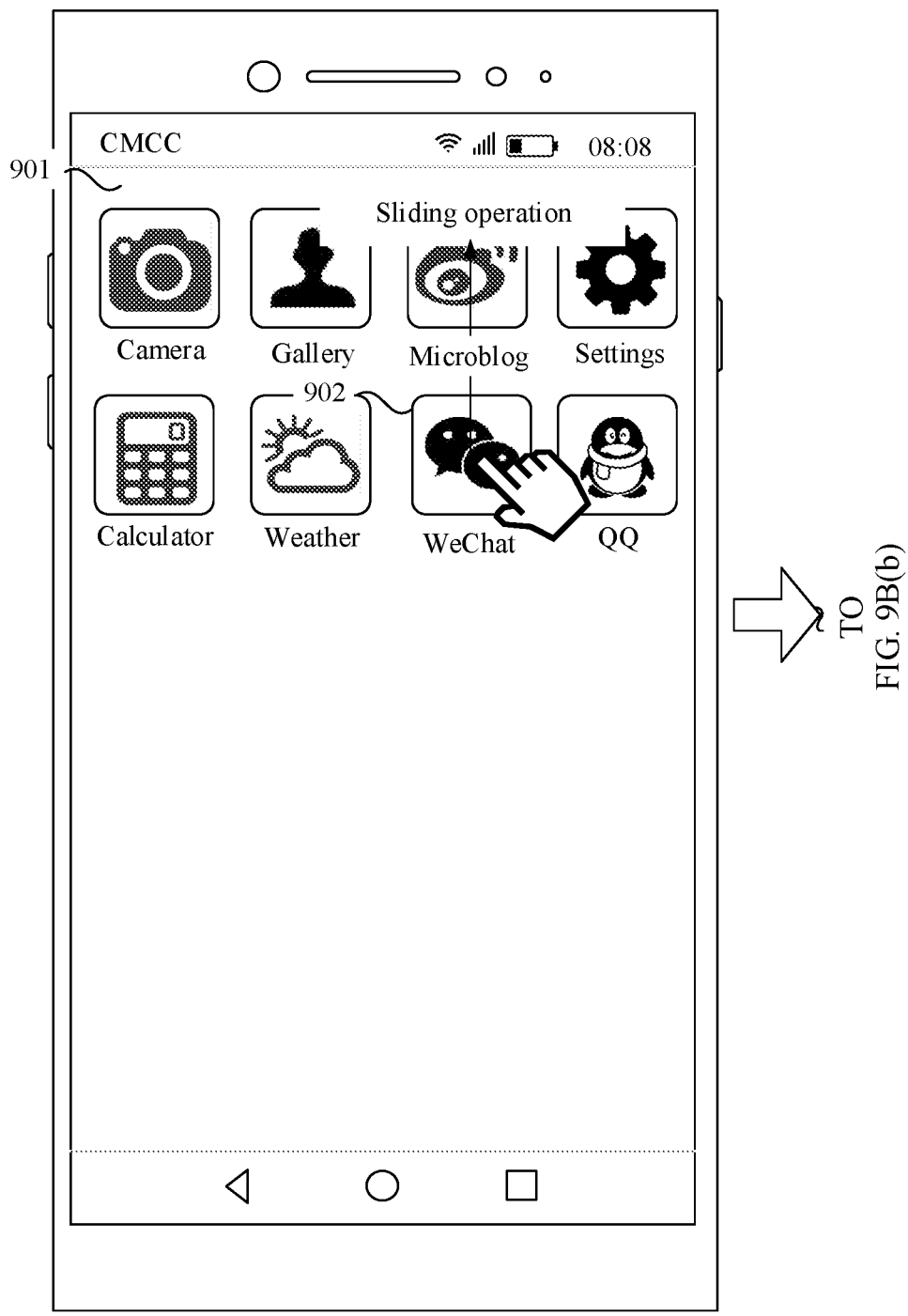
FIG. 9B(a), FIG. 9B(b), and FIG. 9B(c) are schematic diagrams of display interfaces of still another application icon according to an embodiment of this application.
Figure 9B:
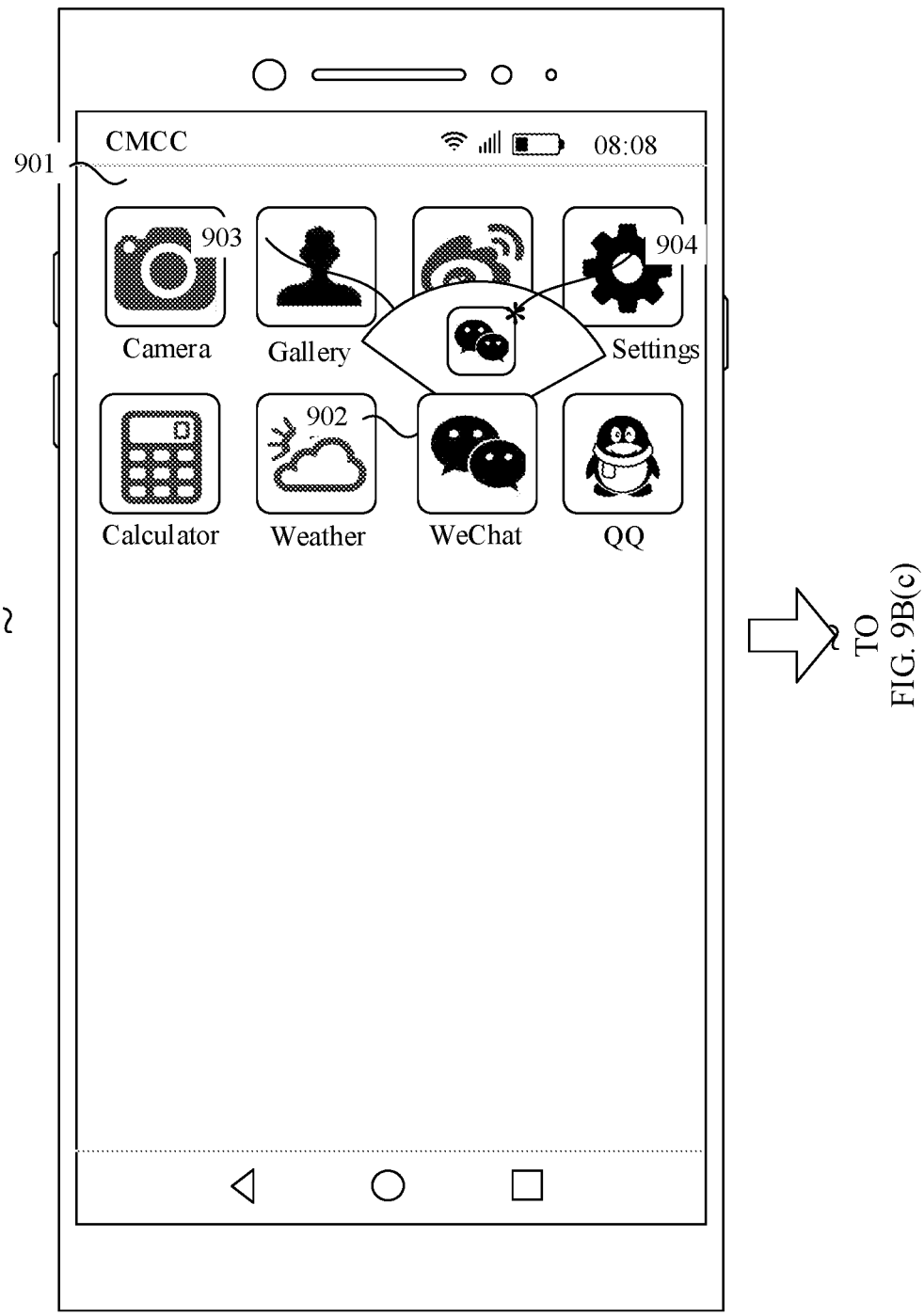
Figure 9B:
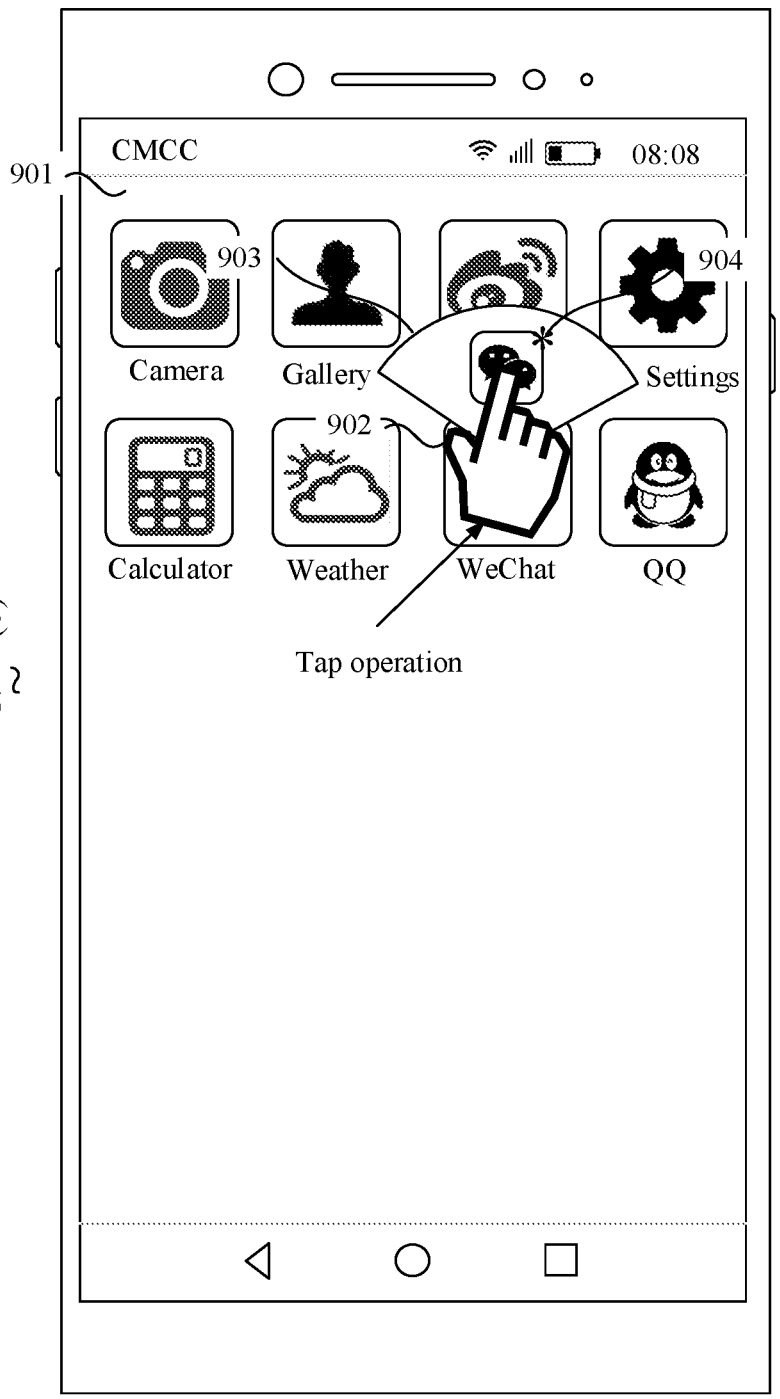

For example, with reference to FIG. 9B(a), FIG. 9B(b), and FIG. 9B(c), an example in which the first application is WeChat, the operation C is a sliding operation, a start point of the sliding operation is an entry icon of the first application, and a sliding direction is an upward direction is used for detailed description. As shown in FIG. 9B(a), if the user wants to use a cloned application of WeChat, the user may perform, on an entry icon 902 of WeChat displayed on a subscreen 901 included on the home screen of the terminal, a sliding operation whose start point is the entry icon 902 and sliding direction is an upward direction. In response to the sliding operation, as shown in FIG. 9B(b), the terminal displays a menu bar 903 on an upper side of the entry icon 902 of WeChat. When the terminal includes the cloned application of WeChat, the menu bar 903 includes a hidden icon 904 of the cloned application of WeChat. As shown in FIG. 9B(c), the user may perform a tap operation on the icon 904. In response to the tap operation, the terminal may display a main interface of the cloned application of WeChat or an interface displayed when the cloned application of WeChat is exited last time. If the terminal does not include the cloned application of WeChat, the terminal may display prompt information. The prompt information may be used to inform the user that WeChat has no cloned application, or may inform the user that an operation A may be performed, to trigger the terminal to display an add button, so as to create the cloned application of WeChat.

Figure 10A:
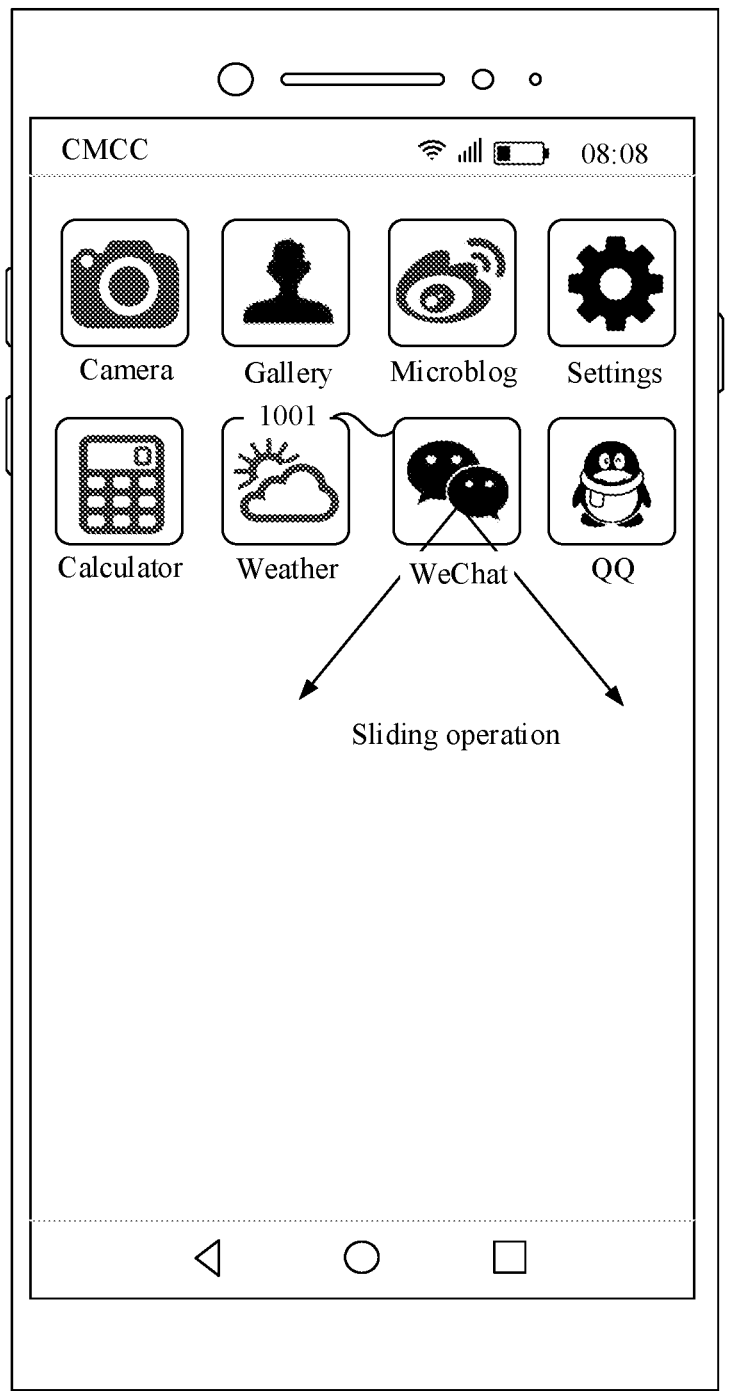
FIG. 10(a) and FIG. 10(b) are schematic diagrams of display interfaces of still another application icon according to an embodiment of this application.
Figure 10B:
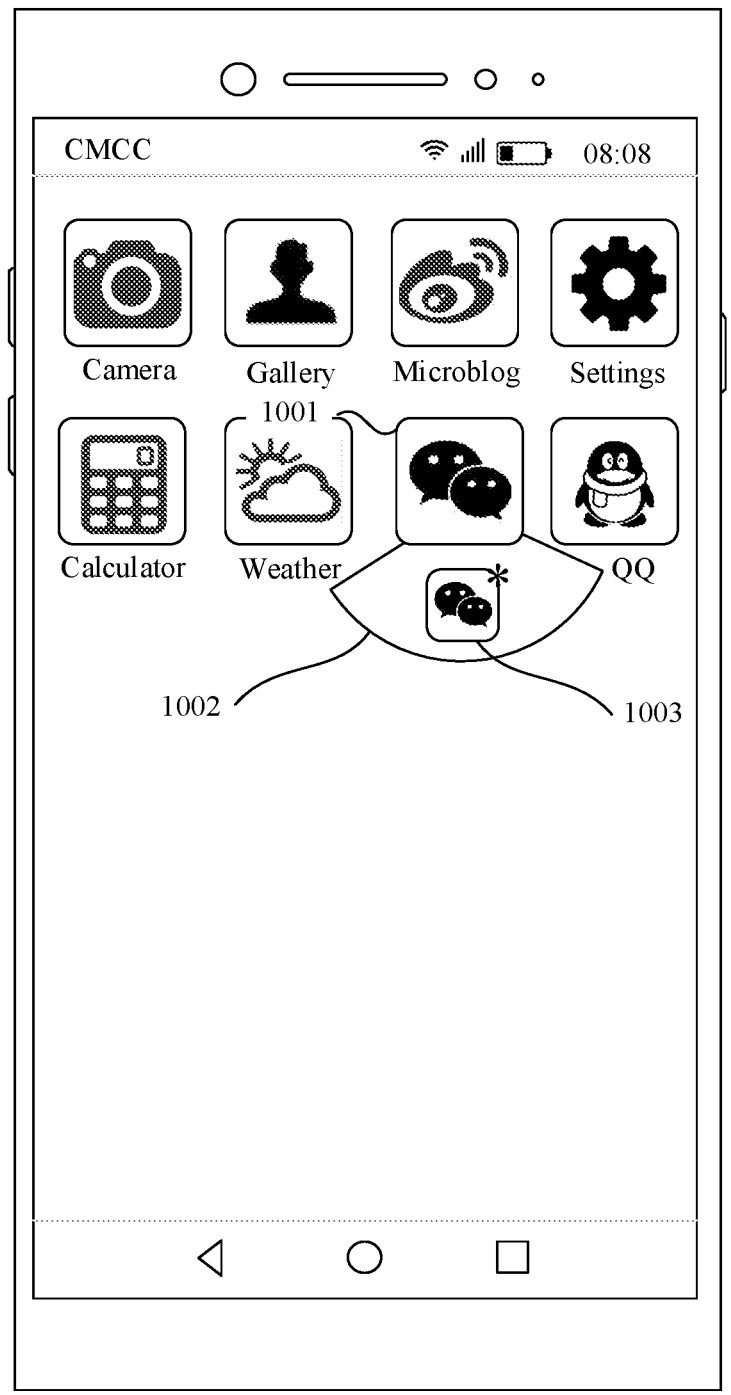

It should be noted that, in this embodiment of this application, when the operation C is a sliding operation, the user may use one or more fingers to perform the sliding operation. For example, with reference to FIG. 10(a) and FIG. 10(b), as shown in FIG. 10(a), the user may use two fingers to perform, in a direction shown in FIG. 10(a), a sliding operation by using an entry icon 1001 of the first application (for example, WeChat) as a start point. As shown in FIG. 10(b), in response to the sliding operation, the terminal may display a menu bar 1002 corresponding to the first application (for example, WeChat). The menu bar 1002 includes a hidden icon 1003 of the cloned application of the first application (for example, WeChat).

In some other embodiments of this application, when the terminal includes a plurality of cloned applications of an application, icons of the plurality of cloned applications of the application may be included in a same menu bar, or may be included in different menu bars.

Figure 11:
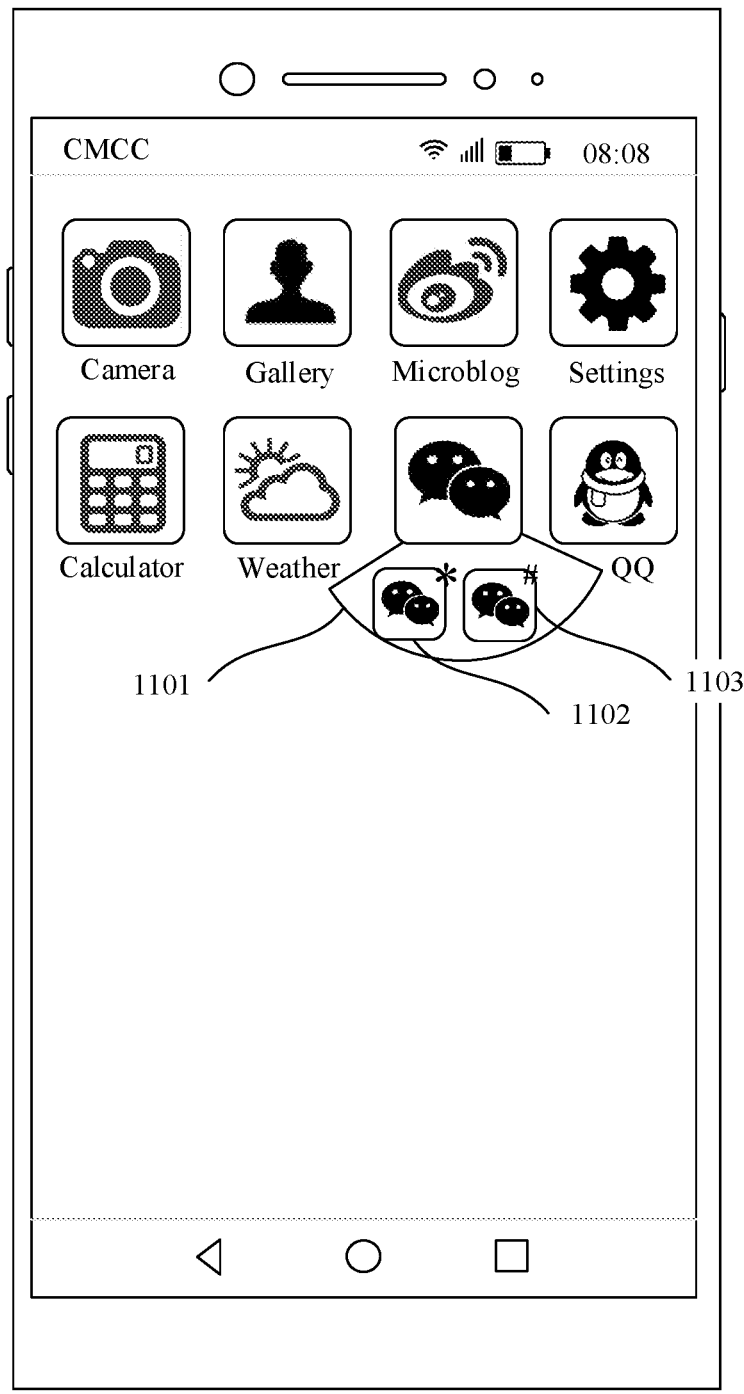
FIG. 11 is a schematic diagram of a display interface of still another application icon according to an embodiment of this application.

When icons of a plurality of cloned applications of an application are included in a same menu bar, an example in which the terminal includes two cloned applications of WeChat is used. As shown in FIG. 11, after receiving an operation C performed by the user on an entry icon of WeChat, the terminal may display a menu bar 1101, where the menu bar 1101 includes hidden icons 1102 and 1103 of the two cloned applications of WeChat. To help the user distinguish between different cloned applications, icons of the different cloned applications may be displayed in different display manners. For example, as shown in FIG. 11, "*" is added to an icon of one cloned application of WeChat in contrast to the icon of WeChat and "#" is added to an icon of the other cloned application of WeChat in contrast to the icon of WeChat. Certainly, the icons of the different cloned applications may alternatively be the same.

When icons of a plurality of cloned applications of an application are included in different menu bars, an example in which the terminal includes two cloned applications of WeChat is used.

Figure 12A:
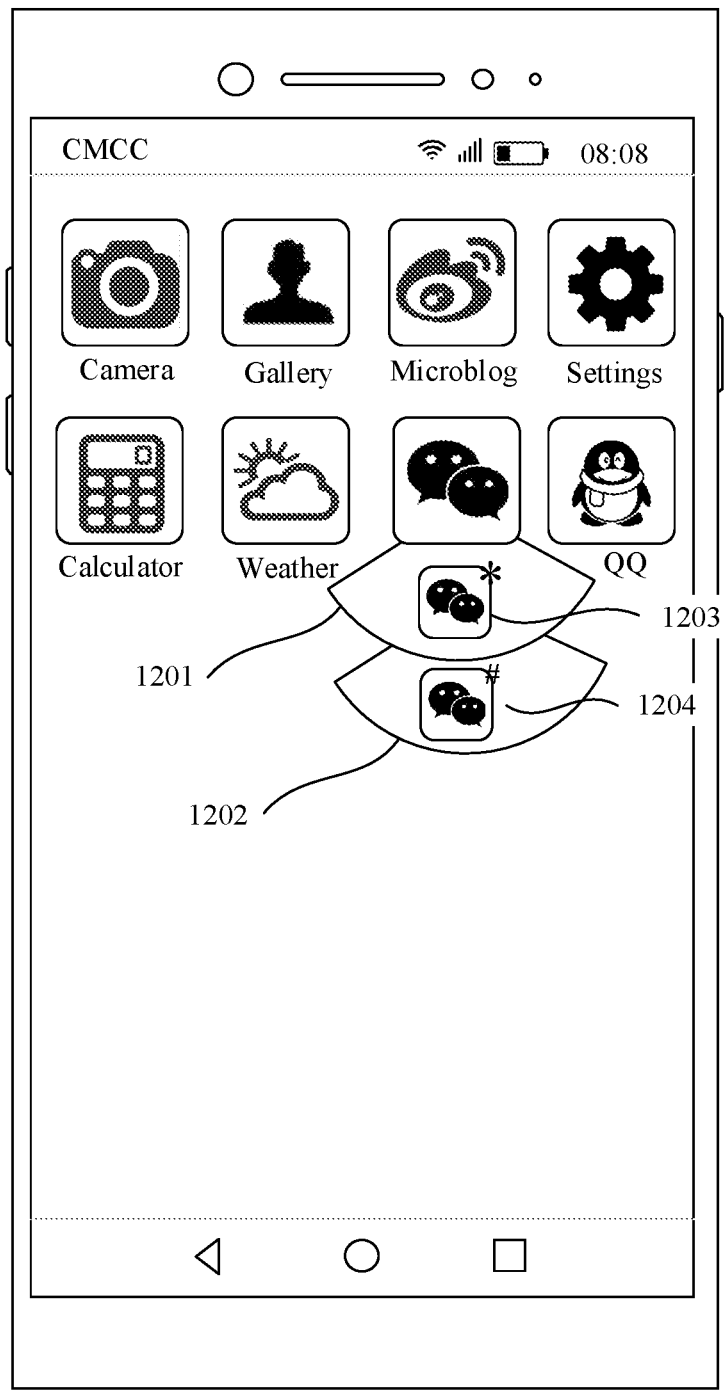
FIG. 12(a) and FIG. 12(b) are schematic diagrams of display interfaces of still another application icon according to an embodiment of this application.
Figure 12B:
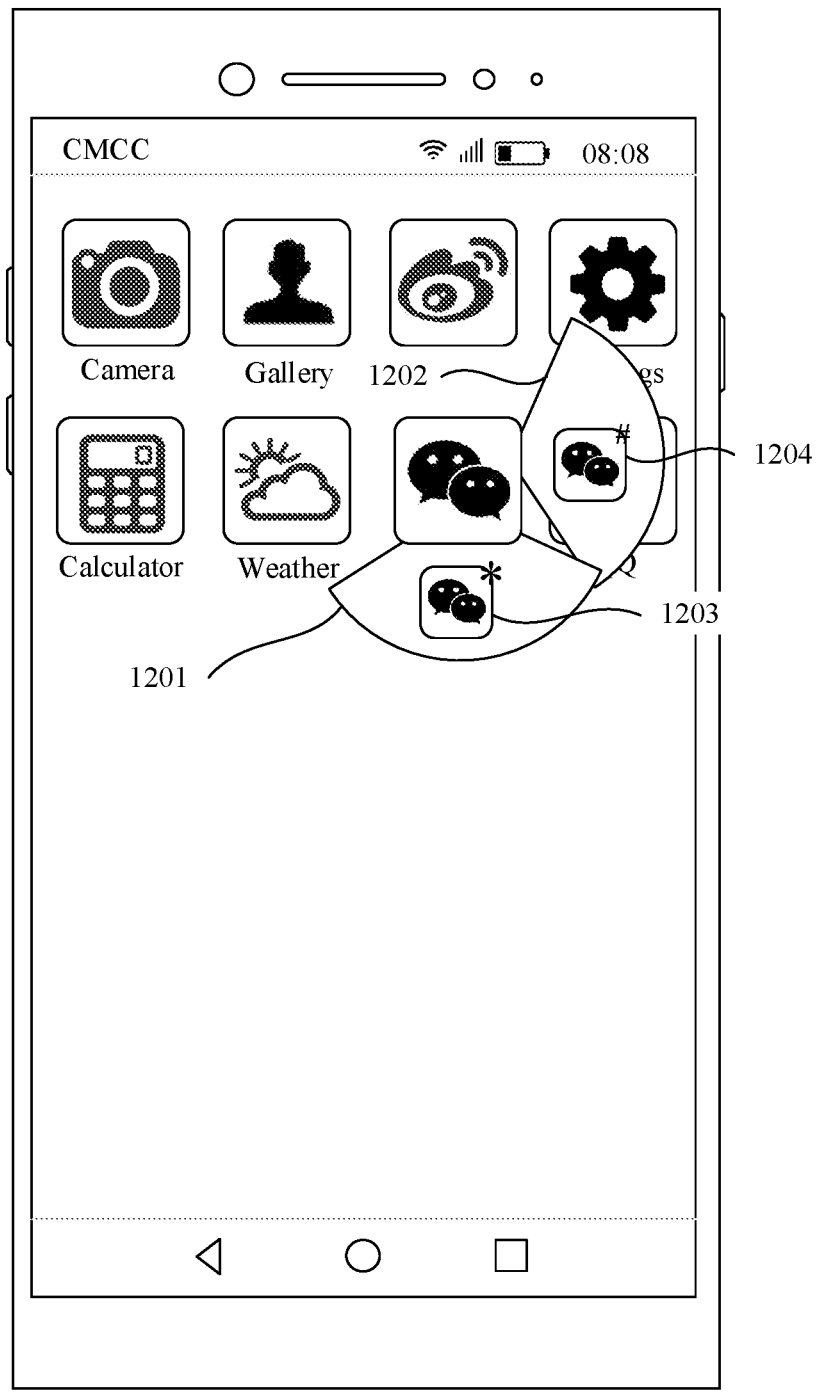

In a possible implementation, as shown in FIG. 12(a) or FIG. 12(b), after receiving an operation C performed by the user on an entry icon of WeChat, the terminal may display a menu bar 1201 and a menu bar 1202, where the menu bar 1201 includes a hidden icon 1203 of one cloned application of WeChat, and the menu bar 1202 includes a hidden icon 1204 of the other cloned application of WeChat. In response to the operation C, in FIG. 12(a), the menu bar 1201 and the menu bar 1202 may be simultaneously displayed. As shown in FIG. 12(b), the menu bar 1201 and the menu bar 1202 may be simultaneously displayed or may not be simultaneously displayed.

Figure 13A:
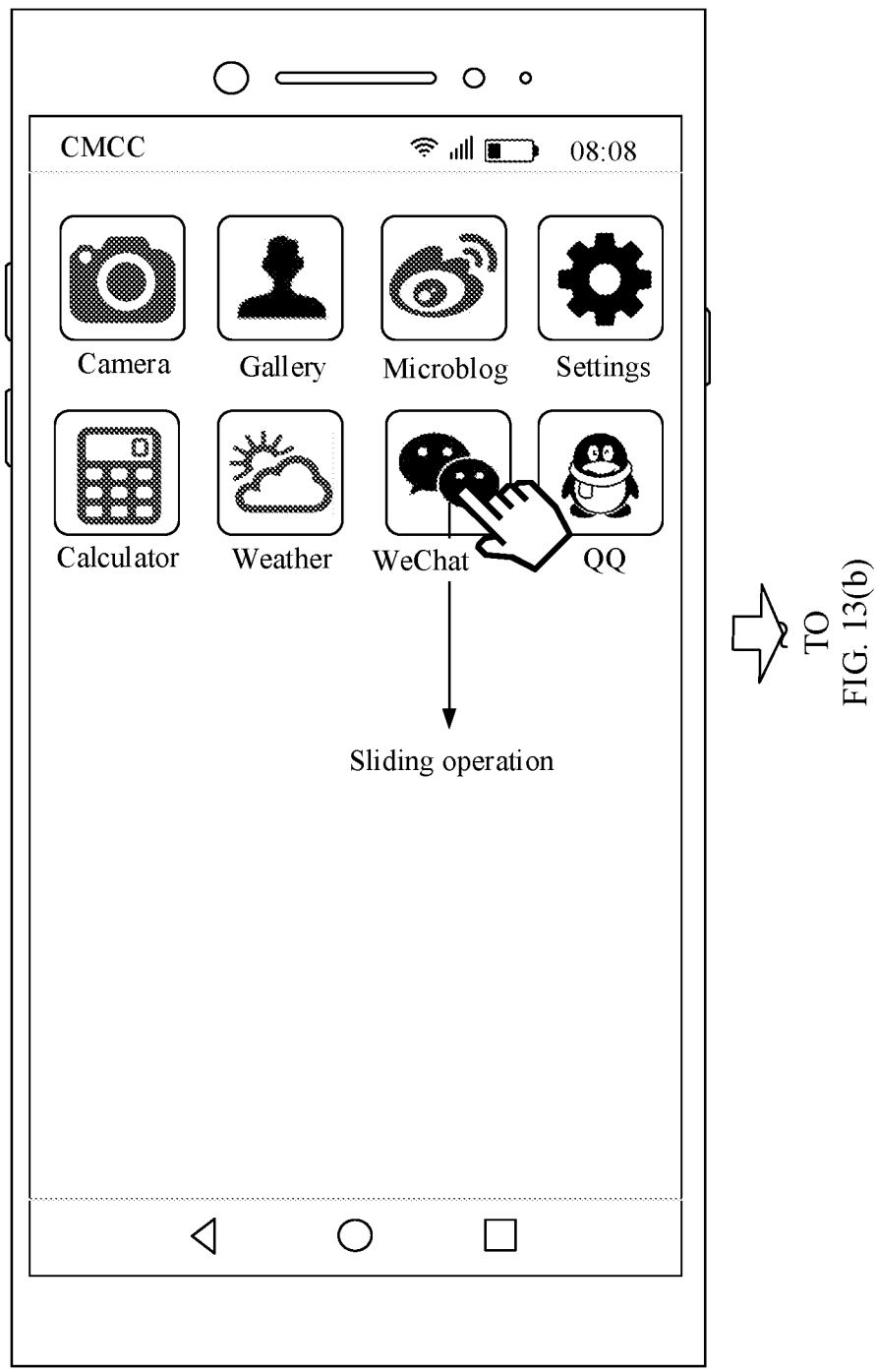
FIG. 13(a), FIG. 13(b), and FIG. 13(c) are schematic diagrams of display interfaces of still another application icon according to an embodiment of this application.
Figure 13B:
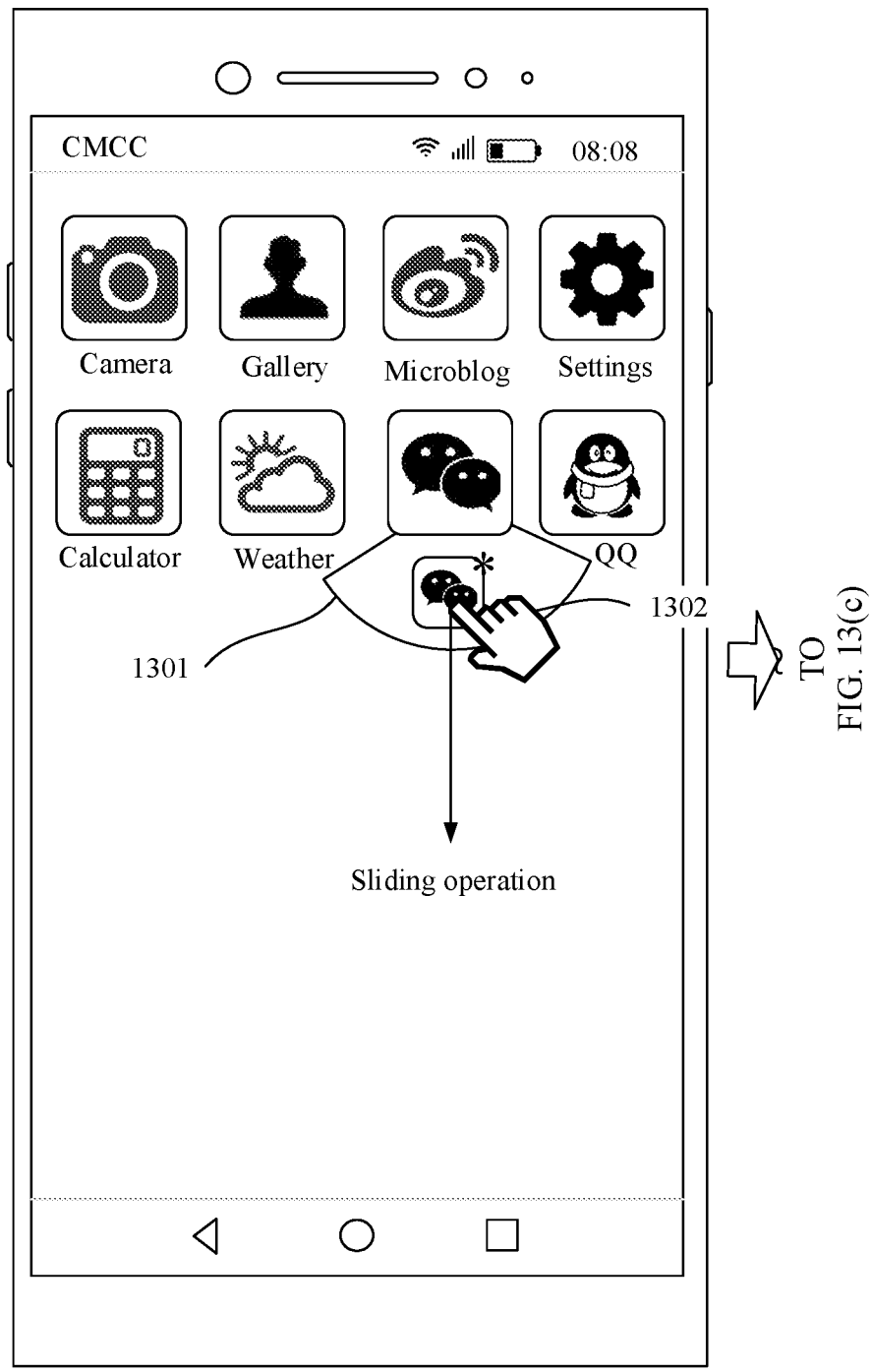
Figure 13C:
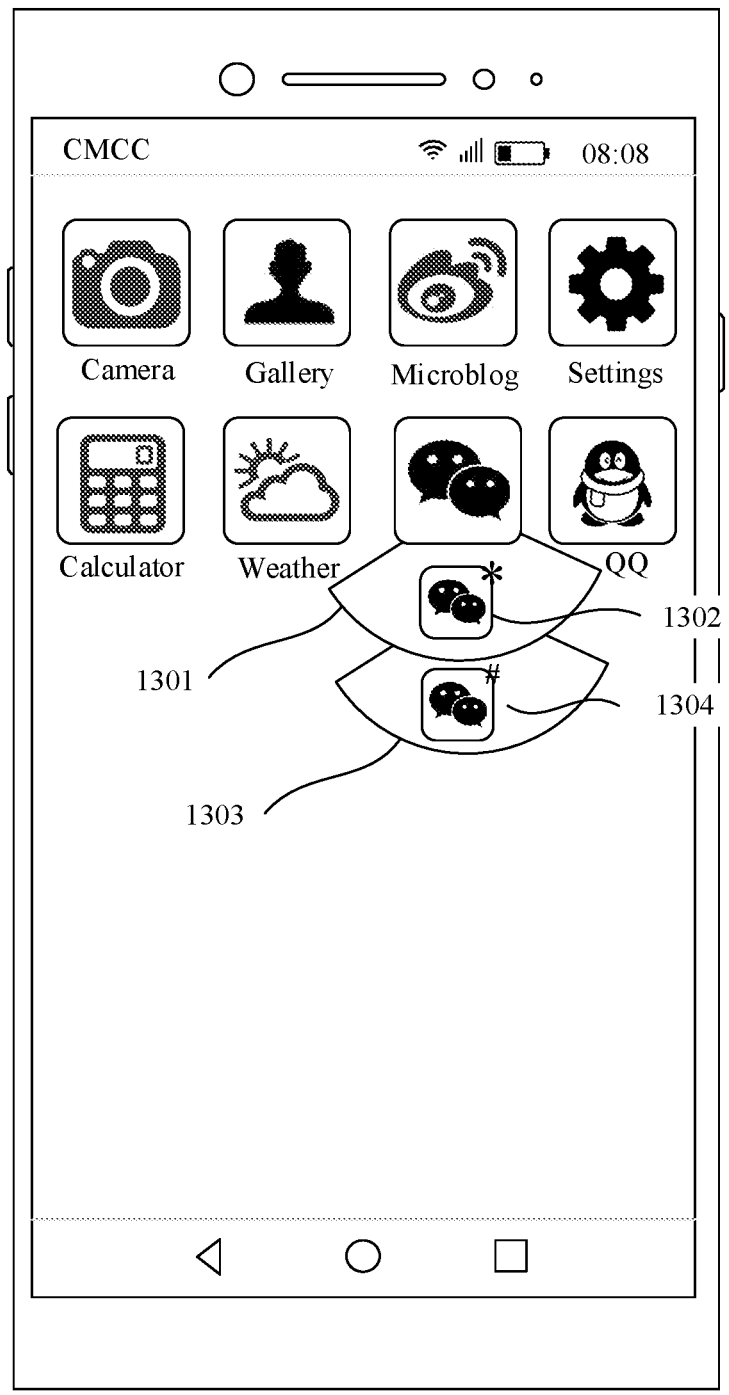

In another possible implementation, with reference to FIG. 13(a), FIG. 13(b), and FIG. 13(c), an example in which the operation C is a sliding operation is used. As shown in FIG. 13(a), the user performs, on an entry icon of WeChat, a sliding operation whose start point is the entry icon of WeChat and sliding direction is a downward direction. As shown in FIG. 13(b), the terminal may display a menu bar 1301 in response to the sliding operation. The menu bar 1301 includes a hidden icon 1302 of a first cloned application of WeChat. In this case, if the user wants to view an icon of a second cloned application of WeChat, as shown in FIG. 13(b), the user may perform a sliding operation whose start point is the icon 1302 of the first cloned application and sliding direction is a downward direction. As shown in FIG. 13(c), in response to the sliding operation, the terminal displays a menu bar 1303, where the menu bar 1303 includes the hidden icon 1304 of the second cloned application of WeChat. Alternatively, when the operation C is a sliding operation, the terminal determines, based on a sliding distance of the sliding operation, whether to display an icon of one cloned application or icons of a plurality of cloned applications. For example, when the sliding distance of the sliding operation performed by the user is greater than a first threshold and less than a second threshold, the terminal displays the icon of the first cloned application, for example, a case shown in FIG. 13(b). When the sliding distance of the sliding operation performed by the user is greater than the second threshold, the terminal displays the icon of the first cloned application and the icon of the second cloned application, for example, a case shown in FIG. 13(c). The second threshold is greater than the first threshold.

Figure 14A:
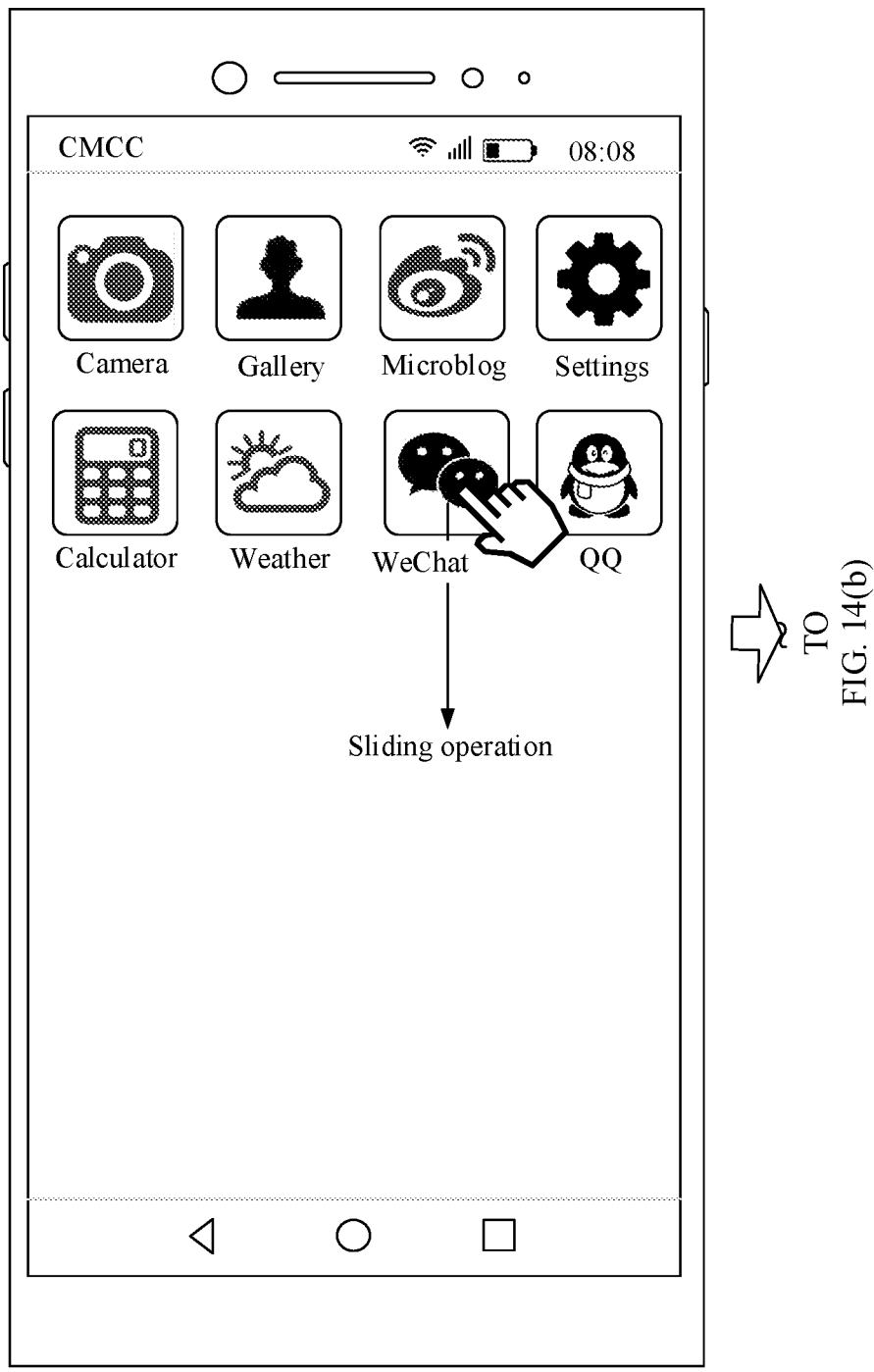
FIG. 14(a), FIG. 14(b), FIG. 14(c), and FIG. 14(d) are schematic diagrams of display interfaces of still another application icon according to an embodiment of this application.
Figure 14B:
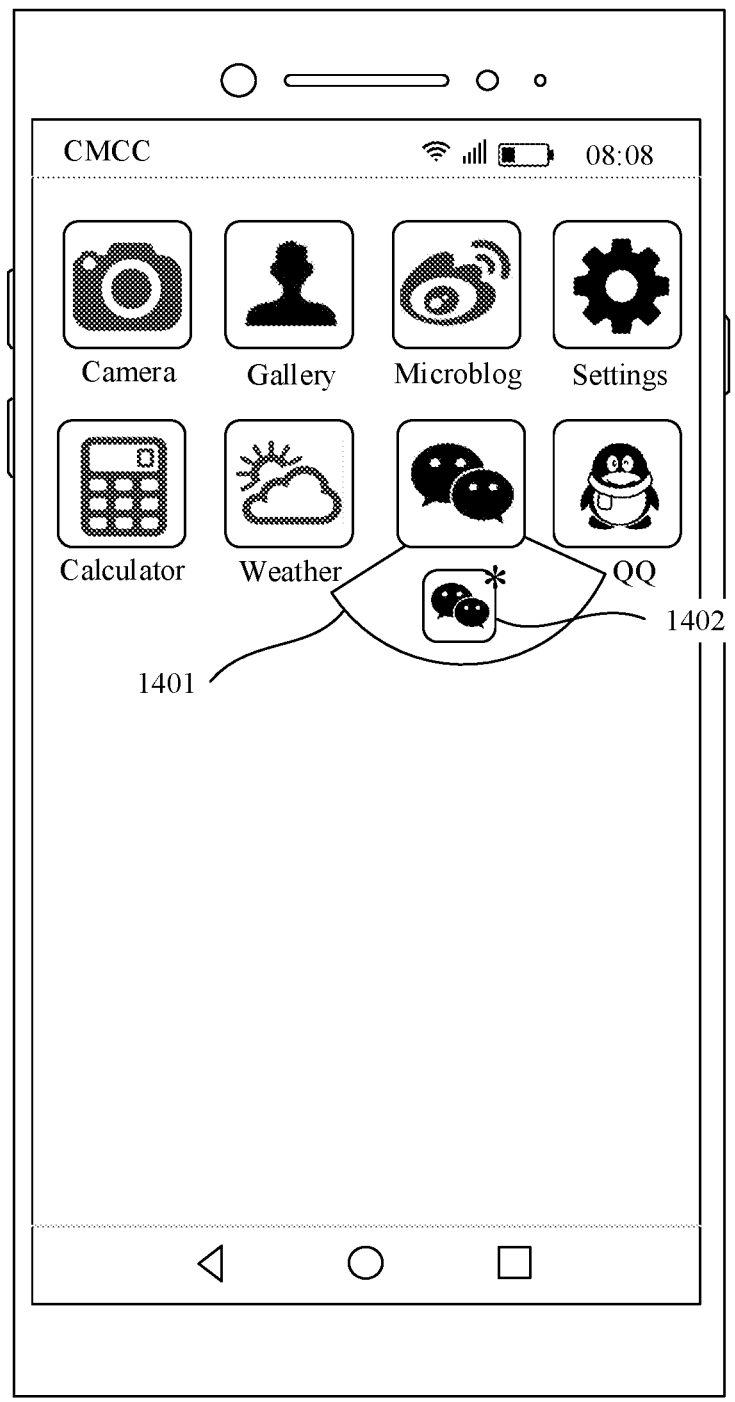
Figure 14C:
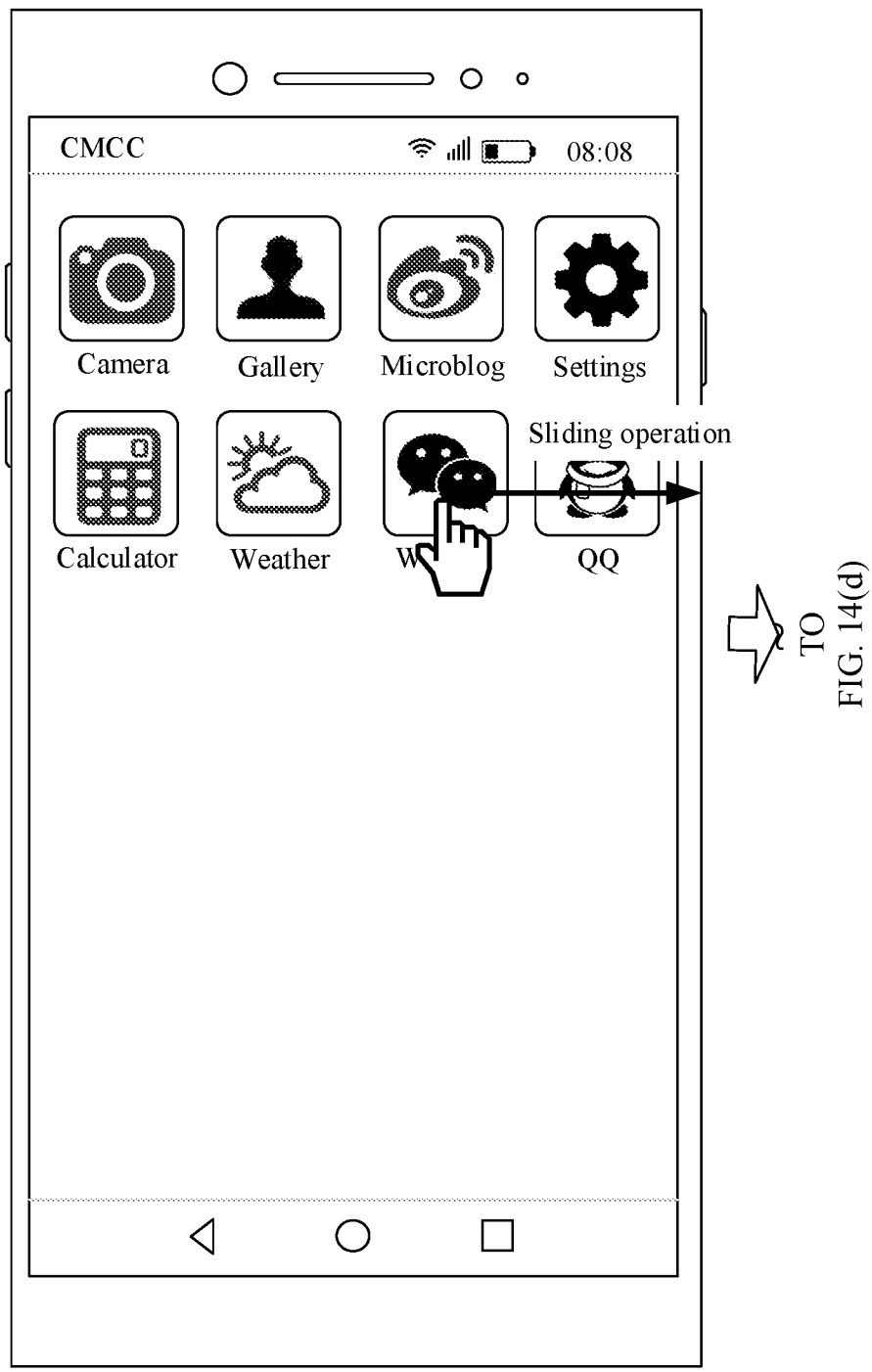
Figure 14D:
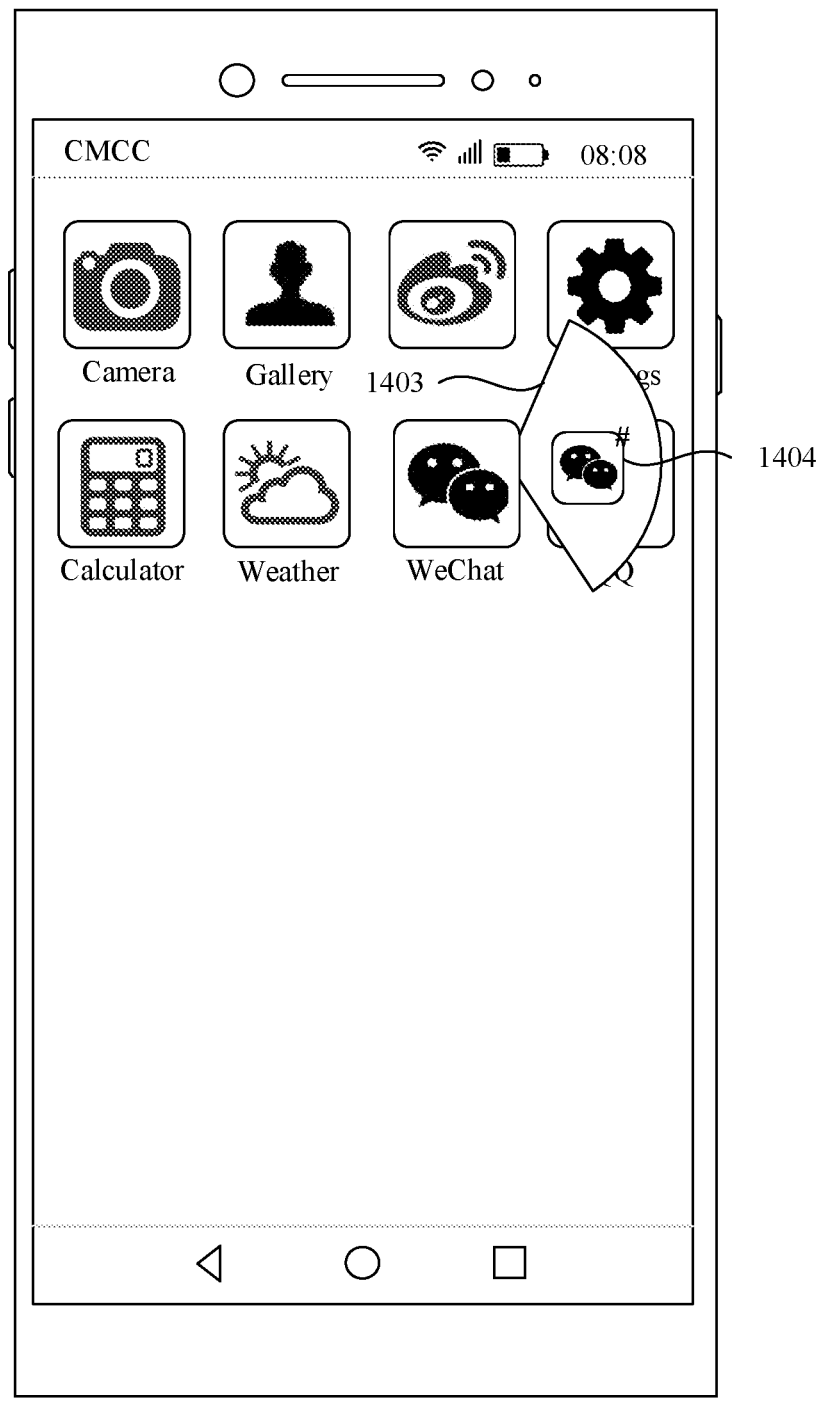

In still another possible implementation, with reference to FIG. 14(a), FIG. 14(b), FIG. 14(c), and FIG. 14(d), an example in which the operation C is a sliding operation is used. Icons of different cloned applications may be displayed based on different sliding directions of the sliding operation. For example, as shown in FIG. 14(a), the user performs, on an entry icon of WeChat, a sliding operation whose start point is the entry icon of WeChat and sliding direction is a downward direction. As shown in FIG. 14(b), the terminal displays a menu bar 1401 in response to the sliding operation. The menu bar 1401 includes a hidden icon 1402 of a cloned application of WeChat. As shown in FIG. 14(c), the user performs, on the entry icon of WeChat, a sliding operation whose start point is the entry icon of WeChat and sliding direction is a rightward direction. As shown in FIG. 14(d), the terminal displays a menu bar 1403 in response to the sliding operation. The menu bar 1403 includes a hidden icon 1404 of another cloned application of WeChat. Alternatively, icons of different cloned applications may be displayed based on different operations. For example, the menu bar 1401 is displayed based on a double-tap operation, and the menu bar 1403 is displayed based on a touch and hold operation.

In FIG. 11 to FIG. 14(a), FIG. 14(b), FIG. 14(c), and FIG. 14(d), an example in which "*" is added to an icon of one cloned application of WeChat in contrast to the icon of WeChat, and "#" is added to an icon of another cloned application of WeChat in contrast to the icon of WeChat is used for illustration. Certainly, icons of different cloned applications may alternatively be the same.

In addition, in this embodiment of this application, when the first application and/or the cloned application of the first application receive/receives a new message, the terminal may first display a new-message prompt identifier on the entry icon of the first application. When the user wants to view the new message, the user may select, based on whether the user has created the cloned application of the first application, an operation to be performed. Specifically, if the user has not created the cloned application of the first application, the user may directly tap the entry icon of the first application. In response to the tap operation performed by the user, the terminal may directly display a main interface of the first application, so as to display the received new message. If the user has created the cloned application of the first application, the user may perform the operation C on the entry icon of the first application, so that the terminal displays the menu bar 2 including the hidden icon of the cloned application of the first application. In addition, the terminal determines, based on a specific application (the first application or the cloned application of the first application) that receives the new message, whether to change a display location of the new-message prompt identifier. If the first application receives the new message, because the entry icon of the first application is the icon of the first application, the display location of the new-message prompt identifier may not be changed, that is, the new-message prompt identifier continues to be displayed on the entry icon of the first application. If the cloned application of the first application receives the new message, the terminal may change the display location of the new-message prompt identifier to the icon of the cloned application of the first application.

Figure 15A:
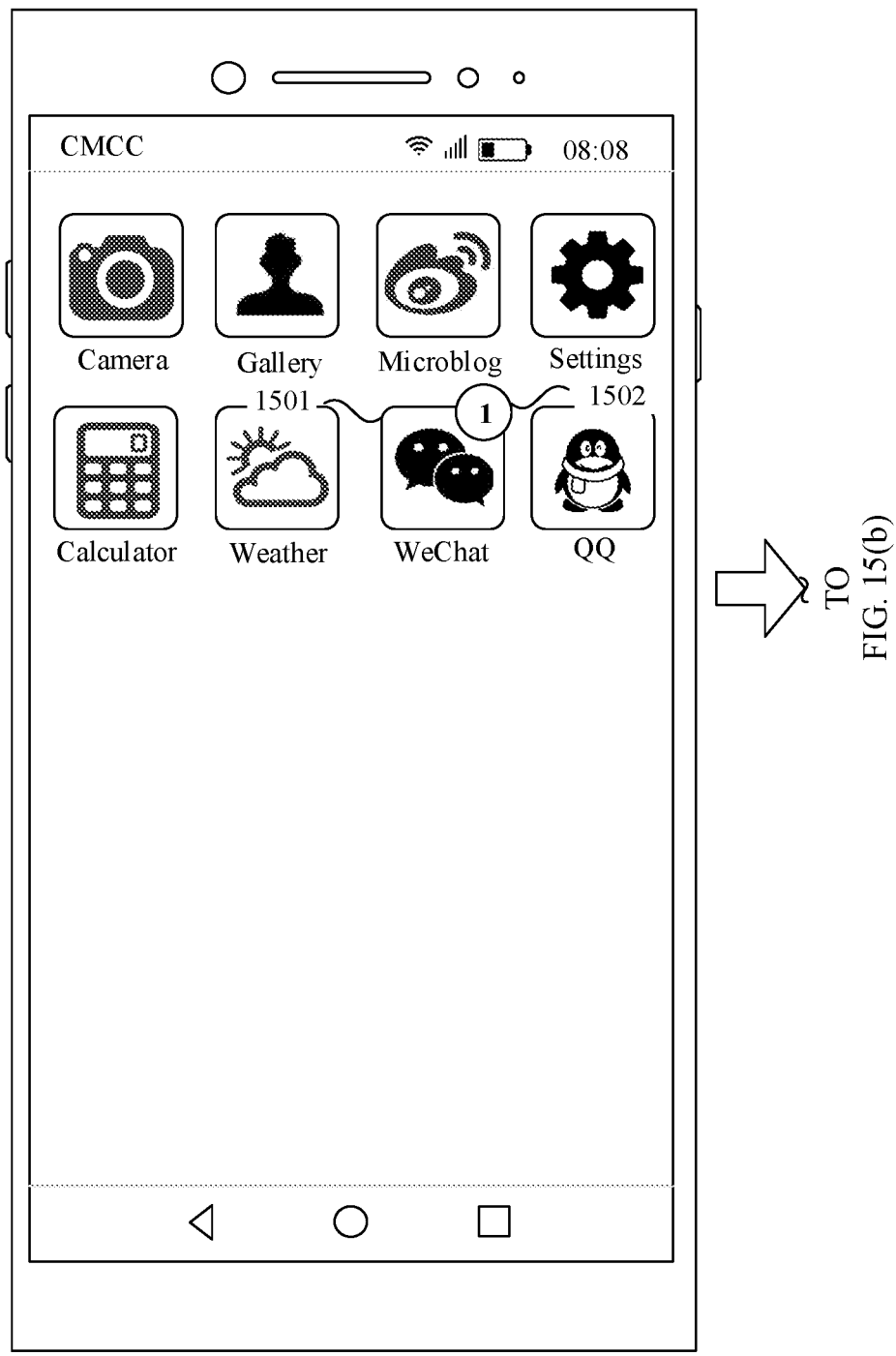
FIG. 15(a), FIG. 15(b), FIG. 15(c), and FIG. 15(d) are schematic diagrams of display interfaces of still another application icon according to an embodiment of this application.
Figure 15B:
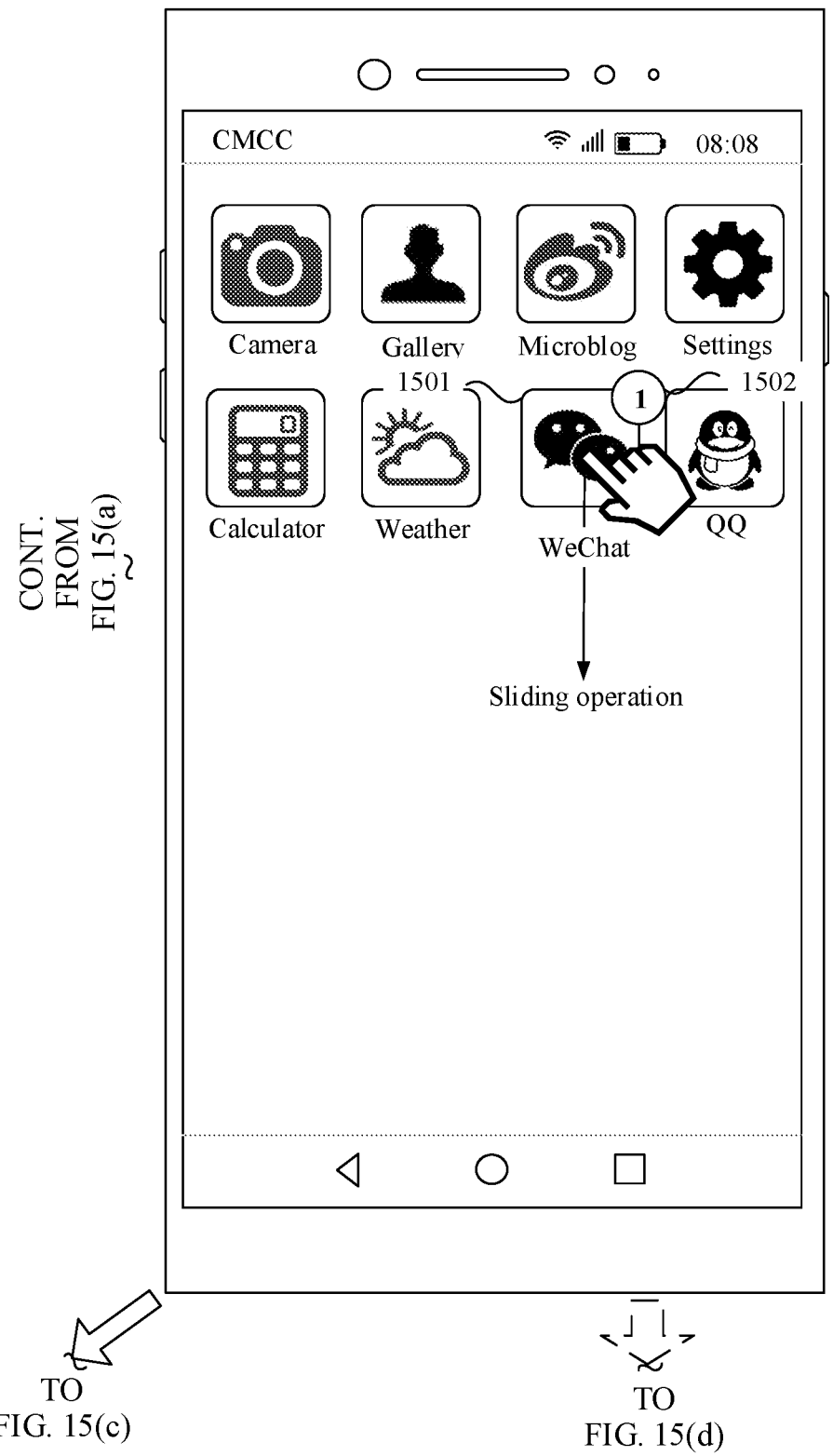
Figure 15C:
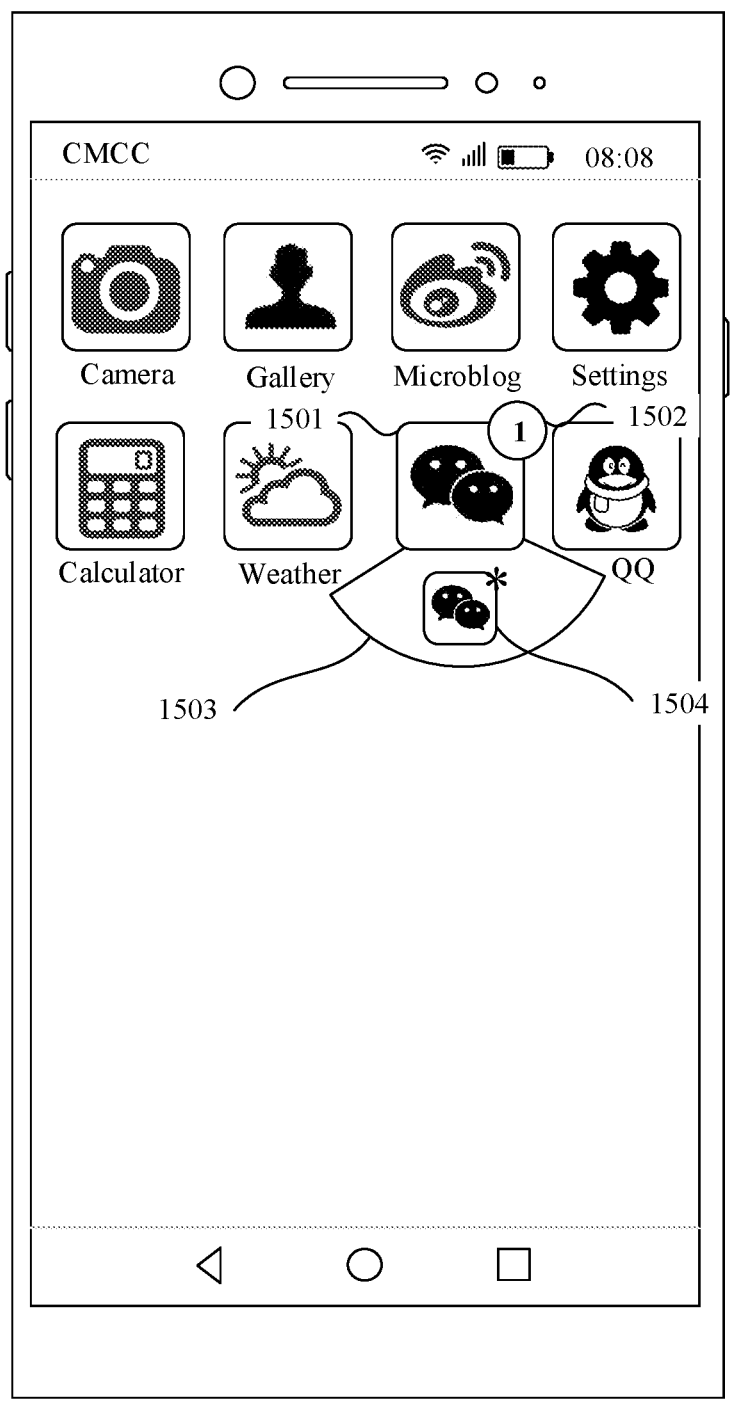
Figure 15D:
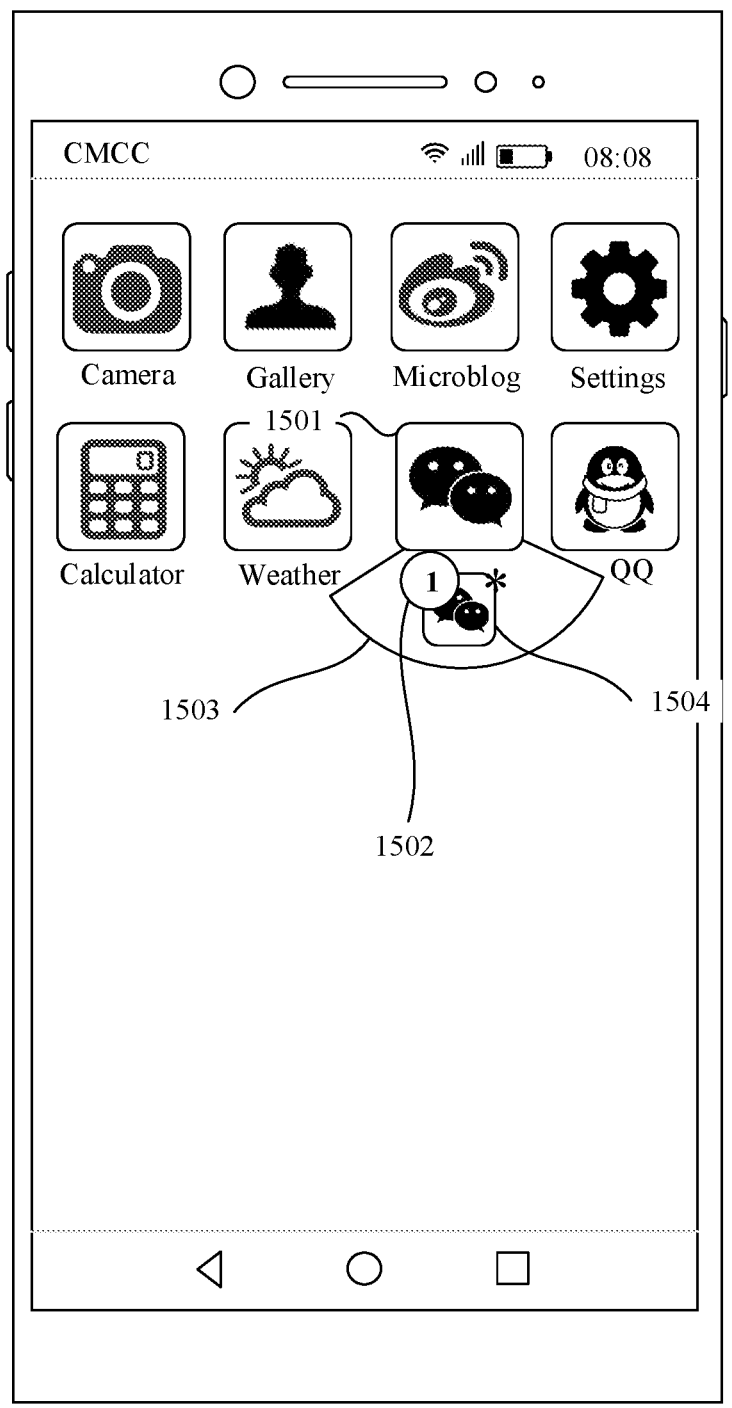

For example, with reference to FIG. 15(a), FIG. 15(b), FIG. 15(c), and FIG. 15(d), a detailed description is provided by using an example in which the first application is WeChat, a cloned application is created for the first application, and the operation C is a sliding operation. As shown in FIG. 15(a), when WeChat receives a new message, the terminal may first display anew-message prompt identifier 1502 at an upper right corner of an entry icon 1501 of WeChat. When the user wants to view the new message, as shown in FIG. 15(b), the user may perform a sliding operation on the entry icon 1501 of the first application. A start point of the sliding operation is the entry icon 1501, and a sliding direction of the sliding operation is a downward direction. As shown in FIG. 15(c) or FIG. 15(d), in response to the sliding operation, the terminal displays a menu bar 1503. The menu bar 1503 includes a hidden icon 1504 of the cloned application of WeChat. In addition, the terminal determines whether the new message is received by WeChat or the cloned application of WeChat. If the new message is received by WeChat, as shown in FIG. 15(c), a display location of the new-message prompt identifier 1502 may not be changed, that is, the new-message prompt identifier 1502 continues to be displayed on the entry icon 1501 of the first application. If the new message is received by the cloned application of WeChat, as shown in FIG. 15(d), the terminal may change the display location of the new-message prompt identifier 1502 to the icon 1504 of the cloned application of WeChat. In this way, it can be convenient for the user to learn a specific application that receives the new message, thereby improving user experience.

Second application scenario: The add button and the hidden icon are included in a same menu bar corresponding to the application.

Figure 16:
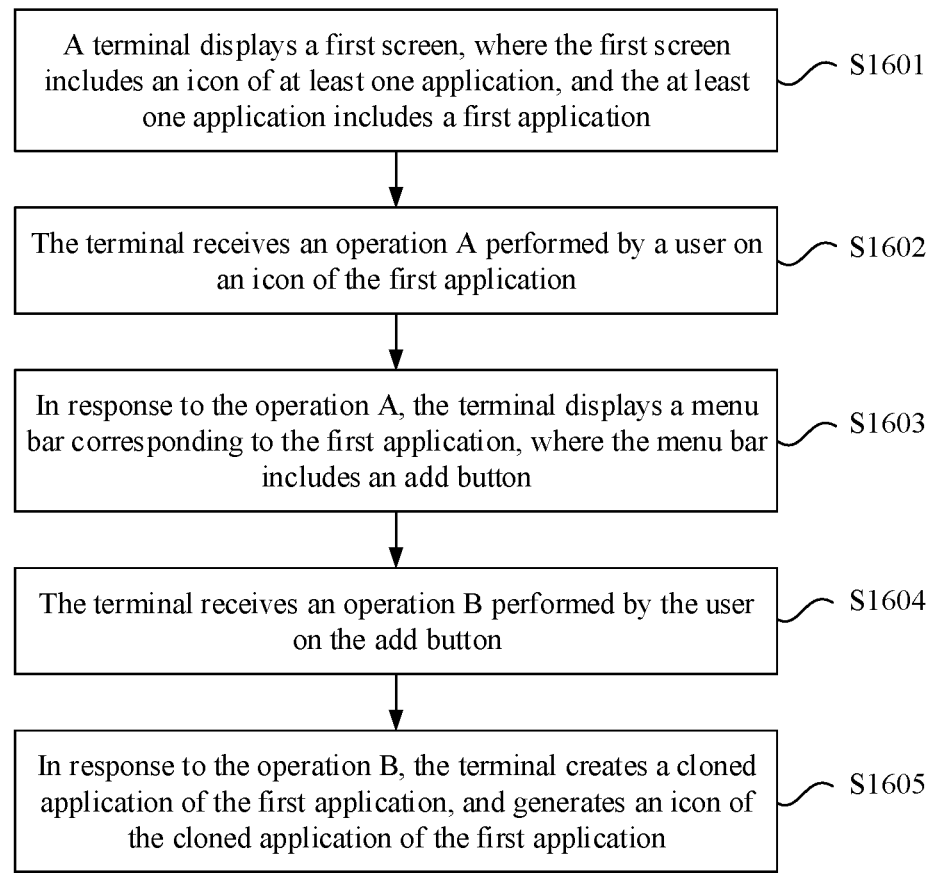
FIG. 16 is a schematic flowchart of still another application icon displaying method according to an embodiment of this application.

In the second application scenario, as shown in FIG. 16, an application icon displaying method provided in an embodiment of this application may include S1601 to S1605.

S1601. A terminal displays a first screen, where the first screen includes an icon of at least one application, and the at least one application includes a first application.

A specific description of S1601 is the same as the specific description of S301 in another embodiment of this application, and details are not described herein again.

S1602. The terminal receives an operation A performed by a user on an icon of the first application.

The operation A is used to trigger the terminal to display a menu bar corresponding to the first application. The menu bar may include an add button. The add button is used to create a cloned application of the first application. A specific description of the operation A in S1602 is the same as the specific description of the operation Ain S302 in another embodiment of this application, and details are not described herein again.

S1603. In response to the operation A, the terminal displays the menu bar corresponding to the first application, where the menu bar includes the add button.

S1604. The terminal receives an operation B performed by the user on the add button.

S1605. In response to the operation B, the terminal creates the cloned application of the first application, and generates an icon of the cloned application of the first application.

It should be noted that specific descriptions of S1603 to S1605 are similar to the specific descriptions of S303 to S305 in another embodiment of this application, and details are not described herein again.

In some embodiments of this application, to save space of a home screen of the terminal and protect user privacy, when the cloned application of the first application is successfully created, an entry icon corresponding to the first application may be displayed on a subscreen of the home screen of the terminal, and another icon is hidden. When detecting a preset operation performed by the user on the entry icon, the terminal may display the hidden icon. For a specific description of the entry icon, refer to the corresponding description in the embodiment shown in FIG. 3. Details are not described herein again.

Figure 17:
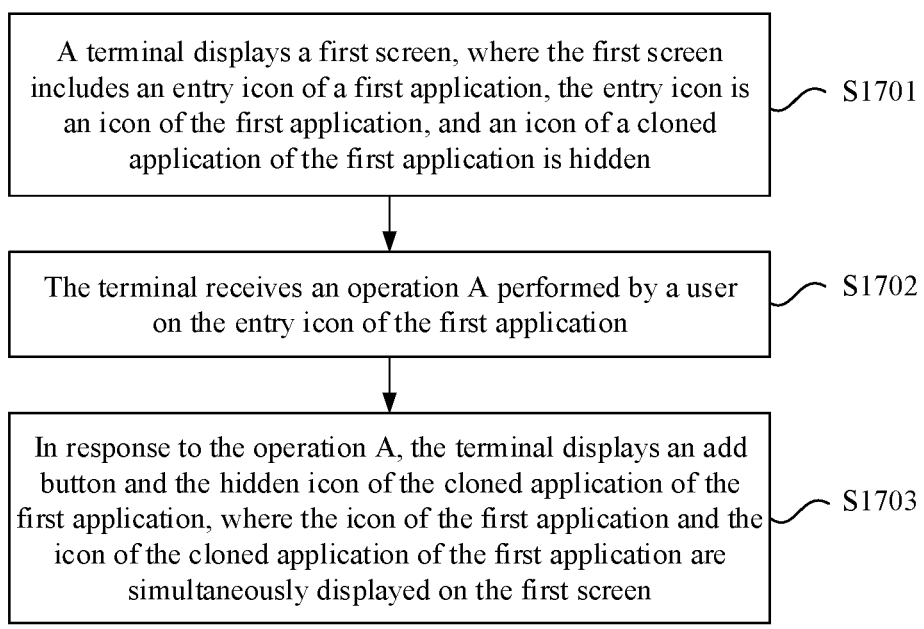
FIG. 17 is a schematic flowchart of still another application icon displaying method according to an embodiment of this application.

With reference to FIG. 17, by using an example in which the entry icon displayed on the subscreen included on the home screen of the terminal is the icon of the first application after the cloned application of the first application is created, the following describes in detail how to view a hidden icon (that is, the icon of the cloned application of the first application).

As shown in FIG. 17, an application icon displaying method provided in an embodiment of this application may include S1701 to S1703.

S1701. A terminal displays a first screen, where the first screen includes an entry icon of a first application, the entry icon is an icon of the first application, and an icon of a cloned application of the first application is hidden.

S1702. The terminal receives an operation A performed by a user on the entry icon of the first application.

A specific description of S1702 is the same as the specific description of S1602 in the embodiments of this application, and details are not described herein again.

S1703. In response to the operation A, the terminal displays an add button and the hidden icon of the cloned application of the first application, where the icon of the first application and the icon of the cloned application of the first application are simultaneously displayed on the first screen.

For example, the add button and the hidden icon of the cloned application of the first application may be included in the menu bar.

For example, when the user wants to use the cloned application of the first application, the user may perform the operation A on the entry icon of the first application. In response to the operation A, the terminal may first determine whether the terminal includes the cloned application of the first application. If the terminal includes the cloned application of the first application, the terminal may display the menu bar including the hidden icon of the cloned application of the first application and the add button. The user may perform a tap operation on the icon of the cloned application of the first application, so that the terminal displays, in response to the tap operation, a main interface of the cloned application of the first application or an interface displayed when the cloned application of the first application is exited last time. If the terminal does not include the cloned application of the first application, the terminal may display the menu bar including the add button. In this case, the user may create the cloned application of the first application by taping the add button.

Figure 18A:
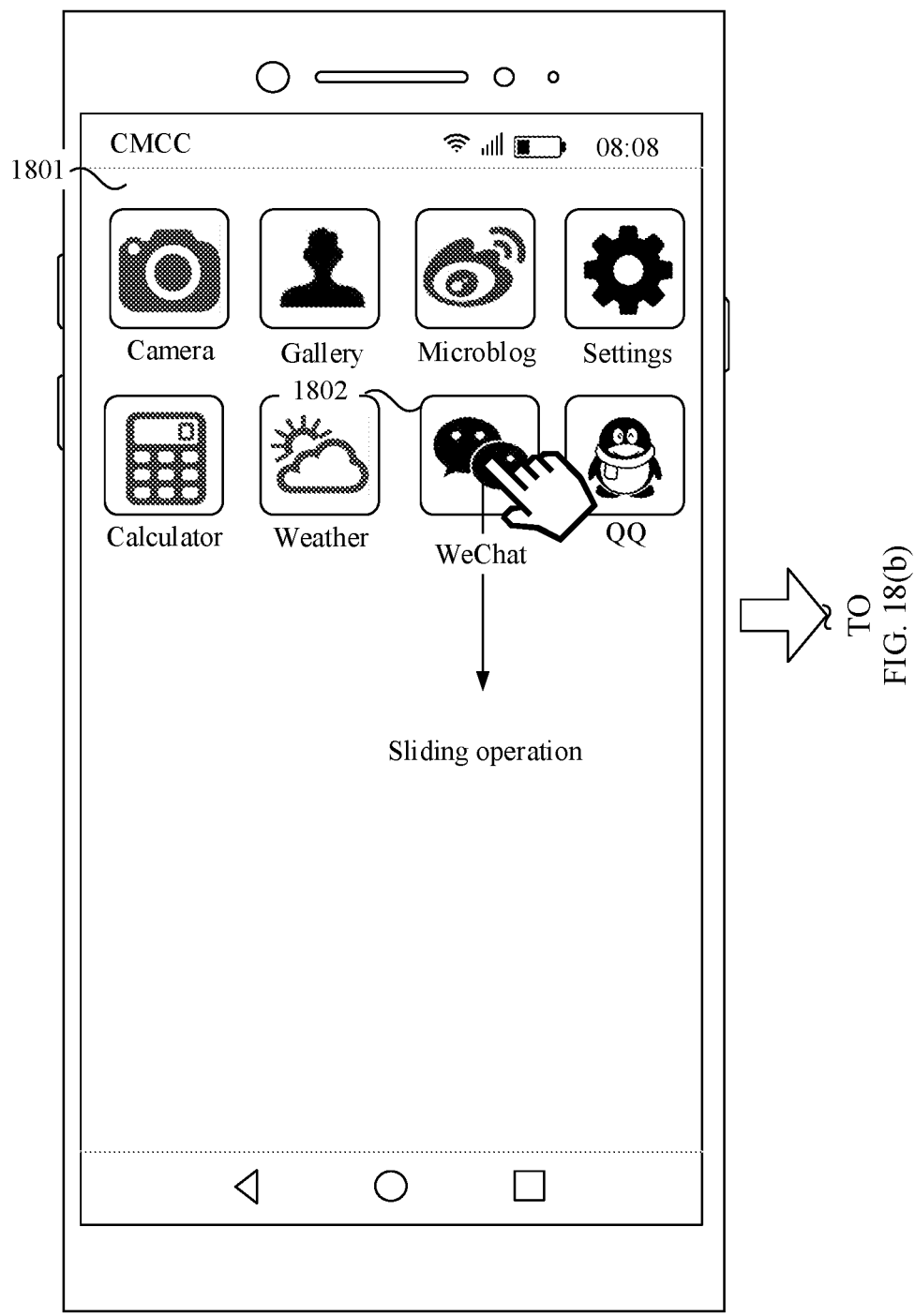
FIG. 18(a), FIG. 18(b), and FIG. 18(c) are schematic diagrams of display interfaces of still another application icon according to an embodiment of this application.
Figure 18B:
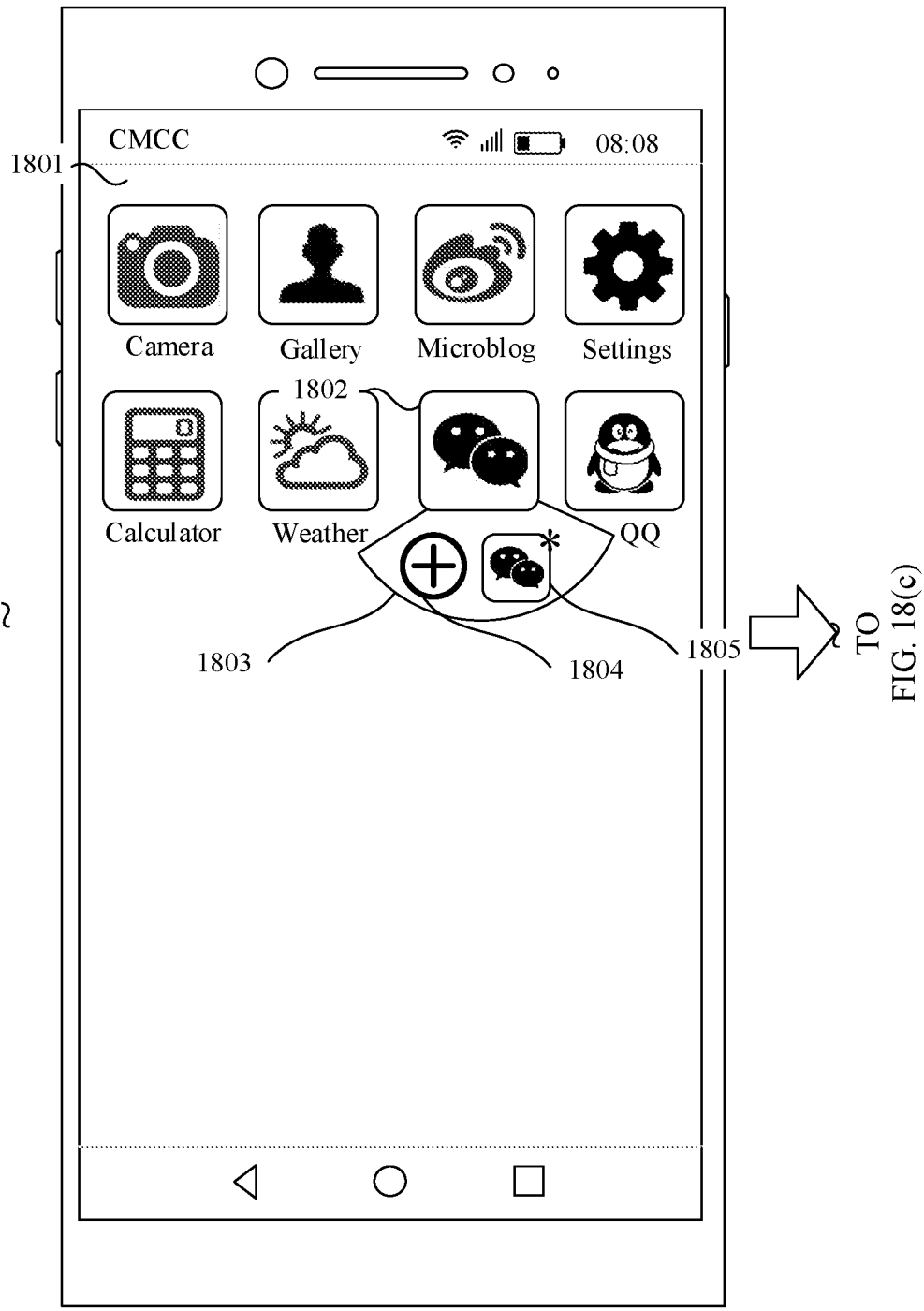
Figure 18C:
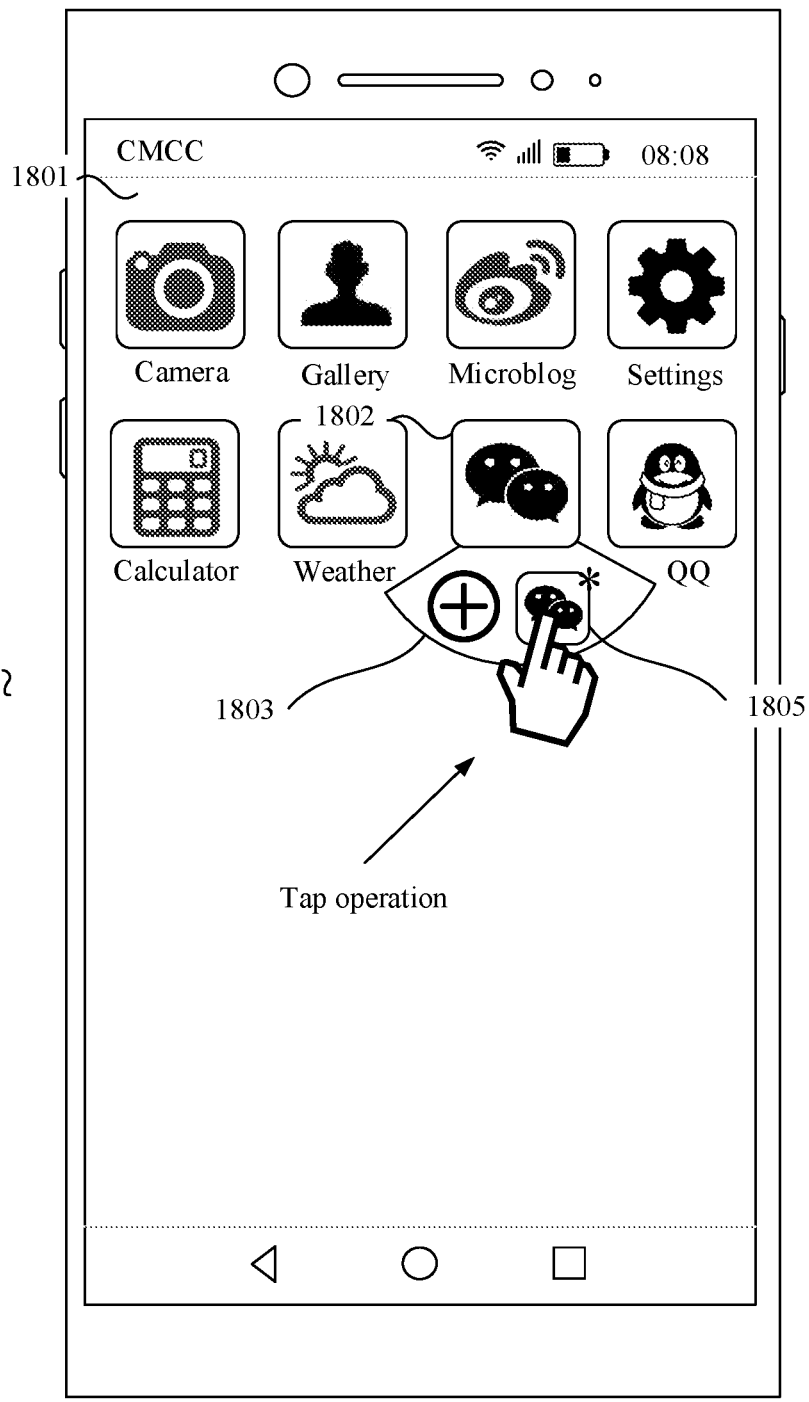

For example, with reference to FIG. 18(a), FIG. 18(b), and FIG. 18(c), an example in which the first application is WeChat, the operation A is a sliding operation, a start point of the sliding operation is an entry icon of the first application, and a sliding direction is an upward direction is used for detailed description. As shown in FIG. 18(a), if the user wants to use a cloned application of WeChat, the user may perform, on an entry icon 1802 of WeChat displayed on a subscreen 1802 included on a home screen of the terminal, a sliding operation whose start point is the entry icon 1801 and sliding direction is a downward direction. In response to the sliding operation, as shown in FIG. 18(b), the terminal displays a menu bar 1803 on a lower side of the entry icon 1802 of WeChat. When the terminal includes the cloned application of WeChat, the menu bar 1803 includes an add button 1804 and a hidden icon 1805 of the cloned application of WeChat. As shown in FIG. 18(c), the user may perform a tap operation on the icon 1805. In response to the tap operation, the terminal may display a main interface of the cloned application of WeChat or an interface displayed when the cloned application of WeChat is exited last time. If the terminal does not include the cloned application of WeChat, the terminal may display a menu bar including the add button 1804.

In some other embodiments of this application, when the terminal includes a plurality of cloned applications of an application, all icons of the plurality of cloned applications of the application may be included in the foregoing menu bar, or the icons of the plurality of cloned applications of the application may be included in different menu bars. When the icons of the plurality of cloned applications are included in different menu bars, only one of the menu bars may include the foregoing add button in addition to an icon of a cloned application. It should be noted that when the terminal includes a plurality of cloned applications of an application, for a method for displaying an icon of a cloned application, refer to the description of corresponding content in the embodiment shown in any one of FIG. 11 to FIG. 14(d). Details are not described herein again.

Figure 19A:
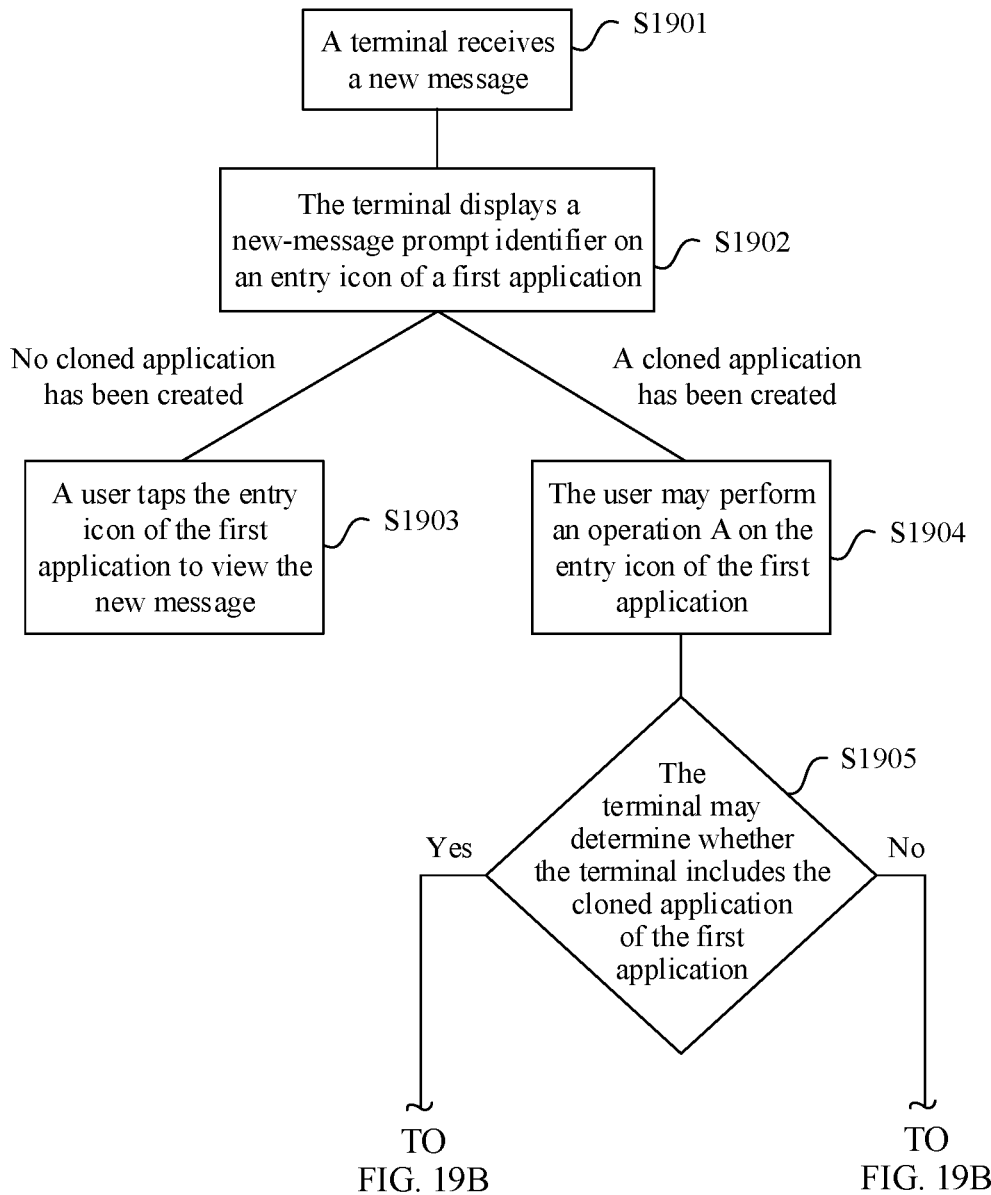
FIG. 19A and FIG. 19B are a schematic flowchart of still another application icon displaying method according to an embodiment of this application.
Figure 19B:
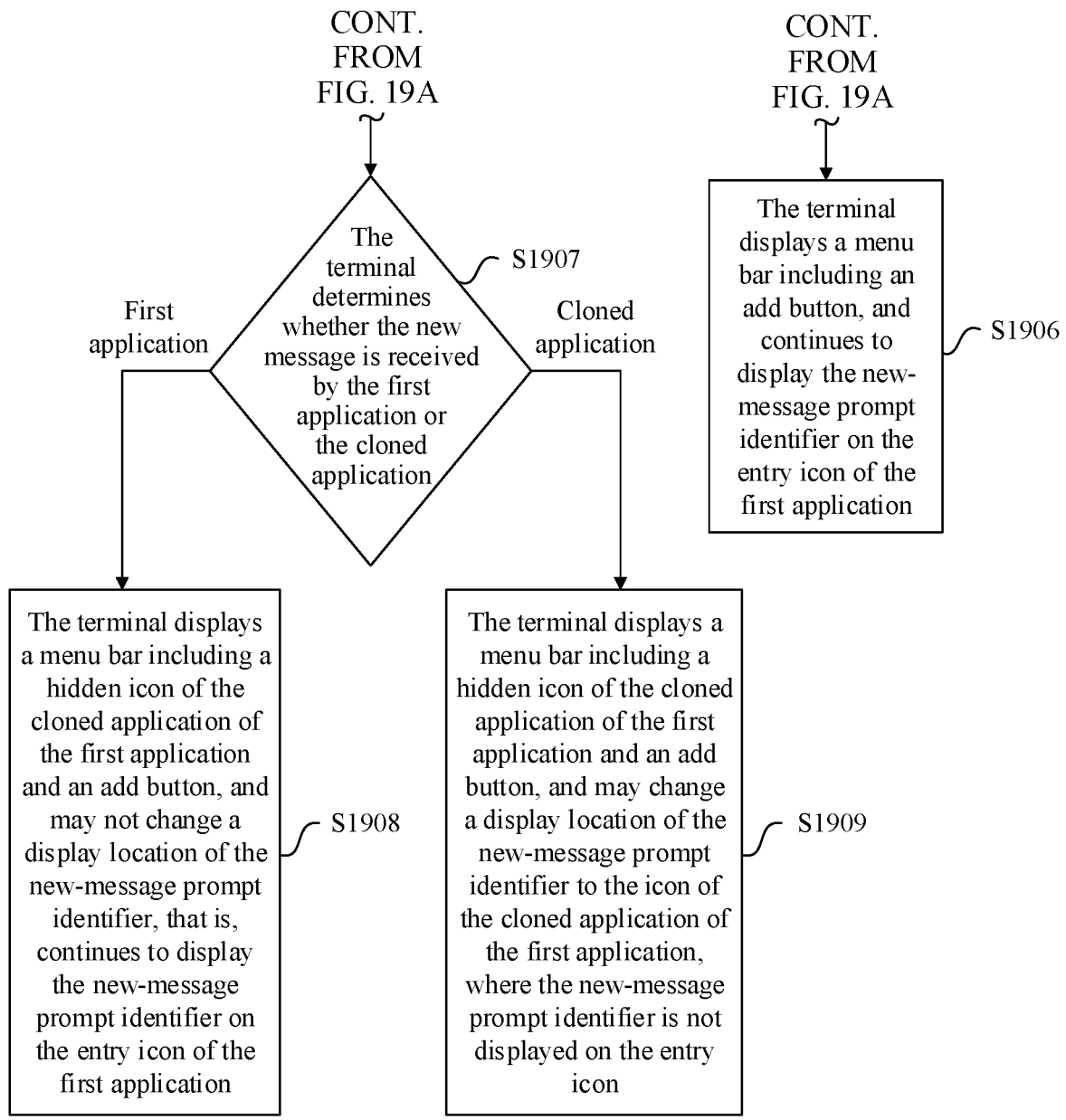

In addition, in an embodiment of this application, as shown in FIG. 19A and FIG. 19B, when a first application and/or a cloned application of the first application receives a new message, an application icon displaying method provided in this embodiment of this application may include S1901 to S1909.

S1901. A terminal receives a new message.

S1902. The terminal displays a new-message prompt identifier on an entry icon of the first application.

When receiving the new message, the terminal may first display the new-message prompt identifier on the entry icon of the first application. When the user wants to view the new message, the user may select, based on whether the user has created the cloned application of the first application, an operation to be performed. Specifically, if the user has not created the cloned application of the first application, refer to S1903. To be specific, the user may directly tap the entry icon of the first application. In response to the tap operation performed by the user, the terminal may directly display a main interface of the first application, so as to display the received new message. If the user has created the cloned application of the first application, refer to S1904. To be specific, the user may perform an operation A on the entry icon of the first application.

S1905. In response to the operation A, the terminal may determine whether the terminal includes the cloned application of the first application.

If the terminal does not include the cloned application of the first application, the terminal may perform S1906. To be specific, the terminal displays a menu bar including an add button, and continues to display the new-message prompt identifier on the entry icon of the first application.

If the terminal includes the cloned application of the first application, the terminal displays a menu bar including a hidden icon of the cloned application of the first application and an add button. In addition, the terminal may perform S1907, that is, determine, based on a specific application (the first application or the cloned application of the first application) that receives the new message, whether to change a display location of the new-message prompt identifier.

If the first application receives the new message, because the entry icon of the first application is an icon of the first application, the terminal performs S1908. To be specific, the terminal displays the menu bar including the hidden icon of the cloned application of the first application and the add button, and may not change the display location of the new-message prompt identifier, that is, continues to display the new-message prompt identifier on the entry icon of the first application.

If the cloned application of the first application receives the new message, the terminal performs S1909. To be specific, the terminal displays the menu bar including the hidden icon of the cloned application of the first application and the add button, and may change the display location of the new-message prompt identifier to the icon of the cloned application of the first application, where the new-message prompt identifier is not displayed on the entry icon.

It should be noted that in the second application scenario, because the add button used to create the cloned application of the first application and the hidden icon of the cloned application of the first application are included in a same menu bar, an operation of triggering the terminal to display the add button is the same as an operation of triggering the terminal to display the icon of the cloned application of the first application.

Third application scenario: The add button and the hidden icon are included in different menu bars corresponding to the application. In addition, the user may perform a same operation to trigger the terminal to display the different menu bars.

Figure 20:
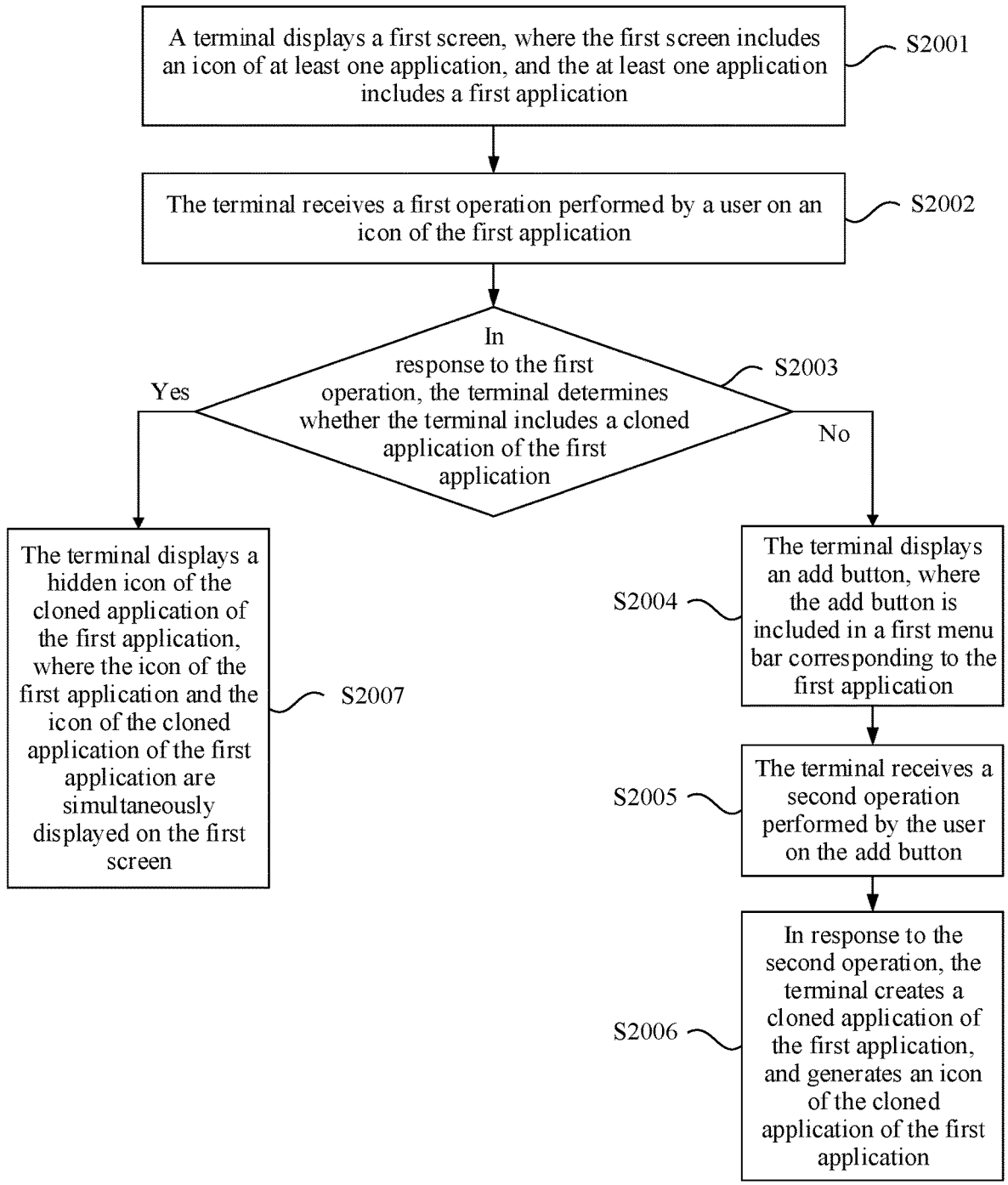
FIG. 20 is a schematic flowchart of still another application icon displaying method according to an embodiment of this application.

In the third application scenario, as shown in FIG. 20, an application icon displaying method provided in an embodiment of this application may include S2001 to S2007.

S2001. A terminal displays a first screen, where the first screen includes an icon of at least one application, and the at least one application includes a first application.

For a specific description of S2001, refer to the specific description of S301 in another embodiment of this application. Details are not described herein again.

S2002. The terminal receives a first operation performed by a user on an icon of the first application.

For a specific description of S2002, refer to the specific description of S1602 in another embodiment of this application. Details are not described herein again.

S2003. In response to the first operation, the terminal determines whether the terminal includes a cloned application of the first application.

If the terminal does not include a cloned application of the first application, S2004 to S2006 are performed. If the terminal includes the cloned application of the first application, S2007 is performed.

S2004. The terminal displays an add button, where the add button may be included on a first menu bar corresponding to the first application.

S2005. The terminal receives a second operation performed by the user on the add button.

S2006. In response to the second operation, the terminal creates a cloned application of the first application, and generates an icon of the cloned application of the first application.

For specific descriptions of S2004 to S2006, refer to the specific descriptions of S303 to S305 in another embodiment of this application. Details are not described herein again.

In some embodiments of this application, to save space of a home screen of the terminal and protect user privacy, when the cloned application of the first application is successfully created, the icon of the first application is displayed on a subscreen of the home screen of the terminal, and the icon of the cloned application of the first application is hidden. The icon of the cloned application of the first application may be viewed in a second menu bar corresponding to the terminal.

S2007. The terminal displays a hidden icon of the cloned application of the first application, where the icon of the first application and the icon of the cloned application of the first application are simultaneously displayed on the first screen.

For example, the icon of the cloned application of the first application may be included in the second menu bar corresponding to the first application.

It should be noted that, in this embodiment of this application, when the terminal includes a plurality of cloned applications of the first application, all icons of the plurality of cloned applications of the first application may be included in the second menu bar, or the icons of the plurality of cloned applications of the first application may be included in different second menu bars. It should be noted that when the terminal includes a plurality of cloned applications of the first application, for a method for displaying an icon of a cloned application, refer to the description of corresponding content in the embodiment shown in any one of FIG. 11 to FIG. 14(d). A difference lies in that an operation performed by the user is the first operation rather than the third operation, and details are not described herein again.

In addition, in this embodiment of this application, when the first application and/or the cloned application of the first application receive/receives a new message, the terminal may first display a new-message prompt identifier on the icon of the first application. When the user wants to view the new message, the user may select, based on whether the user has created the cloned application of the first application, an operation to be performed. Specifically, if the user has not created the cloned application of the first application, the user may directly tap the icon of the first application. In response to the tap operation performed by the user, the terminal may directly display a main interface of the first application, so as to display the received new message. If the user has created the cloned application of the first application, the user may perform the first operation on the icon of the first application. In response to the first operation, the terminal may determine whether the terminal includes the cloned application of the first application. If the terminal does not include the cloned application of the first application, the terminal may display the first menu bar including the add button, and continues to display the new-message prompt identifier on the icon of the first application. If the terminal includes the cloned application of the first application, the terminal displays the second menu bar including the hidden icon of the cloned application of the first application. In addition, the terminal determines, based on a specific application (the first application or the cloned application of the first application) that receives the new message, whether to change a display location of the new-message prompt identifier. If the first application receives the new message, the display location of the new-message prompt identifier may not be changed, that is, the new-message prompt identifier continues to be displayed on the icon of the first application. If the cloned application of the first application receives the new message, the terminal may change the display location of the new-message prompt identifier to the icon of the cloned application of the first application.

It can be understood that, to implement the foregoing functions, the terminal includes corresponding hardware and/or software modules for performing the functions. With reference to the units and algorithm steps described in the embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In the embodiments of this application, the terminal may be divided into functional modules based on the foregoing method examples. For example, the functional module may be obtained through division in correspondence to functions, or two or more functions may be integrated into one processing module. The foregoing integrated module may be implemented in a form of hardware. It should be noted that, in this embodiment of this application, module division is an example, and is merely a logical function division. In actual implementation, another division manner may be used.

Figure 21:
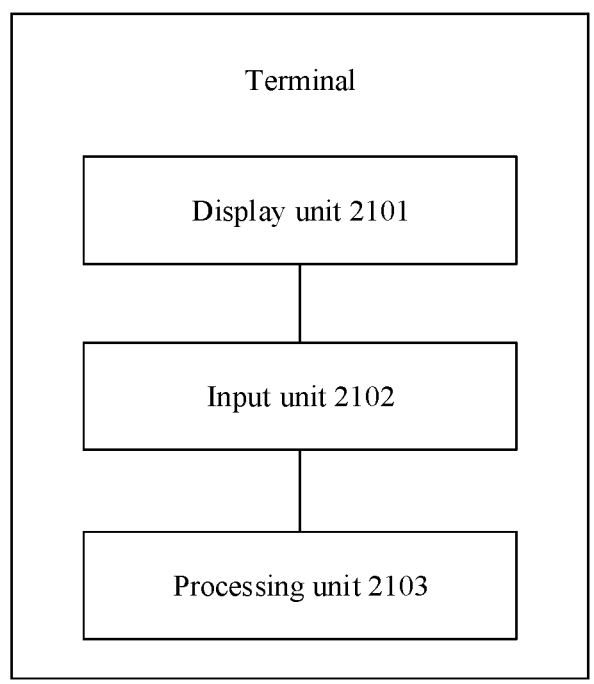
FIG. 21 is a schematic composition diagram of a terminal according to an embodiment of this application.

When the functional modules are obtained through division in correspondence to the functions, FIG. 21 is a possible schematic composition diagram of the terminal in the foregoing embodiments. As shown in FIG. 21, the terminal may include a display unit 2101, an input unit 2102, and a processing unit 2103.

The display unit 2101 may be configured to support the terminal in performing S301, S303, S801, S803, S1601, S1603, S1701, S1703, S1902, S1906, S1908, S1909, and the like, and/or used in another process of the technology described in this specification.

The input unit 2102 may be configured to support the terminal in performing S302, S304, S802, S1602, S1604, S1702, S1903, S1904, and the like, and/or used in another process of the technology described in this specification.

The processing unit 2103 may be configured to support the terminal in performing S305, S1605, S1905, S1907, and the like, and/or used in another process of the technology described in this specification.

The terminal may further include a communications unit, where the communications unit may be configured to support the terminal in performing S1901 and the like, and/or used in another process of the technology described in this specification.

It should be noted that all related content of the steps in the foregoing method embodiments may be cited in function descriptions of corresponding functional modules, and details are not described herein again.

The terminal provided in the embodiments of this application is configured to perform the foregoing application icon displaying methods, and therefore can achieve same effects as the foregoing application icon displaying methods.

When an integrated unit is used, the terminal may include a processing module and a storage module. The processing module may be configured to control and manage an action of the terminal. For example, the processing module may be configured to support the terminal in performing the steps performed by the display unit 2101, the input unit 2102, and the processing unit 2103. The storage module may be configured to support the terminal in storing program code, data, and the like. In addition, the terminal may further include a communications module, where the communications module may be configured to support communication between the terminal and another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor (digital signal processor, DSP) and a microprocessor. The storage module may be a memory. The communications module may be specifically a device, such as a radio frequency circuit, a Bluetooth chip, or a Wi-Fi chip, that interacts with another terminal.

In an embodiment, when the processing module is a processor, and the storage module is a memory, the terminal in the embodiments of this application may be a device having the structure shown in FIG. 1.

An embodiment of this application further provides a computer storage medium. The computer storage medium stores a computer instruction; and when the computer instruction is run on a terminal, the terminal is enabled to perform the foregoing related method steps to implement the application icon displaying methods in the foregoing embodiments.

An embodiment of this application further provides a computer program product. When the computer program product is run on a computer, the computer is enabled to perform the foregoing related steps to implement the application icon displaying methods in the foregoing embodiments.

In addition, an embodiment of this application further provides an apparatus. The apparatus may be specifically a chip, a component, or a module. The apparatus may include a processor and a memory connected to each other. The memory is configured to store a computer executable instruction. When the apparatus runs, the processor can execute the computer executable instruction stored in the memory, so that the chip performs the application icon displaying methods in the foregoing method embodiments.

The terminal, the computer storage medium, the computer program product, and the chip provided in the embodiments of this application are all configured to perform the corresponding methods provided above. Therefore, for beneficial effects that can be achieved by the terminal, the computer storage medium, the computer program product, and the chip, refer to the beneficial effects in the corresponding methods provided above. Details are not described herein again.

Based on the foregoing descriptions of the implementations, a person skilled in the art may clearly understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and there may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. An application icon displaying method, applied to a terminal comprising at least two applications, wherein the at least two applications comprise a first application and a cloned application of the first application, and the method comprises:
   displaying, by the terminal, a first screen, wherein the first screen comprises an icon of the first application, and an icon of the cloned application of the first application is hidden;
   receiving, by the terminal, a first operation performed on the icon of the first application; and
   displaying, by the terminal, the hidden icon of the cloned application of the first application in response to the first operation, wherein the icon of the cloned application of the first application and the icon of the first application are simultaneously displayed on the first screen, and the first screen is comprised on a home screen of the terminal;
   wherein the displaying, by the terminal, the hidden icon of the cloned application of the first application in response to the first operation comprises:
   displaying, by the terminal in response to the first operation, a first menu bar corresponding to the first application, wherein the hidden icon of the cloned application of the first application is comprised in the first menu bar; and
   wherein, before receiving, by the terminal, the first operation, the method further comprises:
      receiving, by the terminal, a new message;
      displaying, by the terminal, a new-message prompt identifier on the icon of the first application;
      wherein, after receiving, by the terminal, the first operation, the method further comprising:
      if the new message is a message received by the first application, while displaying, by the terminal, the first menu bar in response to the first operation, continuously displaying, by the terminal, the new-message prompt identifier on the icon of the first application; or
   if the new message is a message received by the cloned application of the first application, while displaying, by the terminal, the first menu bar in response to the first operation, displaying the new-message prompt identifier on the icon of the cloned application of the first application, and
      skipping displaying the new-message prompt identifier on the icon of the first application.

2. The application icon displaying method according to claim 1, wherein the first menu bar is adjacent to the icon of the first application.

3. The application icon displaying method according to claim 1, wherein the first operation is a sliding operation, a start point of the sliding operation is the icon of the first application, and a sliding direction is any one of an upward direction, a downward direction, a leftward direction, and a rightward direction; and a direction of the first menu bar relative to the icon of the first application is the same as the sliding direction.

4. The application icon displaying method according to claim 3, wherein if the terminal comprises a plurality of cloned applications of the first applications, icons of different cloned applications are comprised in different first menu bars; and
   wherein the displaying, by the terminal in response to the first operation, the first menu bar corresponding to the first application comprises: displaying, by the terminal in response to the first operation, different first menu bars based on different sliding directions of the first operation.

5. The application icon displaying method according to claim 4, wherein the method further comprises:
   receiving, by the terminal, a second operation performed on the icon of the first application;
   displaying, by the terminal in response to the second operation, a second menu bar corresponding to the first application, wherein the second menu bar comprises an add button;
   receiving, by the terminal, a third operation performed on the add button; and
   creating, by the terminal in response to the third operation, the cloned application of the first application, and generating the icon of the cloned application of the first application.

6. A terminal, wherein the terminal comprises one or more processors, a memory, a display, and at least two applications, wherein the at least two applications comprise a first application and a cloned application of the first application, wherein the one or more processors, the memory, and the display are coupled to each other, the memory is configured to store computer program code, and the computer program code comprises a computer instruction; and when the one or more processors execute the computer instruction, the terminal is configured for:
   displaying a first screen, wherein the first screen comprises an icon of the first application, and an icon of the cloned application of the first application is hidden;
   receiving a first operation performed on the icon of the first application; and
   displaying the hidden icon of the cloned application of the first application in response to the first operation, wherein the icon of the cloned application of the first application and the icon of the first application are simultaneously displayed on the first screen, and the first screen is comprised on a home screen of the terminal;
   wherein the displaying the hidden icon of the cloned application of the first application in response to the first operation comprises:
   displaying, in response to the first operation, a first menu bar corresponding to the first application, wherein the hidden icon of the cloned application of the first application is comprised in the first menu bar;
   wherein, before receiving the first operation, the terminal is further configured for:
      receiving a new message;
      displaying a new-message prompt identifier on the icon of the first application; and receiving the first operation; and
   wherein, after receiving the first operation, the terminal is further configured for:
      if the new message is a message received by the first application, while displaying the first menu bar in response to the first operation, continuously displaying the new-message prompt identifier on the icon of the first application; or if the new message is a message received by the cloned application of the first application, while displaying the first menu bar in response to the first operation, displaying the new-message prompt identifier on the icon of the cloned application of the first application, and skipping displaying the new-message prompt identifier on the icon of the first application.

7. The terminal according to claim 6, wherein the first menu bar is adjacent to the icon of the first application.

8. The terminal according to claim 6, wherein the first operation is a sliding operation, a start point of the sliding operation is the icon of the first application, and a sliding direction is any one of an upward direction, a downward direction, a leftward direction, and a rightward direction; and a direction of the first menu bar relative to the icon of the first application is the same as the sliding direction.

9. The terminal according to claim 8, wherein if the terminal comprises a plurality of cloned applications of the first application, icons of different cloned applications are comprised in different first menu bars; and wherein the displaying in response to the first operation, the first menu bar corresponding to the first application comprises:

displaying, in response to the first operation, different first menu bars based on different sliding directions of the first operation.

10. The terminal according to claim 9, wherein the terminal is further configured for:

receiving a second operation performed on the icon of the first application;

displaying, in response to the second operation, a second menu bar corresponding to the first application, wherein the second menu bar comprises an add button;

receiving a third operation performed on the add button; and creating, in response to the third operation, the cloned application of the first application, and generating the icon of the cloned application of the first application.

11. A non-transitory computer storage medium, comprising a computer instruction, wherein when the computer instruction is run on a terminal, the terminal is configured for:

displaying a first screen, wherein the first screen comprises an icon of the first application, and an icon of the cloned application of the first application is hidden;

receiving a first operation performed on the icon of the first application; and displaying the hidden icon of the cloned application of the first application in response to the first operation, wherein the icon of the cloned application of the first application and the icon of the first application are simultaneously displayed on the first screen, and the first screen is comprised on a home screen of the terminal;

wherein the displaying the hidden icon of the cloned application of the first application in response to the first operation comprises:

displaying in response to the first operation, a first menu bar corresponding to the first application, wherein the hidden icon of the cloned application of the first application is comprised in the first menu bar; and wherein, before receiving the first operation, the terminal is further configured for:

receiving a new message;

displaying a new-message prompt identifier on the icon of the first application;

wherein, after receiving the first operation, the terminal is further configured for:

if the new message is a message received by the first application, while displaying the first menu bar in response to the first operation, continuously displaying the new-message prompt identifier on the icon of the first application; or if the new message is a message received by the cloned application of the first application, while displaying the first menu bar in response to the first operation, displaying the new-message prompt identifier on the icon of the cloned application of the first application, and skipping displaying the new-message prompt identifier on the icon of the first application.

* * * * *

UNITED STATES PATENT AND TRADEMARK OFFICE
CERTIFICATE OF CORRECTION

| | | |
|---|---|---|
| PATENT NO. | : 11,775,135 B2 | |
| APPLICATION NO. | : 17/265140 | |
| DATED | : October 3, 2023 | |
| INVENTOR(S) | : Zhang et al. | |

It is certified that error appears in the above-identified patent and that said Letters Patent is hereby corrected as shown below:

In the Claims

Claim 1: Column 37, Line 44: "operation, the method further comprising:" should read -- operation, the method further comprises: --.

Signed and Sealed this
Sixteenth Day of January, 2024

Katherine Kelly Vidal
*Director of the United States Patent and Trademark Office*